(12) United States Patent
Sinha et al.

(10) Patent No.: US 7,529,152 B2
(45) Date of Patent: May 5, 2009

(54) USE OF AN EFFECTIVE TOOL MODEL IN SONIC LOGGING DATA PROCESSING

(75) Inventors: Bikash K. Sinha, West Redding, CT (US); Toru Ikegami, Danbury, CT (US); David Linton Johnson, Bethel, CT (US); Jahir Pabon, Wellesley, MA (US)

(73) Assignee: Schlumberger Technology Corporation, Ridgefield, CT (US)

( * ) Notice: Subject to any disclaimer, the term of this patent is extended or adjusted under 35 U.S.C. 154(b) by 22 days.

(21) Appl. No.: 11/125,564

(22) Filed: May 10, 2005

(65) Prior Publication Data

US 2006/0256655 A1    Nov. 16, 2006

(51) Int. Cl.
*G01V 1/40* (2006.01)
*G01V 1/52* (2006.01)

(52) U.S. Cl. ................. 367/31; 367/25; 367/75
(58) Field of Classification Search ............ 367/25, 367/31, 32, 75; 702/6, 18
See application file for complete search history.

(56) References Cited

U.S. PATENT DOCUMENTS

| | | | |
|---|---|---|---|
| 4,594,691 A | 6/1986 | Kimball et al. | 367/32 |
| 4,698,793 A | 10/1987 | Wu | 367/32 |
| 4,831,600 A | 5/1989 | Hornby et al. | 367/31 |
| 5,081,611 A | 1/1992 | Hornby | 367/25 |
| 5,229,939 A | 7/1993 | Scheibner et al. | 364/422 |
| 5,278,805 A | 1/1994 | Kimball | 367/32 |
| 5,398,215 A | 3/1995 | Sinha et al. | 367/31 |
| 5,475,650 A | 12/1995 | Sinha et al. | 367/31 |
| 5,587,966 A | 12/1996 | Kimball et al. | 367/31 |
| 5,661,696 A | 8/1997 | Kimball et al. | 367/31 |
| 5,687,138 A | 11/1997 | Kimball et al. | 367/31 |
| 5,784,333 A | 7/1998 | Tang et al. | 367/30 |
| 5,838,633 A | 11/1998 | Sinha et al. | 367/31 |
| 5,987,385 A | 11/1999 | Varsamis et al. | 702/6 |
| 5,999,484 A | 12/1999 | Kimball et al. | 367/31 |
| 6,327,538 B1 | 12/2001 | Chin | 702/18 |
| 6,351,991 B1 | 3/2002 | Sinha | 73/152.01 |
| 6,526,354 B2 | 2/2003 | Bose et al. | 702/14 |

(Continued)

FOREIGN PATENT DOCUMENTS

WO    2004/063772 A    7/2004

(Continued)

OTHER PUBLICATIONS

Cheng, et al. "Elastic wave propagation in fluid-filled borehole and synthetic acoustic logs." Geophysics, vol. 46, Jul. 1981.*

(Continued)

*Primary Examiner*—Jack W. Keith
*Assistant Examiner*—Scott A Hughes
(74) *Attorney, Agent, or Firm*—Helene Raybaud; Jody DeStefanis; Vincent Loccisano

(57) ABSTRACT

Methods and apparatus facilitating radial profiling of shear slowness are disclosed. According to some aspects of the invention, acoustic tool bias is accounted for in the calculation of radial profiles. According so some aspects, acoustic tool bias is accounted for by replacing acoustic tool structure with a resonance-impedance model. The resonance-impedance modeling according to principles of the present invention is applicable to vertical, deviated, and horizontal boreholes.

6 Claims, 39 Drawing Sheets

U.S. PATENT DOCUMENTS

| | | | |
|---|---|---|---|
| 6,546,339 B2 | 4/2003 | Bevc et al. ................... 702/18 |
| 6,611,761 B2 | 8/2003 | Sinha et al. ..................... 702/6 |
| 6,614,716 B2 | 9/2003 | Plona et al. ................... 367/31 |
| 6,631,327 B2 | 10/2003 | Hsu et al. ....................... 702/6 |
| 6,654,688 B1 | 11/2003 | Brie et al. ...................... 702/2 |
| 6,714,480 B2 | 3/2004 | Sinha et al. ................... 367/31 |
| 6,718,266 B1 | 4/2004 | Sinha et al. ................... 702/11 |
| 6,868,341 B2 | 3/2005 | Valero .......................... 702/11 |
| 6,920,082 B2 | 7/2005 | Tang ............................ 367/31 |
| 2002/0049540 A1 | 4/2002 | Bevc et al. |
| 2003/0058739 A1 | 3/2003 | Hsu et al. |
| 2004/0001389 A1* | 1/2004 | Tang ............................ 367/31 |
| 2004/0257911 A1* | 12/2004 | Tang et al. .................... 367/81 |
| 2005/0254343 A1 | 11/2005 | Saiki et al. .................... 367/31 |

FOREIGN PATENT DOCUMENTS

WO      2005/116693 A     12/2005

OTHER PUBLICATIONS

Bokov, et al. "Tube-wave propagation in fluid-filled borehole generated by a single point force applied to the surrounding formation." J. Acoust. Soc. Am. 112 (6) Dec. 2002.*

Tang, et al. "Effects of a logging tool on the stoneley waves in elastic and porous boreholes." The Log Analyst, Sep.-Oct. 1993.*

Norris, A.n. "The speed of a tube wave." J. Acoust. Soc. Am. 87 (1) Jan. 1990.*

Ellefsen, et al. "Estimating a shear modulus of a transversely isotropic rock." 1991 Ultrasonics Symposium.*

Ellefsen, et al. "Elastic wave propagation along a Borehole in an Anisotropic Medium."*

Tang, X.M. "Determining Shear-wave Transverse Isotropy From Borehole Stoneley Waves." SEG Meeting, Sep. 2002.*

Geertis, et al. "The effect of tool on dipole logging." SEG Technical Program Expanded Abstracts—1997—pp. 313-316.*

Sinha, et al. "Radial Profiling of Formation Shear Velocity from Borehole Flexural Dispersions." 2001 IEEE Ultrasonics Symposium.*

Backus, G. and F. Gilbert. "Uniqueness in the inversion of inaccurate gross earth data." Philosophical Trans. Royal Society of London vol. 266A (1970): pp. 123-192.

Burridge, R. and Sinha, B. "Inversion for formation shear modulus and radial depth of investigation using borehole flexural waves." 66th Annual International Meeting, Society of Exploration Geophysicists Expanded Abstracts (1996): pp. 158-161.

Chang, S., H. Liu, and D. Johnson. "Low-frequency tube waves in permeable rocks." Geophysics vol. 53 No. 4 (1988): pp. 519-527.

Ekstrom, M. "Dispersion estimation from borehole acoustic arrays using a modified matrix pencil algorithm." Presented at the 29th Asilomar Conference on Signals, Systems and Computers, Pacific Grove, CA 1995.

Gazis, D. "Three-dimensional investigation of the propagation of waves in hollow circular cylinders, I. Analytical foundation, and II. Numerical Results." J. Acoust Soc. Am. vol. 31 No. 5 (1959): pp. 568-578.

Geerits, et al. "Centroid phase slowness as a tool for dispersion correction of dipole acoustic logging data." Geophysics vol. 68, No. 1, Jan.-Feb. 2003: pp. 101-107.

Harrison, A.R., et al. "Acquisition and Analysis of Sonic Waveforms from a Borehole Monopole and Dipole Source for the Determination of Compressional and Shear Speeds and Their Relation to Rock Mechanical Properties and Surface Seismic Data." SPE Annual Tech. Conf. and Exhibition, Paper SPE 20557, (Sep. 1990).

Hsu, C., S. Kostek and D. Johnson. "Tube waves and mandrel modes: Experiment and theory." J. Acout. Soc. Am. vol. 102 (6) (1997): pp. 3277-3289.

Hsu, C.J. and B.K. Sinha. "Mandrel effects on the dipole flexural mode in a borehole." Journal of Acoustical Society of America vol. 104(4) (Oct. 1998): pp. 2025-2039.

Jones, Leonie E.A. and Herbert F. Wang. "Ultrasonic Velocities in Cretaceous Shales from the Williston Basin." Geophysics vol. 46, No. 3 (1981): pp. 288-297.

Kimball, C.V. "Shear Slowness Measurement by Dispersive Processing of the Borehole Flexural Mode." Geophysics vol. 63, No. 2 (Mar.-Apr. 1998): pp. 337-344.

Kimball, C.V., Marzetta, T.L., "Semblance Processing of Borehole Acoustic Array Data." Geophysics vol. 49, No. 3 (Mar. 1984): pp. 274-281.

Kozak, M.Z., and Kozak, M.E. "Estimation of Formation Shear Slowness Using Phase Velocity and Semblance Method-Comparative Studies".

Lai, J., E. Dowell, and T. Tauchert. "Propagation of harmonic waves in a composite elastic cylinder." J. Acoust. Soc. Am. vol. 49 (1971): pp. 220-228.

Liu, H. "Borehole modes in a cylindrical fluid-saturated permeable medium." J. Acoust. Soc. Am. vol. 84 (1988): pp. 424-431.

McClellan, J.H. "Two-Dimensional Spectrum Analysis in Sonic Logging." ICASSP 86, IEEE (1986): pp. 3105-3111.

Meeker, T. and A. Meitzler. "Guided wave propagation in elongated cylinders and plates." Physical Acoustics vol. 1A. New York, NY: Academic Press, 1964.

Norris, A. "Stoneley-wave attenuation and dispersion in permeable formations." Geophysics vol. 54 No. 3 (1989): pp. 330-341.

Norris, A. and B. Sinha. "Weak elastic anisotropy and the tube wave." Geophysics vol. 58 No. 8 (1993): pp. 1091-1098.

Sayers, C.M. "The Elastic Anisotrophy of Shales." J. Geophysics vol. 99, No. B1 (1994): pp. 767-774.

Sinha, B. "Sensitivity and inversion of borehole flexural dispersions for formation parameters." Geophysical Journal International vol. 128(1) (Jan. 1997): pp. 84-96.

Sinha, B. and S. Asvadurov. "Dispersion and radial depth of investigation of borehole modes." Geophysical Prospecting vol. 52 (2004): pp. 271-286.

Sinha, B., S. Kostek, and A. Norris. "Stoneley and flexural modes in pressurized boreholes." J. Geophys Res. vol. 100 No. B11 (1995): pp. 22,375-22,381.

Winkler, K., H. Liu, and D. Johnson. "Permeability and borehole Stoneley waves: Comparison between experiment and theory." Geophysics vol. 54 No. 1 (1989): pp. 66-75.

Brie, A., T. Endo, D.L. Johnson, and F. Pampuri. "Quantitative Formation Permeability Evaluation From Stoneley Waves." SPE 49131 (1998).

Brie, A., T. Endo, D.L. Johnson, and F. Pampuri. "Quantitative Formation Permeability Evaluation From Stoneley Waves." SPE Reservoir Eval. & Eng. 3 (2) (Apr. 2000): pp. 109-117.

Kostek, Sergio, David Linton Johnson, and Curtis J. Randall. "The interaction of tube waves with borehole fractures, Part I: Numerical models." Geophysics vol. 63, No. 3 (May-Jun. 1998): pp. 800-808.

Kostek, Sergio, David Linton Johnson, Kenneth W. Winkler, and Brian E. Hornby. "The interaction of tube waves with borehole fractures, Part II: Analytical models." Geophysics vol. 63, No. 3 (May-Jun. 1998): pp. 809-815.

Liu, Hsui-Lin and David Linton Johnson. "Effects of an elastic membrane on tube waves in permeable formations." J. Acoust. Soc. Am. 101 (6) (Jun. 1997): pp. 3322-3329.

Pampuri, F., M. Rovellini, A. Brie, T. Fukusima. "Effective Evaluation of Fluid Mobility From Stonely Waves Using Full Biot Model Inversion: Two Case Histories." SPE 49132 (1998).

Sinha et al. "Optimal Well Completions Using Radial Profiling of Formation Shear Slowness." SPE Annual Technical Conference and Exhibition, Oct. 12, 2005, SPE 95837.

PCT International Search Report for International Application No. PCT/US2006/016183 sent Oct. 10, 2006.

Rao et al. "Acoustics of fluid-filled boreholes with pipe: Guided propagation and radiation." J. Acoust. Soc. Am 105(6), Jun. 1999: pp. 3057-3066.

* cited by examiner

USE OF AN EFFECTIVE TOOL MODEL IN SONIC LOGGING DATA PROCESSING

This patent application claims the benefit of priority from commonly-assigned co-pending U.S. patent application Ser. No. 10/847,045 entitled "Methods for Processing Dispersive Acoustic Waveforms", filed May 17, 2004, which is incorporated herein by reference.

FIELD OF THE INVENTION

The present invention relates generally to sonic or acoustic logging of earth formations surrounding a borehole. More particularly, the present invention relates to methods and apparatus that use an effective tool model in the processing of sonic logging data obtained from formations surrounding a borehole.

BACKGROUND OF THE INVENTION

It is well known that mechanical disturbances can be used to establish elastic waves in earth formations surrounding a borehole, and the properties of these waves can be measured to obtain important information about the formations through which the waves have propagated. Parameters of compressional, shear and Stoneley waves, such as their velocity (or its reciprocal, slowness) in the formation and in the borehole, can be indicators of formation characteristics that help in evaluation of the location and/or producibility of hydrocarbon resources.

One example of a logging device that has been used to obtain and analyze acoustic measurements of formations surrounding an earth borehole is Schlumberger's MSIP™ (Modular Sonic Imaging Platform) logging tool. According to conventional use of the MSIP logging tool, one can present compressional slowness, $\Delta t_c$, shear slowness, $\Delta t_s$, and Stoneley slowness, $\Delta t_{st}$, each as a function of depth, z (slowness corresponds to an interval transit time typically measured by sonic logging tools).

An acoustic source in a fluid-filled borehole generates headwaves, as well as relatively stronger borehole-guided modes. A standard sonic measurement system consists of placing a piezoelectric source and hydrophone receivers inside a fluid-filled borehole. The piezoelectric source may be either a monopole or a dipole source. The source bandwidth typically ranges from a 0.5 to 20 kHz. A monopole source primarily generates the lowest-order axisymmetric mode, also referred to as the Stoneley mode, along with compressional and shear headwaves. In contrast, a dipole source primarily excites the lowest-order flexural borehole mode together with compressional and shear headwaves. The headwaves are caused by the coupling of the transmitted acoustic energy to plane waves in the formation that propagate along the borehole axis. An incident compressional wave in the borehole fluid produces critically refracted compressional waves in the formation. The waves refracted along the borehole surface are known as compressional headwaves. The critical incidence angle is represented as $\theta_i = \sin^{-1}(V_f/V_c)$, where $V_f$ is the compressional wave speed through the borehole fluid and $V_c$ is the compressional wave speed through the formation. As a compressional headwave travels along an interface, it radiates energy back into the fluid that can be detected by the hydrophone receivers placed in the fluid-filled borehole. In relatively fast formations, the shear headwave can be similarly excited by a compressional wave at the critical incidence angle $\theta_i = \sin^{-1}(V_f/V_c)$, where $V_s$ is the shear wave speed through the formation. It is also worth noting that headwaves are excited only when the wavelength of the incident wave is smaller than the borehole diameter so that the boundary can be effectively treated as a planar interface. In a homogeneous and isotropic model of fast formations, as above noted, compressional and shear headwaves can be generated by a monopole source placed in a fluid-filled borehole to determine the formation compressional and shear wave speeds. However, refracted shear headwaves cannot be detected for slow formations (where the shear wave velocity is less than the borehole-fluid compressional wave velocity) with receivers placed in the borehole fluid. Therefore, formation shear velocities are obtained from the low-frequency asymptote of flexural dispersion for slow formations. There are standard processing techniques for the estimation of formation shear velocities in either fast or slow formations from an array of recorded dipole waveforms.

Both the monopole and dipole waveforms recorded at an array of receivers can be processed by a modified matrix pencil algorithm that isolates non-dispersive and dispersive arrivals in the wave train. The compressional headwave velocity is the formation quasi-compressional (qP-) wave velocity along the borehole axis. The low-frequency asymptote of the lowest-order axisymmetric Stoneley dispersion yields the tube wave velocity (VT) along the borehole axis. The formation quasi-shear (qSV-) and shear (SH-) velocities are obtained from the low-frequency asymptotes of the two orthogonally polarized borehole flexural waves propagating along the borehole axis.

Among the areas of interest of the present invention is the field of seismic prospecting. Seismic prospecting for hydrocarbon reserves requires estimates of all the five transversely isotropic (TI-) anisotropic constants of overburden shale for reliable identification and location of target reservoirs. Shale typically constitutes more than 70% of the formation that a borehole trajectory passes through before reaching the target reservoir. Consequently, if the proper anisotropic constants of shale are not accounted for in the velocity model, it is more probable that drilling based on seismic prospecting will miss the target reservoir.

Sedimentary rocks frequently possess an anisotropic structure resulting, for example, from thin bedding, fine scale layering, the presence of oriented microcracks or fractures or the preferred orientation of nonspherical grains or anisotropic minerals. This type of anisotropy is called formation intrinsic anisotropy. A dipole dispersion crossover is an indicator of stress-induced anisotropy dominating any intrinsic anisotropy that may also be present (see, e.g., U.S. Pat. No. 5,398,215 entitled "Identification of Stress Induced Anisotropy in Formations").

Failure to properly account for anisotropy in seismic processing may lead to errors in velocity analysis, normal moveout (NMO) correction, dip moveout (DMO) correction, migration, time-to-depth conversion and amplitude versus offset (AVO) analysis. The main cause of anisotropy in sedimentary basins is the presence of shales which, as noted above, typically form a major component of the basin (Jones et al., 1981), and overlie many hydrocarbon reservoirs. Shales are anisotropic as a result of layering and a partial alignment of plate-like clay minerals (Jones et al., 1981; Sayers, 1994). This anisotropy may be described, to a good approximation, as being transversely isotropic (TI). A TI medium is invariant with respect to rotations about a symmetry axis and may be described by five independent elastic stiffnesses. An example is a sedimentary rock for which the bedding plane is a plane of isotropy.

AVO analysis requires some combinations of formation anisotropic constants. Some of these constants can be obtained from the borehole sonic measurements, others can be obtained from borehole seismic measurements, such as walk-away VSPs. The elastic constants that can be obtained from the borehole sonic measurements are the three formation shear moduli and a compressional modulus from the compressional headwave logging.

Two of the shear moduli, known to those of skill in the art as $c_{44}$ and $c_{55}$, can be obtained from the fast and slow dipole flexural dispersions. A recently issued patent (U.S. Pat. No. 6,611,761 entitled "Sonic Well Logging for Radial Profiling," hereby incorporated by reference) describes a technique for obtaining radial profiles of fast and slow shear slownesses using measured dipole dispersions in two orthogonal directions that are characterized by the shear moduli $c_{44}$ and $c_{55}$ for a borehole parallel to an $X_3$-axis (FIG. 1) in an orthorhombic formation. However, the third shear modulus, known as $c_{66}$, is different. The third shear modulus can be estimated from tube wave velocity. The tube wave velocity is the zero-frequency intercept of borehole Stoneley dispersion.

Typical logging devices such as Schlumberger's DSI™ sonic well logging tool are generally quite flexible and therefore approximately "acoustically transparent." The advantage of typical flexible logging devices is the acoustic transparency, which allows any signal propagation through the tool to be ignored. Accordingly, typical sonic data is collected and processed independent of tool effects. However, the drawback of flexible logging devices is mechanical weakness. In difficult logging conditions, flexible logging devices may buckle or otherwise fail. Stronger tools may be useful for difficult logging conditions, but stronger logging tools affect the acoustic signals, and current logging procedures ignore any tool influence.

In addition, many wells are now logged during the drilling operation. The procedures are generally categorized as logging-while drilling or LWD operations. Drill strings are, however, generally rigid and strong and not acoustically transparent. Nevertheless, current techniques do not adequately account for the effect of the drill string on the acoustic data.

U.S. Pat. No. 6,714,480, issued Mar. 30, 2004 and entitled "Determination of anisotropic moduli of earth formations" (hereby incorporated by reference) describes a technique for estimating the horizontal shear modulus $c_{66}$ of an orthorhombic or TI-formation using a zero frequency intercept of the Stoneley dispersion that yields tube wave velocity. This technique assumes that the borehole Stoneley dispersion is insignificantly affected by the presence of the sonic tool structure or any possible near-wellbore alteration, such as super-charging in permeable formation, and shale swelling in overburden shales. Nevertheless, new observations reveal that in fast formations and small borehole diameters, both sonic tool effect and near-wellbore alteration can have significant effects on the measured Stoneley dispersion and cause a significant bias on the estimate of the horizontal shear modulus $c_{66}$.

SUMMARY OF THE INVENTION

The present invention addresses the above-described deficiencies and others. For example, the principles described herein enable the appropriate processing of acquired acoustic data that has dispersive characteristics and accounts for tool or drill string effects by modeling the tool or drill string over a range of frequencies.

One aspect of the present invention provides an acoustic logging method. The method comprises acquiring acoustic data having dispersive characteristics and accounting for acoustic tool effects on the data across a frequency spectrum. The frequency spectrum may span approximately 0.5 to 25 kHz. The method may account for acoustic tool effects at all relevant sonic frequencies. Accounting for the acoustic tool effects may comprise modeling the acoustic tool with a resonance-impedance model. The acquisition of acoustic data may comprise performing a wireline sonic logging operation or a logging-while-drilling operation. Accounting for acoustic tool effects may comprise removing the effects of the nontransparent acoustic tool as the data is being processed.

Another aspect of the invention provides a method of estimating a shear modulus in an anisotropic formation surrounding a borehole. The method comprises measuring Stoneley dispersion around a vertical borehole with an acoustic tool, calculating a horizontal shear modulus $c_{66}$ from the measured Stoneley dispersion, and accounting for acoustic tool bias on the horizontal shear modulus $c_{66}$ calculation. Accounting for acoustic tool bias may comprise replacing the acoustic tool structure with a resonance-impedance model. The acoustic "tool" may comprise wireline, logging-while-drilling, or other devices. Replacing the acoustic tool structure with a resonance-impedance model may include replacing the acoustic tool structure with an equivalent surface impedance placed concentrically with a substantially vertical $X_3$-axis. The equivalent surface impedance may be imposed at an actual acoustic tool diameter. Acoustic tool compressibility may be described by a frequency-dependent complex function that simulates observed fluid-resonance in a vicinity of receiver mounts and associated attenuation with a borehole Stoneley mode in a variety of formations. According to some aspects, replacing the acoustic tool structure with an equivalent surface impedance placed concentrically with the substantially vertical $X_3$-axis comprises simplifying the equivalent surface impedance to a column with an appropriate surface impedance condition at an interface between the acoustic tool and borehole fluid. The method may further include introducing the equivalent surface impedance to an open hole and calculating fundamental eigenmodes associated with a lowest-order axi-symmetric Stoneley mode of the equivalent surface impedance using a mode-search routine. The method may also comprise assigning the fundamental eigenmodes as a reference solution for a chosen homogeneous and isotropic formation and computing kernels in a perturbation integral used in a Stoneley radial profiling (SRP) algorithm in terms of the fundamental eigenmodes. The method may include obtaining acoustic tool parameters for the resonance-impedance model by calibrating resonance-impedance model predictions with measured Stoneley dispersions in a test well with known parameters.

Another aspect of the invention provides an apparatus for radial profiling of horizontal shear slowness of formations surrounding a borehole. The apparatus comprises an acoustic logging system that accounts for acoustic tool effects at multiple frequencies on acoustic data having dispersive characteristics. The logging system may comprise a wireline sonic logging tool capable of acquiring acoustic data having dispersive characteristics, logging-while-drilling equipment, or other devices. The acoustic logging system accounts for acoustic tool effects at multiple frequencies by modeling a logging tool with a resonance-impedance model.

Another embodiment of the present invention provides an apparatus for determining a radial profile of sonic shear velocity of formations surrounding a borehole. The apparatus comprises means for transmitting sonic energy from a logging device to establish Stoneley waves in the formation, means for receiving, at the logging device, sonic energy from the Stoneley waves, and for producing from the received sonic energy, measurement signals at a plurality of frequencies, means for determining, at each of said number of frequencies, the Stoneley wave velocity of the formation, means for deriving sonic compressional and shear velocities of the formation, means for determining the radial profile of sonic shear velocity from the derived compressional and shear velocities of the formation, and the Stoneley wave velocities at the plurality of frequencies, and accounting for logging device bias in a calculation of horizontal shear velocity. The means for determining the radial profile may comprise a processor modeling the acoustic tool structure with a resonance-impedance model. The logging device may comprise a wireline logging tool, logging-while-drilling equipment, or other apparatus.

Another aspect of the invention provides a method of estimating effective shear modulus $c_{66}$ in a cross-sectional plane of a deviated borehole in an anisotropic formation with a known deviation with respect to a vertical $X_3$-axis. The method comprises measuring Stoneley dispersion in a deviated borehole with an acoustic tool, and calculating an effective shear modulus $c_{66}$ in the cross-sectional plane of the borehole from the measured Stoneley dispersion using a resonance-impedance model that accounts for the presence of the acoustic tool in the borehole.

Another aspect of the invention provides a method of estimating effective shear modulus $c_{66}$ in a cross-sectional plane of a horizontal borehole in an anisotropic formation with the borehole deviation substantially perpendicular to the vertical $X_3$-axis. The method comprises measuring Stoneley dispersion in a horizontal borehole with an acoustic tool, and calculating an effective shear modulus $c_{66}$ in the cross-sectional plane of the borehole from the measured Stoneley dispersion using a resonance-impedance model that accounts for the presence of the acoustic tool in the borehole.

Additional advantages and novel features of the invention will be set forth in the description which follows or may be learned by those skilled in the art through reading these materials or practicing the invention. The advantages of the invention may be achieved through the means recited in the attached claims.

BRIEF DESCRIPTION OF THE DRAWINGS

The accompanying drawings illustrate preferred embodiments of the present invention and are a part of the specification. Together with the following description, the drawings demonstrate and explain the principles of the present invention.

FIG. 6b illustrates radial slowness profiles of decreasing and increasing slownesses away from borehole shown in FIG. 6a.

Figure 1:
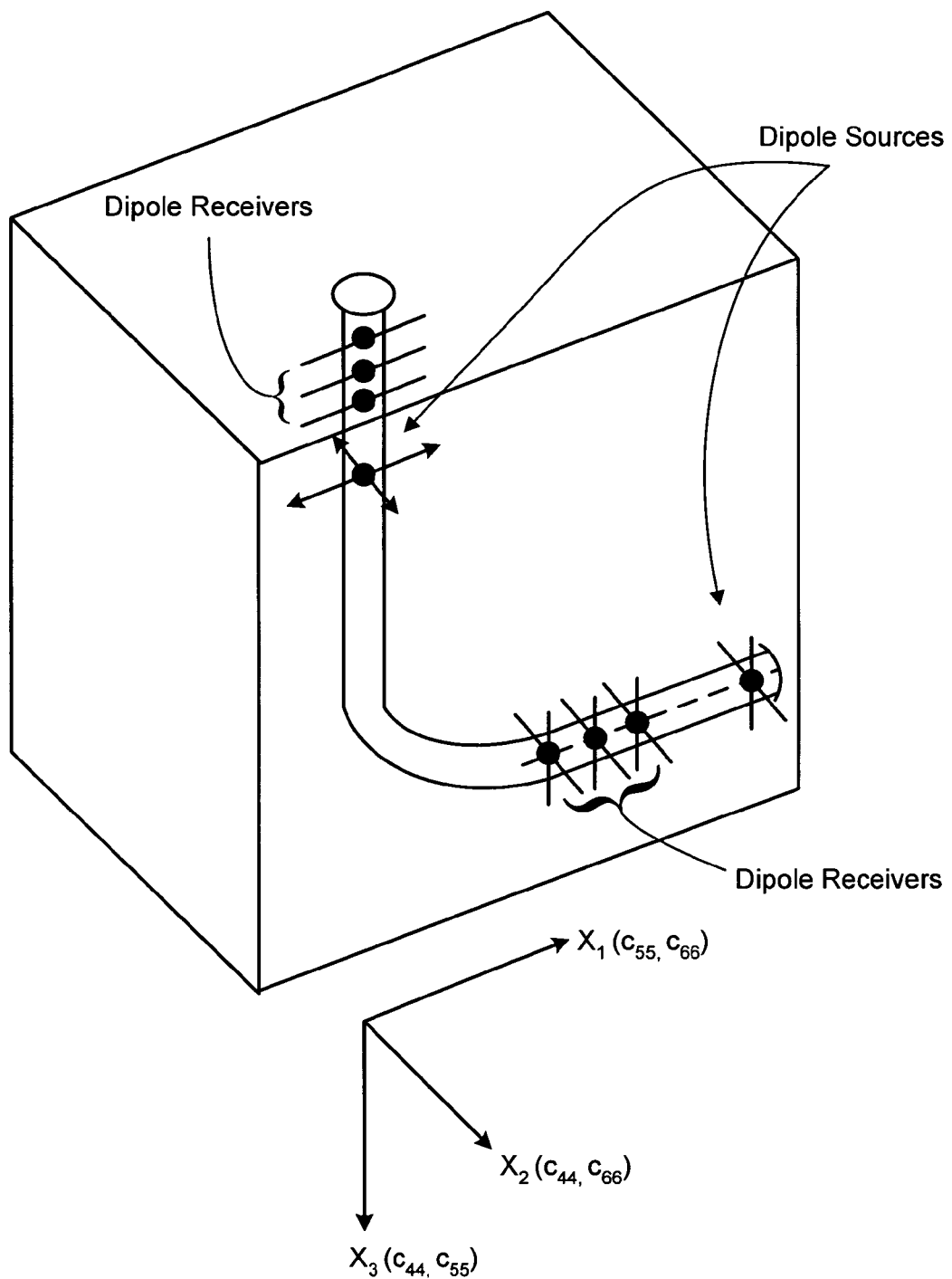
FIG. 1 is a schematic diagram of vertical and horizontal sections of a well, together with measurement axes.

Throughout the drawings, identical reference characters and descriptions indicate similar, but not necessarily identical elements. While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the scope of the invention as defined by the appended claims.

DETAILED DESCRIPTION OF THE PREFERRED EMBODIMENTS

Illustrative embodiments and aspects of the invention are described below. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

The present invention contemplates methods and apparatus that use an effective tool model in the processing of sonic logging data. The principles of the present invention are also applicable to LWD operations. As discussed above, Stoneley dispersion is affected by the presence of a tool (or drilling) structure in the borehole as well as any other near-wellbore alterations. The principles of the present invention may include obtaining radial variation of the shear modulus $c_{66}$ (or equivalently, horizontal shear slowness) and estimating far-field shear slowness outside any possible near-wellbore altered annulus. The principles of the present invention also account for tool bias on the measured Stoneley dispersion. The shear modulus $c_{66}$ in the undisturbed formation may be used for AVO (amplitude versus offset) analysis. The radial extent of near-wellbore alteration can also be estimated in terms of radial variation of the shear modulus $c_{66}$ that can have applications in an optimal completion design for production as well as in determining a productivity index.

As used throughout the specification and claims, the terms "borehole" or "downhole" refer to a subterranean environment, particularly in a wellbore. A "tool" refers to an acoustic or sonic logging tool and components, or to logging equipment associated with LWD operations. The words "including" and "having," as used in the specification, including the claims, have the same meaning as the word "comprising."

Sedimentary rocks frequently possess an anisotropic structure resulting, for example, from thin bedding, fine scale layering, the presence of oriented microcracks or fractures of the preferred orientation of nonspherical grains, or anisotropic minerals. This type of anisotropy is called formation intrinsic anisotropy. A dipole dispersion crossover is an indicator of stress-induced anisotropy dominating any intrinsic anisotropy that may also be present (see, for instance, U.S. Pat. No. 5,398,215 entitled "Identification of Stress Induced Anisotropy in Formations", hereby incorporated by reference).

As illustrated in FIG. 1, in an orthorhombic formation, the $X_3$-axis is assigned to be parallel to the borehole axis. The elastic constants, in reference to the borehole axes, take the form:

$$C = \begin{bmatrix} c_{11} & c_{12} & c_{13} & 0 & 0 & 0 \\ c_{12} & c_{22} & c_{23} & 0 & 0 & 0 \\ c_{13} & c_{23} & c_{33} & 0 & 0 & 0 \\ 0 & 0 & 0 & c_{44} & 0 & 0 \\ 0 & 0 & 0 & 0 & c_{55} & 0 \\ 0 & 0 & 0 & 0 & 0 & c_{66} \end{bmatrix}, \quad (1)$$

where the nine independent elastic moduli are $c_{11}$, $c_{12}$, $c_{13}$, $c_{22}$, $c_{23}$, $c_{33}$, $c_{44}$, $c_{55}$, and $c_{66}$.

Accurate and quantitative radial profiles of the three shear slownesses characterized by the shear moduli $c_{44}$, $c_{55}$, and $c_{66}$ in the three orthogonal coordinate planes are useful for the evaluation of formations for the presence and/or producibility of hydrocarbons. While methods and apparatus for obtaining the radial profiles of vertical shear moduli $c_{44}$ and $c_{55}$ using cross-dipole dispersions are described in the U.S. Pat. No. 6,611,761, the present invention provides methods and apparatus that address the need for radial profiles of $c_{66}$ and the associated shear slowness. FIG. 1 illustrates a schematic diagram of vertical and horizontal sections of a well together with the principal measurement axes $X_1$, $X_2$, and $X_3$ or orthogonal coordinate planes. $c_{44}$ and $c_{55}$ are the shear moduli that can be obtained from dipole shear logging in the borehole, whereas the shear modulus $c_{66}$ can be obtained from the monopole Stoneley logging in the same borehole.

Formations with two orthogonal fracture systems, or those subject to triaxial stresses (where the overburden $S_V$, maximum horizontal $S_{hmax}$, and minimum horizontal $S_{hmin}$ stresses are different), exhibit such an orthorhombic symmetry.

In the case of a TI-formation with its symmetric $X_3$-axis parallel to the borehole axis, $c_{11}=c_{22}$; $c_{13}=c_{23}$; $c_{44}=c_{55}$; and $c_{66}=(c_{11}-c_{12})/2$. Consequently, the number of independent elastic constants for a TI-formation reduces to five. Examples of TI-formations are those observed in prestressed formations where the horizontal stresses are the same and the overburden stress is different; or shaly formations with micro-layerings parallel to the $X_1$-$X_2$ plane.

The three shear moduli $c_{44}$, $c_{55}$, and $c_{66}$ in the undisturbed formation outside any near-wellbore altered annulus can be used to classify formation effective anisotropy as well as to estimate relative magnitudes of principal stresses. For example, the three anisotropic shear moduli can help identify: (1) Isotropic formations—characterized by $c_{44}=c_{55}=c_{66}$; (2) TIV formations (TI formations with vertical axis of symmetry)—characterized by $c_{44}=c_{55}\neq c_{66}$ ($X_3$-symmetry axis); (3) HTI formations (TI formations with horizontal axis of symmetry)—characterized by $c_{44}\neq c_{55}=c_{66}$ ($X_1$-symmetry axis); and (4) Orthorhombic formations—characterized by $c_{44}\neq c_{55}\neq c_{66}$. These shear moduli, together with associated formation anisotropy, are useful indicators of the existing formation fractures, layerings, and relative magnitudes of formation principal stresses. For instance, a TIV formation anisotropy in a vertical wellbore can be an indicator of horizontal fractures and layerings or formation stresses characterized by: $S_{Hmax}=S_{hmin}\neq S_V$, where $S_{Hmax}$, $S_{hmin}$, and $S_V$ are the maximum horizontal, minimum horizontal, and vertical stresses. Similarly, an HTI formation anisotropy in a vertical wellbore can be an indicator of vertical fractures and layerings or formation stresses characterized by: $S_V=S_{Hmax}\neq S_{hmin}$. An isotropic formation can be an indicator of isotropic formation stresses $S_V=S_{Hmax}=S_{hmin}$.

In contrast, an orthorhombic formation can be an indicator of two orthogonal fracture systems or formation stresses characterized by $S_V \neq S_{Hmax} \neq S_{hmin}$. In addition, an orthorhombic formation can be an indicator of aligned fractures or formation stresses obliquely oriented with respect to the borehole axes. The tangential compliance of a fractured formation and stress parameters of a prestressed formation can also be estimated from the three shear moduli. These moduli are also needed in the AVO analysis of seismic surveys of anisotropic formations.

According to principles of the present invention, procedures and apparatus are described for obtaining radial profiles of horizontal shear slowness and estimating a horizontal shear modulus $c_{66}$ outside any near-wellbore altered annulus. Therefore, the limitations of the prior art related to the estimation of horizontal shear modulus $c_{66}$ in the far-field of an orthorhombic or TI-formation with the TI-symmetry $X_3$-axis parallel to the borehole are reduced or overcome. The far-field shear modulus $c_{66}$ can be appropriately used in characterizing the formation orthorhombic or TI-anisotropy for subsequent application in the AVO-analysis.

Figure 2:
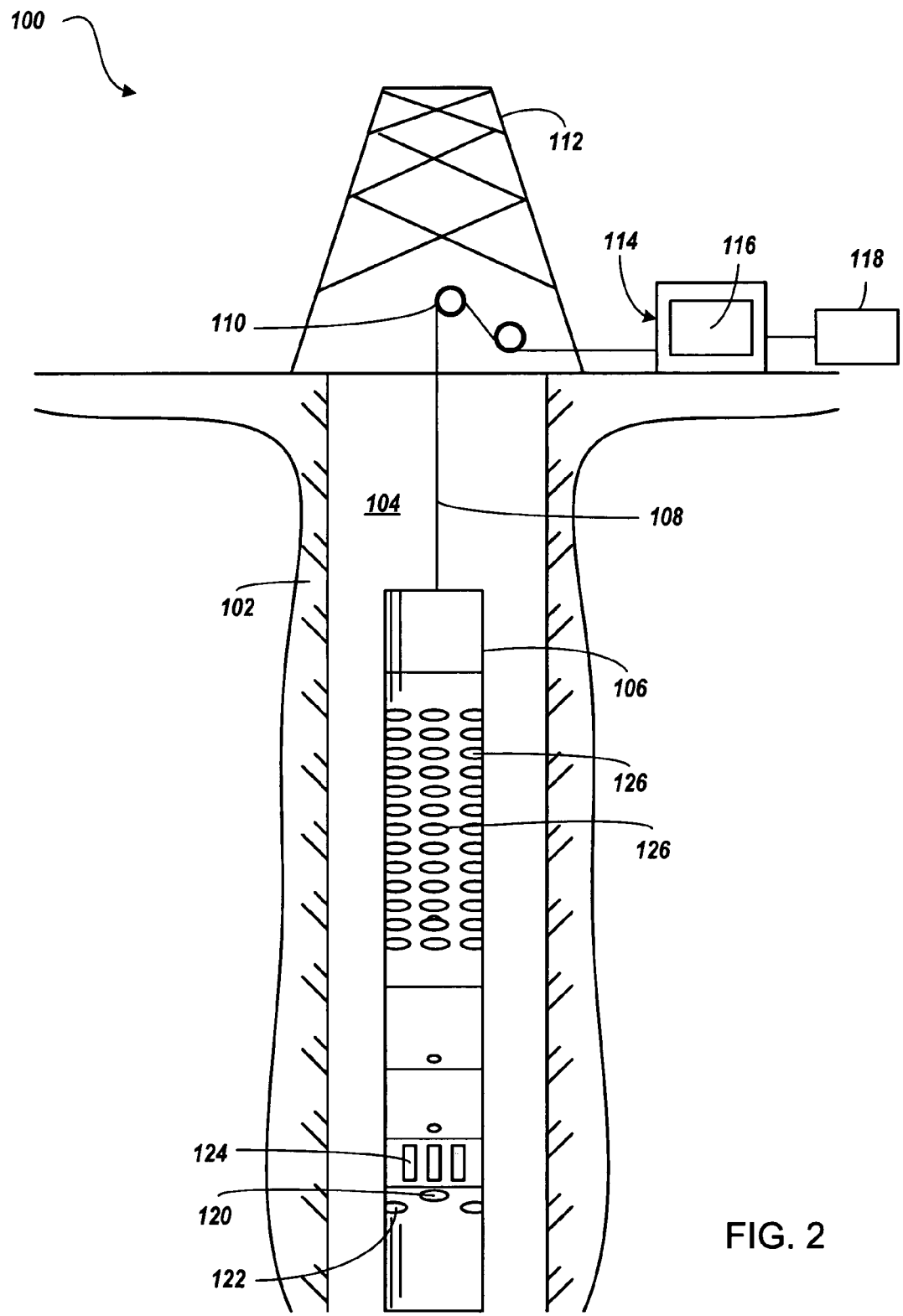
FIG. 2 is a diagram, partially in block form, of an apparatus that can be used to practice principles of the present invention.

Turning next to FIG. 2 a logging system 100 is shown that may be used according to embodiments of the invention. A subsurface formation 102 is traversed by a borehole 104 which may be filled with drilling fluid or mud. A logging tool 106 is suspended from an armored cable 108 and may have optional centralizers (not shown). The cable 108 extends from the borehole over a sheave wheel 110 on a derrick 112 to a winch forming part of surface equipment 114. Well known depth gauging equipment (not shown) may be provided to measure cable displacement over the sheave wheel 110. The tool 106 may include any of many well known devices to produce a signal indicating tool orientation. Processing and interface circuitry within the tool 106 amplifies, samples and digitizes the tool's information signals for transmission and communicates them to the surface equipment 114 via the cable 108. Electrical power and control signals for coordinating operation of the tool 106 are generated by the surface equipment 114 and communicated via the cable 108 to circuitry provided within the tool 106. The surface equipment includes a processor subsystem 116 (which may include a microprocessor, memory, clock and timing, and input/output functions—not separately shown), standard peripheral equipment (not separately shown), and a recorder 118.

The logging device 106 may be, for example, an MSIP logging tool. It will be understood by those of skill in the art having the benefit of this disclosure, however, that any suitable logging device, including an LWD device, can also be utilized.

Figure 3:
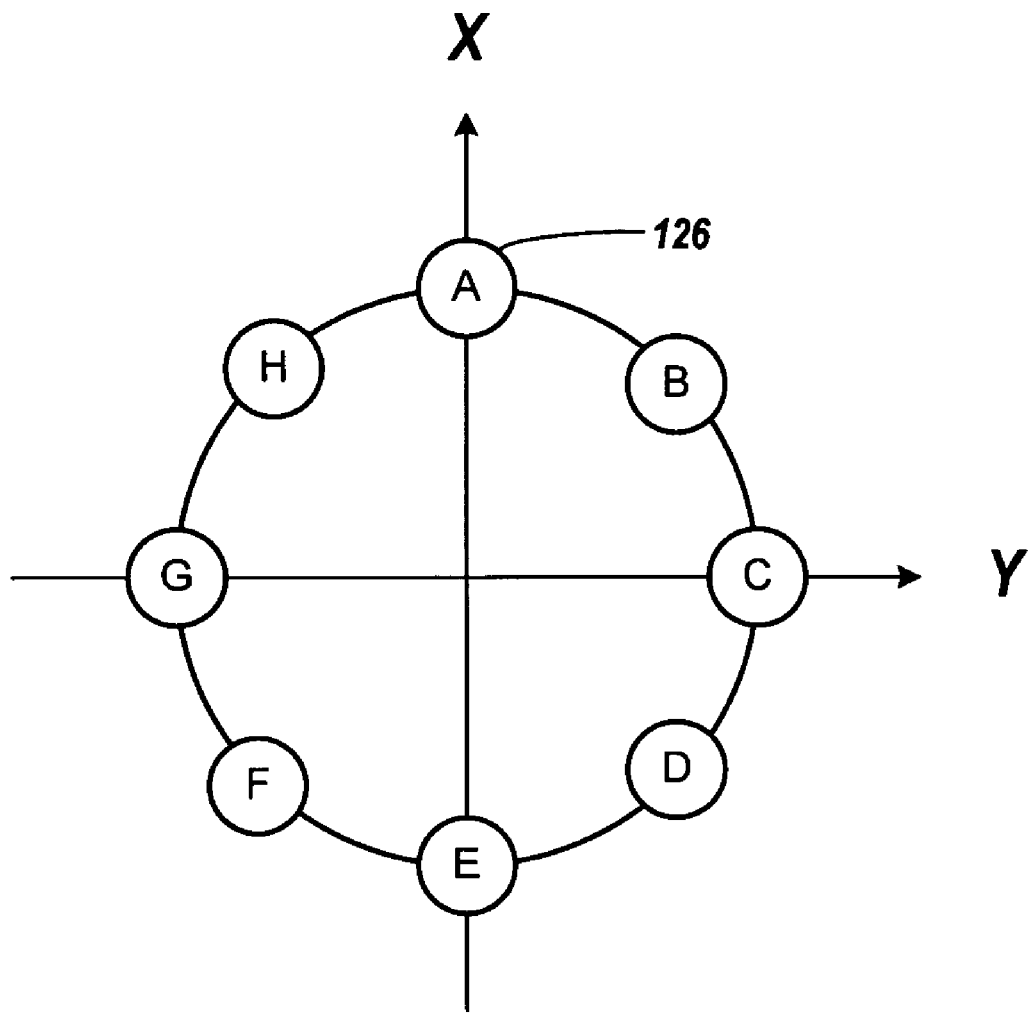
FIG. 3 is a cross sectional view of the tool illustrated in FIG. 2 showing the placement of hydrophones that can be used at a receiver station according to one embodiment of the present invention.

The logging tool 106 includes multi-pole transmitters such as crossed dipole transmitters 120, 122 (only one end of dipole 120 is visible in FIG. 2) and a monopole transmitter 124, capable of exciting compressional, shear, Stoneley, and flexural waves. A plurality of receivers is arranged on the logging tool spaced from the transmitters. For example, FIG. 2 shows thirteen spaced receiver stations, each receiver station comprising multiple receiver hydrophones 126 mounted azimuthally at regular intervals around the circumference of the tool 106. According to some embodiments, there may be eight receiver hydrophones 126 spaced at forty-five degree intervals around the tool 106 as shown in FIG. 3. The eight receiver hydrophones 126 are shown at locations A-H. According to the embodiment of FIG. 3, in an X-Y plane, an X-dipole component of a received signal may be obtained by subtracting the signals received at A and E (i.e., A-E), and a Y-dipole component can be obtained by subtracting the signals received at C and G (i.e., C-G). The other receivers may also be used to obtain X and Y-dipole components. With eight receivers 126 at each receiver station as shown in FIG. 2, there are a total of one-hundred and four receiver elements. The receiver stations are also configurable for monopole reception. Other configurations, such as a DSI tool with four receivers at each of eight receiver stations, are also possible.

The transmitter electronics contain a power amplifier and switching circuitry capable of driving the two crossed-dipole transmitter elements and the monopole element from a programmable waveform. Separate waveforms with appropriate shape and frequency content can be used for dipole, Stoneley and compressional measurements. The receiver electronics processes the signals from the thirty-two individual receiver elements located at the eight receiver stations, which are spaced six inches apart. At each station, four receivers 126 are mounted as shown in FIG. 3 which allows measurement of the dipole and crossed-dipole waveforms by calculating the difference between outputs from opposite receivers, as previously described. A monopole signal can be produced by summing the outputs of the receivers 126. As further described in Harrison et al., supra, the receiver electronics multiplexes, filters, amplifies, and channels the signals from the thirty-two receiver elements to eight parallel signal paths. These eight parallel analog signals are passed to an acquisition electronics cartridge where eight 12-bit analog-to-digital converters digitize the signals from the receiver electronics. A telemetry circuit passes the digitized information to the earth's surface via the cable 108.

Figure 4:
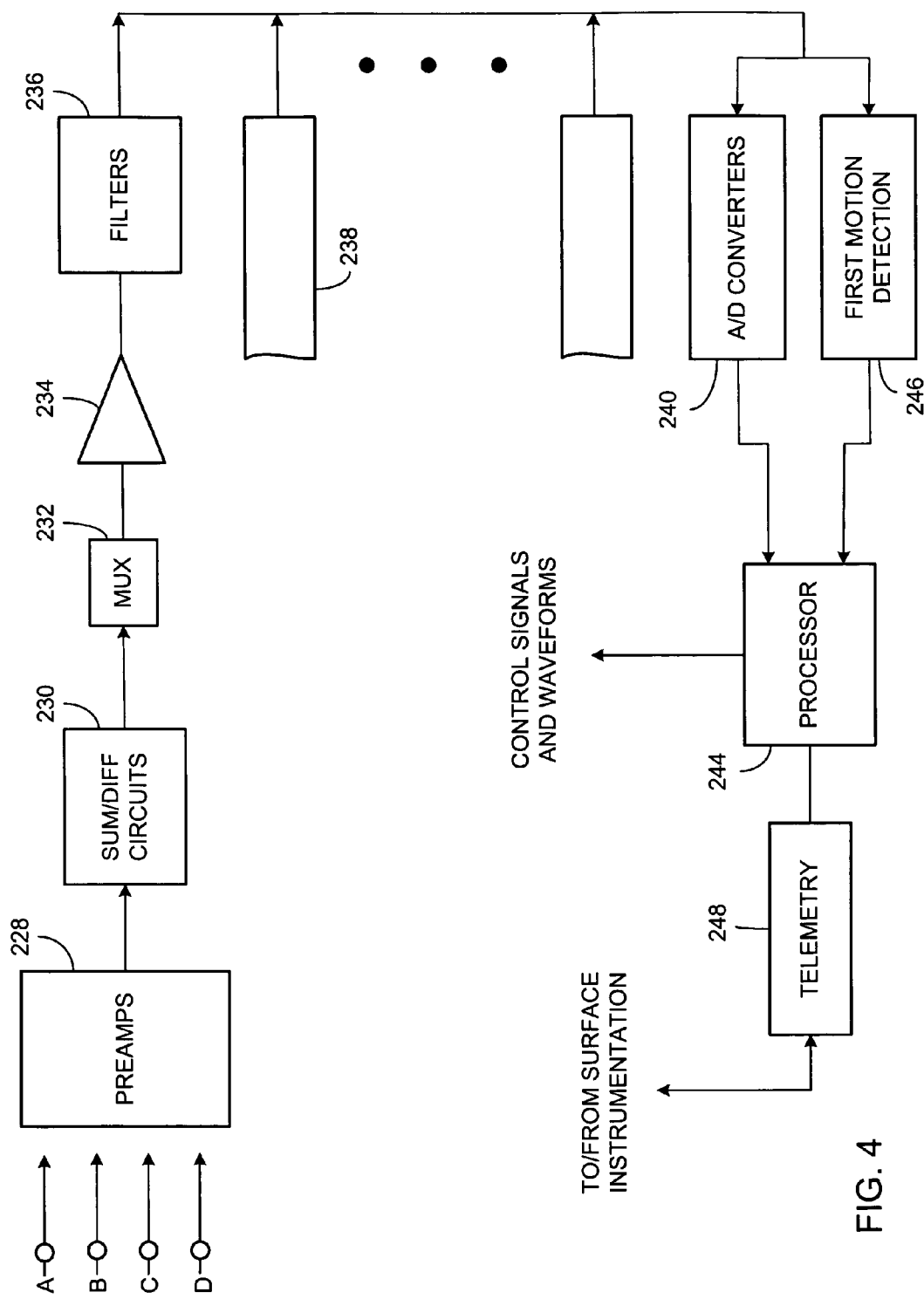
FIG. 4 is a block diagram of a portion of the electronics of the apparatus shown in FIG. 2.

FIG. 4 illustrates an example of an acquisition signal path in block diagram form for one of the eight (or other suitable number of) receiver stations, as described in Harrison et al., supra. Each receiver 126 (FIG. 2) has its own charge preamplifier (represented at 228). The odd numbered receiver pairs are aligned with the upper dipole transmitter 120 (FIG. 2), and even numbered receiver pairs are aligned with the lower dipole transmitter 122 (FIG. 2). The output of the receivers 126 (FIG. 1) passes into both a summing circuit (for monopole measurements) and a differencing circuit (for dipole measurements), as represented at 230. Under software control, the sum or difference is selected by a multiplexer stage 232 and the signal is passed to one of eight programmable gain amplifier stages 234 and filters 236. Other similar channels are represented by block 238. The eight parallel analog signals are passed to eight parallel 12-bit A/D converters 240, where simultaneous waveform digitization is performed. After the signals are digitized, the eight waveforms are passed to a memory module associated with a downhole processor 244. The processor 244 provides control signals and waveforms to the transmitter and receiver electronics. An alternate path directs the eight analog receiver signals into threshold crossing detection circuitry or digital first motion detection, as represented at block 246. This first motion detection circuitry detects the time of all up or down going threshold crossings. The digitized waveform data and the threshold crossing time data are passed to the surface using telemetry circuitry 248. One of ordinary skill in the art having the benefit of this disclosure will understand that more advanced tool implementations, including those with additional transmitters, receivers, and/or longer transmitter-to-receiver (T/R) spacings, and more powerful processing capabilities, can be used consistent with the principles described herein.

According to principles described herein, the sonic tool structure is represented by a model, for example a resonance-impedance model, to account for sonic tool bias. The resonance-impedance model accounts for Stoneley dispersion across a wide range of borehole diameters and formation slownesses. The resonance-impedance model may represent the tool structure by an equivalent surface impedance placed concentrically with the borehole axis. The surface impedance may be imposed at the actual tool diameter. The tool compressibility may be described by a frequency-dependent complex function that simulates the observed fluid-resonance in the vicinity of receiver mounts and associated attenuation with the borehole Stoneley mode in a variety of formations. The resonance-impedance model tool parameters may be obtained by calibrating the model predictions with measured Stoneley dispersions in a test well of known parameters. A further simplification of the equivalent structure with a frequency-dependent compressibility leads to a column with an appropriate surface impedance condition at the interface between the tool and borehole fluid. This equivalent structure can be introduced into an open hole and the fundamental eigenmodes associated with the lowest-order axisymmetric Stoneley mode of the composite structure can be calculated using a mode-search routine. These eigenmodes constitute the reference solution for a chosen homogeneous and isotropic formation. The kernels in the perturbation integral used in the Stoneley radial profiling (SRP) algorithm are then computed in terms of these eigenmodes. The sonic tool bias is generally small in large-diameter holes and slow formations. However, the tool bias can be significant in small-diameter holes and fast formations. Radial depths of investigation of data kernel for borehole Stoneley modes in the presence of a tool structure are, generally, larger than that for an empty borehole. The magnitude of data kernel is a measure of sensitivity of Stoneley dispersions to changes in the formation horizontal shear modulus c66 of a TIV-formation. The sensitivity of borehole Stoneley dispersion to formation horizontal shear slowness in the presence of a tool structure is, generally, larger at low frequencies and smaller at high frequencies than those for an empty borehole. Radial profile of the horizontal shear slowness enables an estimate of c66 outside any near-wellbore altered annulus for subsequent application in the AVO analysis.

According to one aspect of the invention, a Backus-Gilbert (B-G) inversion technique is used to finding the horizontal radial profile of horizontal shear slowness (or equivalently, horizontal shear velocity) radial profile from a set of discrete points on the measured Stoneley dispersion curve in the presence of an equivalent column with a surface-impedance condition and placed concentric with the borehole axis. Given perturbations in the formation material properties or shear modulus, a theoretical model predicts the corresponding changes in the Stoneley velocity dispersions. From synthetically generated (or measured) Stoneley wave velocities at a few discrete frequencies, a reasonable initial guess of the formation horizontal shear slowness can be made. In addition, one may take the far-field compressional slowness, formation mass density, borehole diameter, mud compressional slowness, and mass density to define the initial parameters that define the 'unperturbed' or 'reference' state, which is used to calculate the Stoneley mode solution for a homogeneous and equivalent isotropic reference state in the presence of an equivalent column with a prescribed surface-impedance condition representing the detailed MSIP tool structure. The surface-impedance column radius used in this embodiment may be the same as the MSIP tool radius. Differences between the actual (or measured) and the reference velocities at several axial wavenumbers constitute the input data to the inversion procedure. The eigensolution associated with the resonance-impedance model is used as the reference solution to calculate the kernels in the perturbation integral that relate fractional changes in the equivalent isotropic shear modulus to fractional changes in the Stoneley velocities at various wavenumbers. The sum of the inverted perturbation and the background profile yields the actual formation property profile. The detailed description below includes an outline of the Backus-Gilbert (B-G) methodology for accurate, and then for inaccurate, data. Next, a perturbation model is briefly described, which yields the 'data kernels' used in applying the B-G technique. Third, cylindrical equations of motion for a fluid and a solid medium are presented. Subsequently, a procedure is described for obtaining the modal dispersion as well as modal amplitude distributions that constitute the eigensolution in the chosen reference state. Fourth, a theoretical validation of the Stoneley Radial Profiling of horizontal shear slowness algorithm using synthetic Stoneley dispersions for a radially homogeneous; radially decreasing; and radially increasing shear slownesses from the borehole surface is presented. Next the results are applied to the measured Stoneley dispersion obtained from known well data. The B-G inversion technique is applied again to the same set of field data assuming an empty borehole. Comparison with the inappropriate empty borehole model in such fast formations may be made to study differences in the radial profiles of horizontal shear slowness obtained in the two cases.

B-G Inverse Theory

Supposing perturbation data of the form:

$$\gamma_i = \frac{\Delta V_i}{V_i} = \int_l^\infty G_i(r) \frac{\Delta \mu(r)}{\mu} r \, dr, \text{ for } i = 1, \ldots, N, \quad (1)$$

where i denotes the axial wavenumber, $G_i(r)$ is known in terms of the eigensolution in the reference state, and $\gamma_i$ denotes the difference between the measured and reference Stoneley slownesses at the selected wavenumber.

It is required to estimate $\Delta \mu(r)/\mu$ assuming that (1) represents all the information known, except for some estimates of the errors in the $\Delta V_i/V_i$. Although $\Delta \mu(r)/\mu$ cannot be found pointwise, certain spatial averages of it can be found in the form:

$$\int_l^\infty A(r) \frac{\Delta \mu(r)}{\mu} \, dr, \text{ where } \int_l^\infty A(r) \, dr = 1, \quad (2)$$

and A(r) is a linear combination, $$A(r) = \sum_{i=1}^N a_i G_i(r), \quad (3)$$

of the data kernels $G_i(r)$. Backus and Gilbert (1970) suggest that by suitable choice of the coefficients $a=(a_1, \ldots, a_N)^T$ one may concentrate A(r) near any desired point $r_0$ by minimizing the spread:

$$S(r_0, A) = \int_l^\infty (r - r_0)^2 A^2(r) \, dr \quad (4)$$

In terms of a condition (2) becomes:

$$\sum_{i=1}^{N} a_i u_i = 1, \text{ where } u_i = \int_{l}^{\infty} G_i(r) \, dr. \quad (5)$$

and the spread becomes:

$$S(r_0, A) = \sum_{i,j} S_{ij}(r_o) a_i a_j, \quad (6)$$

$$S_{ij}(r_0) = \int_{l}^{\infty} (r - r_0)^2 G_i(r) G_j(r) \, dr$$

From (5), (6), this problem is identified as the classical type:

$$\text{minimize } \sum_{i=1}^{N} S_{ij}(r_0) a_i u_i = 1 \text{ subject to } \sum u_i a_i = 1 \quad (7)$$

or, in matrix notation:

$$\text{minimize } a^T S(r_0) a \text{ subject to } u^T a = 1 \quad (8)$$

Geometrically, as s varies at $a^T S(r_0) a$ represents a family of concentric multidimensional ellipsoids, and $u^T a = 1$ a hyperplane in the space of vectors a. The solution, obtained from $S(r_0)a = \lambda u$, and $u^T a = 1$ where $\lambda$ is a Lagrange multiplier, is:

$$a = a(r_0) = \frac{1}{u^T S^{-1}(r_0) u} S^{-1}(r_0) u \quad (9)$$

The spread $s_{min}(r_0)$ at $a(r_0)$ is given by:

$$s_{min}(r_0) = a(r_0)^T S(r_0) a(r_0) = (u^T S^{-1}(r_0) u)^{-1} \quad (10)$$

and $s_{min}(r_0)$ can be shown to be a true minimum. Finally, again writing $\gamma$ for the vector $(\Delta V_1/V_1, \ldots, \Delta V_N/V_N)^T$, one arrives at:

$$a(r_0) = \frac{u^T S^{-1}(r_0) \gamma}{u^T S^{-1}(r_0) u} \quad (11)$$

This is the average value of $\Delta \mu / \mu$ which is most localized around $r_0$. Notice that from (6) and (9) $a(r_0)$ and $s_{min}(r_0)$ are independent of $\Delta V_i/V_i$.

For inaccurate data, assume that the data $$\gamma_i = \frac{\Delta V_i}{V_i}$$

is subject to errors $\Delta \gamma_i$, that mean values $\bar{\gamma}_i$ of the $\gamma_i$ are the true values, and that:

$$\gamma_i = \bar{\gamma}_i + \Delta \gamma_i, \overline{\Delta \gamma_i} = 0 \; i = 1, \ldots, N \quad (12)$$

Assuming that after some analysis of the data, the covariance matrix E of the $\Delta \gamma_i$ is known:

$$E_{ij} = \overline{\Delta \gamma_i \Delta \gamma_j} \; i, j = 1, \ldots, N \quad (13)$$

From (11), $a(r_0)$ is linear in the $\gamma_i$. Therefore:

$$\overline{a(r_0)} = \frac{u^T S^{-1}(r_0) \gamma}{u^T S^{-1}(r_0) u} = a^T(r_0) \bar{\gamma} \quad (14)$$

Upon writing:

$$a(r_0) = \overline{a(r_0)} = \Delta a(r_0), \quad (15)$$

e is defined by:

$$e \equiv \overline{[\Delta a(r_0)]^2} = a^T(r_0) E a(r_0) \quad (16)$$

which may be interpreted as a measure of the error committed in estimating $a(r_0)$ from the $\gamma_i$. If s is minimized, e may be unacceptably large, and if e is minimized, s may be unacceptably large. Backus and Gilbert show that there is a trade-off between e and s, and that this leads to the problem of minimizing:

$$a^T E a + \alpha a^T S a, \text{ with } u^T a = 1, \quad (17)$$

where $\alpha$ is another Lagrange multiplier. If $\alpha$ is regarded as a parameter, this is a problem of the kind already solved with $S(r_0)$ replaced by $E + \alpha S(r_0)$. Thus defining:

$$W(\alpha, r_0) = E + \alpha S(r_0), \quad (18)$$

the e versus s trade-off parametrized by $\alpha$ is:

$$a(\alpha, r_0) = \frac{W(\alpha, r_0)^{-1} u}{u^T W(\alpha, r_0)^{-1} u},$$
$$s(\alpha, r_0) = a^T(\alpha, r_0) S(r_0) a(\alpha, r_0), \quad (19)$$
$$e(\alpha, r_0) = a^T(\alpha, r_0) E a(\alpha, r_0),$$

Perturbation Equations for Normal Modes

Turning next to the problem of finding the $G_i$ for a system comprising a fluid-filled right-circular cylindrical borehole within an isotropic elastic half-space, according to one aspect of the invention, Sinha (known to those of skill in the art having the benefit of this disclosure in "*Sensitivity and inversion of borehole flexural dispersions for formation parameters*," Geophysical Journal International, vol. 128, pp. 84-96, 1997) may be followed using normal mode theory in combination with Hamilton's principle to obtain the necessary perturbation equations. Let x be the position vector and t the time. In addition, let the z axis run along the axis of the borehole. The other two coordinates will be either Cartesian x, y or cylindrical r, $\phi$ orthogonal to z. The mass densities of the solid and of the fluid are denoted by $\rho$ and $\rho_f$, respectively, and the Lamé parameters of the solid by $\lambda$ and $\mu$, and the bulk modulus of the fluid by $\kappa$. In general let $\mu_k$, $k=1, \ldots, K$ denote any of the elastic constants. Let the displacement and velocity fields u and v belong to a normal mode of vibration and have the forms:

$$u = \hat{u}(\mu, \omega; x) \sin[\omega(t - t_0)], v = \hat{v}(\mu, \omega; x) \cos[\omega(t - t_0)]. \quad (20)$$

The kinetic energy $\tau$ may be expressed as:

$$\tau = 2\int_D T \, dx \sin^2[\omega(t-t_0)], \qquad (21)$$

$$= \int_D \frac{1}{2}\omega^2 \rho |\hat{u}|^2 \, dx \sin^2[\omega(t-t_0)].$$

and the potential (strain) energy $\nu$ as:

$$\nu = 2\int_D V \, dx \cos^2[\omega(t-t_0)], \qquad (22)$$

where $\tau$ and $\nu$ are the kinetic- and strain-energy densities, respectively, time averaged over a period. (The functions $\sin^2$ and $\cos^2$ average to ½ over each quarter period.) The Lagrangian £ is defined to be $\tau-\nu$, and the corresponding density $L=\tau-\nu$. Then Hamilton's principle states that $$\int_{t_1}^{t_2} \pounds \, dt$$

is stationary for variations of the displacement field, which leave the initial ($t=t_1$) and final ($t=t_2$) states unperturbed. This leads to:

$$\frac{\Delta T}{\Delta u} - \frac{\Delta V}{\Delta u} = 0 \qquad (23)$$

in the absence of any surface integrals that vanish in view of the boundary conditions imposed on the eigensolution in the reference (or unperturbed) state. On the other hand, the theory of normal modes implies that:

$$\frac{1}{P}\int_0^P \pounds \, dt = 0, \qquad (24)$$

where P is a period. This leads to:

$$\int_D T \, dx = \int_D V \, dx. \qquad (25)$$

But T depends explicitly on $\omega$ and $\rho$ only through the factor $\omega^2 \rho$, and V is a sum of terms $V_k$, where $V_k$ depends upon $\mu_k$ only through the factor $\mu_k$. It follows, by varying the quantities $\omega$, $\rho$, the $\mu_k$, and u in (25) that u always remains a normal mode with frequency $\omega$, that:

$$\int_D \left(\frac{2\Delta\omega}{\omega} + \frac{\Delta\rho}{\rho}\right)T + \frac{\Delta T}{\Delta u}\Delta u \, dx \qquad (26)$$

-continued $$= \sum_{k=1}^K \int_D \frac{\Delta\mu_k}{\mu_k} V_k + \frac{\Delta V}{\Delta u}\Delta u \, dx.$$

But on using (23), (24), and the fact that $\omega$ is independent of x, we see that:

$$\frac{\Delta\omega}{\omega} = \frac{-\int_D \frac{\Delta\rho}{\rho} T \, dx + \sum_{k=1}^K \int_D \frac{\Delta\mu_k}{\mu_k} V_k \, dx}{2\int_D T \, dx}. \qquad (27)$$

For the problem at hand, and guided by the Sinha-Kostek-Norris ("*Stoneley and flexural modes in pressurized boreholes*," J. Geophys. Res., vol. 100, pp. 22,375-22,381, 1995) an alteration model is known to those of skill in the art having the benefit of this disclosure, where only the shear modulus $\mu$ is perturbed away from its background uniform value. The unperturbed solution is the Stoneley mode of wave propagation guided by the borehole. Then:

$$\frac{\Delta\omega}{\omega} = \frac{I_\mu}{2I_0} \text{ where} \qquad (28)$$

$$I_\mu = \int_D \frac{\Delta\mu}{\mu} V_\mu dx, \quad I_0 = \int_D T \, dx \text{ with} \qquad (29)$$

$$V_\mu = \frac{1}{2}\mu(e_{r\phi}e_{r\phi}^* + e_{\phi z}e_{\phi z}^* + e_{zr}e_{zr}^*) + \qquad (30)$$

$$\frac{1}{3}\mu[(e_{zz}-e_{rr})(e_{zz}^*-e_{rr}^*) + (e_{rr}-e_{\phi\phi})(e_{rr}^*-e_{\phi\phi}^*) +$$

$$(e_{\phi\phi}-e_{zz})(e_{\phi\phi}^*-e_{zz}^*)],$$

$$T = \frac{1}{2}\omega^2\rho(u_r r_r^* + u_\phi u_\phi^* + u_z u_z^*)$$

At a given wavenumber $k_i$, $$\frac{\Delta\omega_i}{\omega_i} = \frac{\Delta V_i}{V_i} = \int_a^\infty G_i(r)\frac{\Delta\mu(r)}{\mu(r)} r \, dr, \text{ for} \qquad (31)$$

$i = 1, \ldots, N$, where $$G_i(r) = \frac{N_i(r)}{D_i}, \qquad (32)$$

$$N_i(r) = \frac{1}{2}\mu(e_{r\phi}e_{r\phi}^* + e_{\phi x}e_{\phi x}^* + e_{xr}e_{xr}^*) +$$

$$\frac{1}{3}\mu\{(e_{xx}-e_{rr})(e_{xx}^*-e_{rr}^*) + (e_{rr}-e_{\phi\phi})(e_{rr}^*-e_{\phi\phi}^*) +$$

$$(e_{\phi\phi}-e_{xx})(e_{\phi\phi}^*-e_{xx}^*)\}, \qquad (33)$$

$$D_i = \omega^2\left[\int_0^a \rho f(u_r^f u_r^{f*} + u_x^f u_x^{f*}) r \, dr\right] + \qquad (34)$$

$$\omega^2\left[\int_a^\infty \rho_b(u_r u_r^* + u_\phi u_\phi^* + u_x u_x^*) r \, dr\right],$$

where $\rho_b$ and $\rho_f$ are the formation and borehole liquid mass densities, respectively. $u_r^f$ and $u_z^f$ are the displacement components in the borehole liquid, and $u_r$, $u_\phi$, and $u_z$ are the corresponding displacement components in the formation. These displacement components are obtained from the eigensolution of the Stoneley mode at a given wavenumber. Note that, $u_\phi=0$, for the axi-symmetric borehole Stoneley mode. These displacement components are then used to compute all the dynamic strains $e_{rr}$, $e_{zz}$, $e_{r\phi}$, $e_{rz}$, and $e_{z\phi}$ that appear in equation (33).

Next the following integrals are defined, which are needed in Eq. (6) for defining the spread function $S_{ij}(r_0)$:

$$S_{ij}^1 = \int_a^\infty r^2 G_i(r) G_j(r) dr,$$

$$S_{ij}^2 = \int_a^\infty r G_i(r) G_j(r) dr,$$  (35)

$$S_{ij}^3 = \int_a^\infty G_i(r) G_j(r) dr.$$

where i,j=1, 2, . . . N, and N is the number of wavenumber points on the measured dispersion.

The quantities $u_i$ (as defined in Eq. (5)), $S_{ij}^1$, $S_{ij}^2$, and $S_{ij}^3$ (as defined in Eq. (35)) are computed in the fortran code together with the borehole Stoneley dispersion in the chosen reference state.

Equations of Motion for a Resonance-Impedance Model

Below is a brief review of the equations of motion for a cylindrical structure, which are the building blocks of the resonance-impedance model for the acoustic tool in an openhole. Subsequently, the results are specialized for the lowest axi-symmetric Stoneley mode.

Figure 5:
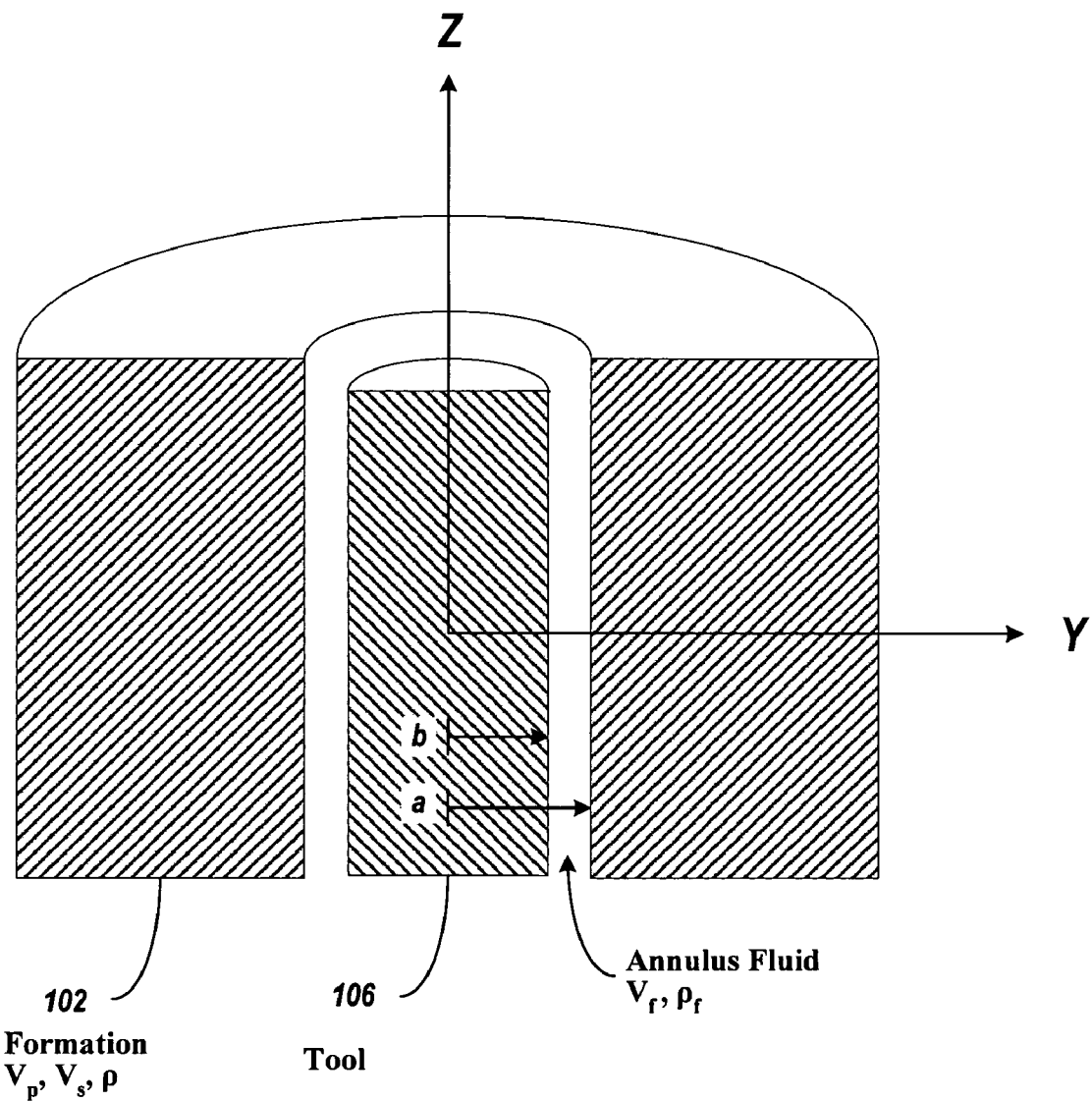
FIG. 5 is a schematic diagram of a Resonance-Impedance Model (RIM) of an acoustic tool for simulating Stoneley waves in a fluid-filled borehole of radius a according to principles of the present invention.

When referring to the coordinate system shown in FIG. 5, the equations of motion for harmonic waves in cylindrical structures may be given by:

$$\rho \ddot{u}_r = \frac{\partial \tau_{rr}}{\partial r} + \frac{1}{r}\frac{\partial \tau_{r\theta}}{\partial \theta} + \frac{\partial \tau_{rz}}{\partial z} + \frac{\tau_{rr} - \tau_{\theta\theta}}{r},$$

$$\rho \ddot{u}_\theta = \frac{1}{r}\frac{\partial \tau_{\theta\theta}}{\partial \theta} + \frac{\partial \tau_{z\theta}}{\partial z} + \frac{\partial \tau_{r\theta}}{\partial r} + 2\frac{\tau_{r\theta}}{r},$$  (36)

$$\rho \ddot{u}_z = \frac{\partial \tau_{rz}}{\partial r} + \frac{1}{r}\frac{\partial \tau_{z\theta}}{\partial \theta} + \frac{\partial \tau_{zz}}{\partial z} + \frac{\tau_{rz}}{r},$$

where $\tau_{rr}$, $\tau_{\theta\theta}$, $\tau_{zz}$, $\tau_{rz}$, $\tau_{r\theta}$, and $\tau_{z\theta}$ are the stress components $u_r$, $u_\theta$ and $u_z$ are the displacement components and $\rho$ is the mass density of the material of the cylindrical structure at hand.

The constitutive relations for a homogeneous, elastic and isotropic material are:

$$\tau_{rr}=\lambda\Delta+2\mu\epsilon_{rr},\ \tau_{\theta\theta}=\lambda\Delta+2\mu\epsilon_{\theta\theta},\ \tau_{zz}=\lambda\Delta+2\mu\epsilon_{zz},$$
$$\tau_{r\theta}=2\mu\epsilon_{r\theta},\ \tau_{z\theta}=2\mu\epsilon_{z\theta},\ \tau_{rz}=2\mu\epsilon_{rz},$$  (37)

where $\Delta=\partial u_r/\partial r+u_r/r+(1/r)\partial u_\theta/\partial\theta+\partial u_z/\partial Z$; $\epsilon_{rr}$; $\epsilon_{\theta\theta}$; $\epsilon_{r\theta}$, $\epsilon_{z\theta}$; and $\epsilon_{rz}$ are the strain components, and $\lambda$ and $\mu$ are the Lamé constants for the material of the cylindrical structure at hand.

The strain-displacement relations in cylindrical coordinates take the form:

$$\epsilon_{rr}=\frac{\partial u_r}{\partial r}, \quad \epsilon_{\theta\theta}=\frac{1}{r}\frac{\partial u_\theta}{\partial\theta}+\frac{u_r}{r},$$

$$\epsilon_{zz}=\frac{\partial u_z}{\partial z}, \quad \epsilon_{r\theta}=\frac{1}{2}\left[\frac{1}{r}\frac{\partial u_r}{\partial\theta}+\frac{\partial u_\theta}{\partial r}-\frac{u_\theta}{r}\right],$$  (38)

$$\epsilon_{z\theta}=\frac{1}{2}\left[\frac{1}{r}\frac{\partial u_z}{\partial\theta}+\frac{\partial u_\theta}{\partial z}\right], \quad \epsilon_{rz}=\frac{1}{2}\left[\frac{\partial u_z}{\partial r}+\frac{\partial u_r}{\partial z}\right].$$

An eigensolution to any linear elastodynamic problem can be expressed in terms of a scalar potential $\phi$ and a vector potential H $$u=\nabla\phi+\nabla\times H,$$  (39)

where $\nabla\cdot H$ is arbitrary, and $$V_1^2\nabla^2\phi=-\omega^2\phi,\ V_2^2\nabla^2 H=-\omega^2 H.$$  (40)

The displacement components in cylindrical coordinates can be expressed in terms of these scalar and vector potentials:

$$u_r = \frac{\partial\phi}{\partial r}+\frac{1}{r}\frac{\partial H_z}{\partial\theta}-\frac{\partial H_\theta}{\partial z},$$

$$u_\theta = \frac{1}{r}\frac{\partial\phi}{\partial\theta}+\frac{\partial H_r}{\partial z}-\frac{\partial H_z}{\partial z},$$  (41)

$$u_z = \frac{\partial\phi}{\partial z}+\frac{\partial H_\theta}{\partial r}+\frac{H_\theta}{r}-\frac{1}{r}\frac{\partial H_r}{\partial\theta}.$$

Substituting these displacement components into the constitutive relations and the stress equations of motion, we can write Eq. (93) in the following form in terms of the scalar potential Ø and the three components of vector potential H:

$$-\frac{\omega^2}{V_1^2}\phi = \frac{\partial^2\phi}{\partial r^2}+\frac{1}{r}\frac{\partial\phi}{\partial r}+\frac{1}{r^2}\frac{\partial^2\phi}{\partial\theta^2}+\frac{\partial^2\phi}{\partial z^2},$$

$$-\frac{\omega^2}{V_2^2}H_r = \frac{\partial^2 H_r}{\partial r^2}+\frac{1}{r}\frac{\partial H_r}{\partial r}+\frac{1}{r^2}\left(\frac{\partial^2 H_r}{\partial\theta^2}-2\frac{\partial H_\theta}{\partial\theta}-H_r\right)+\frac{\partial^2 H_r}{\partial z^2},$$  (42)

$$-\frac{\omega^2}{V_2^2}H_\theta = \frac{\partial^2 H_\theta}{\partial r^2}+\frac{1}{r}\frac{\partial H_\theta}{\partial r}+\frac{1}{r^2}\left(\frac{\partial^2 H_\theta}{\partial\theta^2}+2\frac{\partial H_r}{\partial\theta}-H_\theta\right)+\frac{\partial^2 H_\theta}{\partial z^2},$$

$$-\frac{\omega^2}{V_2^2}H_z = \frac{\partial^2 H_z}{\partial r^2}+\frac{1}{r}\frac{\partial H_z}{\partial r}+\frac{1}{r^2}\frac{\partial^2 H_z}{\partial\theta^2}+\frac{\partial^2 H_z}{\partial z^2}.$$

A solution of Eq. (42) may be written in the form:

$$\phi=f(r)\cos n\theta e^{i\zeta z},\ H_r=h_r(r)\sin n\theta e^{i\zeta z},\ H_\theta=h_\theta(r)\cos n\theta e^{i\zeta z},\ H_z=h_z(r)\sin n\theta e^{i\zeta z},$$  (43)

which satisfied Eq. (42) provided:

$$\frac{\partial^2 f}{\partial r^2}+\frac{1}{r}\frac{\partial f}{\partial r}+\left(\alpha^2-\frac{n^2}{r^2}\right)f = 0,$$  (44)

$$\frac{\partial^2 h_z}{\partial r^2}+\frac{1}{r}\frac{\partial h_z}{\partial r}+\left(\beta^2-\frac{n^2}{r^2}\right)h_z = 0,$$  (45)

$$\frac{\partial^2 h_r}{\partial r^2}+\frac{1}{r}\frac{\partial h_r}{\partial r}+\frac{1}{r^2}(-n^2 h_r+2nh_\theta-h_r)+\beta^2 h_r = 0,$$  (46)

$$\frac{\partial^2 h_\theta}{\partial r^2}+\frac{1}{r}\frac{\partial h_\theta}{\partial r}+\frac{1}{r^2}(-n^2 h_\theta+2nh_r-h_\theta)+\beta^2 h_\theta = 0,\ \text{where}$$  (47)

-continued $$\alpha^2 = \frac{\omega^2}{V_1^2} - \zeta^2, \quad (48)$$

$$\beta^2 = \frac{\omega^2}{V_2^2} - \zeta^2.$$

where $V_1$ and $V_2$ are the compressional and shear wave velocities, respectively. Subtracting and adding Eqs. (46) and (47) we obtain:

$$\frac{\partial^2 h_1}{\partial r^2} + \frac{1}{r}\frac{\partial h_1}{\partial r} + \left(\beta^2 - \frac{(n+1)^2}{r^2}\right)h_1 = 0, \quad (49)$$

$$\frac{\partial^2 h_2}{\partial r^2} + \frac{1}{r}\frac{\partial h_2}{\partial r} + \left(\beta^2 - \frac{(n+1)^2}{r^2}\right)h_2 = 0, \text{ where}$$

$$2h_1 = h_r - h_\theta, \quad (50)$$
$$2h_2 = h_r + h_\theta.$$

Solutions to Eqs. (44), (45), (49), and (50), respectively, may be written in the form:

$$f = AJ_n(\alpha r) + BY_n(\alpha r), \quad (51)$$

and $$h_z = h_3 = A_3 J_n(\beta r) + B_3 Y_n(\beta r), \quad (52)$$

$$2h_1 = h_r - h_\theta = 2A_1 J_{n+1}(\beta r) + 2B_1 Y_{n+1}(\beta r), \quad (53)$$

$$2h_2 = h_r + h_\theta = 2A_2 J_{n-1}(\beta r) + 2B_2 Y_{n-1}(\beta r), \quad (54)$$

where $J_n$ and $Y_n$ are nth order Bessel functions of the first and second kind. Since $\nabla \cdot H$ is arbitrary, one of the $h_i$ can be eliminated. Following Gazis (known to those of skill in the art having the benefit of this disclosure in "*Three-dimensional investigation of the propagation of waves in hollow circular cylinders, I. Analytical foundation, and II. Numerical Results,*" J. Acoust. Soc. Am., vol. 31, pp. 568-577, 1959), setting $h_2 = 0$, and from Eqs. (53) and (54), we have $$h_r = h_1, h_\theta = -h_1. \quad (55)$$

The solution for the displacement components can now be written:

$$u_r = \left(\frac{\partial f}{\partial r} + \frac{n}{r}h_3 + i\zeta h_i\right)\cos n\theta e^{i\zeta z}, \quad (56)$$

$$u_\theta = \left(\frac{-n}{r}f + i\zeta h_i - \frac{\partial h_3}{\partial r}\right)\sin n\theta e^{i\zeta z},$$

$$u_z = \left(i\zeta f - \frac{\partial h_1}{\partial r} - (n+1)\frac{h_1}{r}\right)\cos n\theta e^{i\zeta z}.$$

Substitution of Eqs. (51)-(55) into (56) yields the following expressions for the displacement components in the mth cylindrical layer that can be employed to satisfy the appropriate boundary conditions:

$$u_r = \left[\left\{\frac{n}{r}J_n(\alpha_{(m)}r) - \alpha_{(m)}J_{n+1}(\alpha_{(m)}r)\right\}A^{(m)} + \right. \quad (57)$$
$$\left\{\frac{n}{r}Y_n(\alpha_{(m)}r) - \alpha_{(m)}Y_{n+1}(\alpha_{(m)}r)\right\}B^{(m)} +$$
$$i\zeta J_{n+1}(\beta_{(m)}r)A_1^{(m)} + i\zeta Y_{n+1}(\beta_{(m)}r)B_1^{(m)} +$$
$$\left.\frac{n}{r}J_n(\beta_{(m)}r)A_3^{(m)} + \frac{n}{r}Y_n(\beta_{(m)}r)B_3^{(m)}\right]\cos n\theta e^{i(\omega t + \zeta z)},$$

$$u_\theta = \left[\left[-\frac{n}{r}J_n(\alpha_{(m)}r)\right]A^{(m)} + \left[-\frac{n}{r}Y_n(\alpha_{(m)}r)\right]B^{(m)} + \right. \quad (58)$$
$$[i\zeta J_{n+1}(\beta_{(m)}r)]A_1^{(m)} + [i\zeta Y_{n+1}(\beta_{(m)}r)]B_1^{(m)} +$$
$$\left\{-\frac{n}{r}J_n(\beta_{(m)}r) + \beta_{(m)}J_{n+1}(\beta_{(m)}r)\right\}A_3^{(m)} +$$
$$\left.\left\{-\frac{n}{r}Y_n(\beta_{(m)}r) + \beta Y_{n+1}(\beta_{(m)}r)\right\}B_3^{(m)}\right]\cos n\theta e^{i(\omega t + \zeta z)},$$

$$u_z = \left[\{i\zeta J_n(\alpha_{(m)}r)\}A^{(m)} + \{i\zeta Y_n(\alpha_{(m)}r)\}B^{(m)} - [\beta_{(m)}J_n(B_{(m)}r)]A_1^{(m)} - \right. \quad (59)$$
$$\left.\{\beta_{(m)}Y_n(\beta_{(m)}r)\}B_1^{(m)}\right]\cos n\theta e^{i(\omega t + \zeta z)},$$

where the index m denotes the mth cylindrical layer parameter and:

$$\alpha_{(m)}^2 = \frac{\omega^2}{V_{1(m)}^2} - \zeta^2, \quad (60)$$

$$B_{(m)}^2 = \frac{\omega^2}{V_{2(m)}^2} - \zeta^2,$$

with $V_{1(m)}$ and $V_{2(m)}$ the compressional and shear wave velocities for the mth cylindrical layer.

At this point, it should be noted that the solution given by Eqs. (57)(59) is valid for a solid annulus. The corresponding solution for a solid rod is simply obtained by discarding the terms containing $Y_n(\alpha r)$ or $Y_n(\beta r)$ which diverge as $r \to 0$. On the other hand, the wave solution in a solid formation of infinite radial extent takes the form:

$$u_r = \left[\left\{\frac{n}{r}H_n(\alpha r) - \alpha H_{n+1}(\alpha r)\right\}A^{(m)} + \right. \quad (61)$$
$$\left.[i\zeta H_{n+1}(\beta r)]A_1^{(m)} + \left[\frac{n}{r}H_n(\beta r)\right]A_3^{(m)}\right]\cos n\theta e^{i(\omega t + \zeta z)},$$

$$u_\theta = \left[\left\{-\frac{n}{r}H_n(\alpha r)\right\}A^{(m)} + [i\zeta H_{n+1}(\beta r)]A_1^{(m)} + \right. \quad (62)$$
$$\left.\left[-\frac{n}{r}H_n(\beta r) + \beta H_{n+1}(\beta r)\right]A_3^{(m)}\right]\sin n\theta e^{i(\omega t + \zeta z)},$$

$$u_z = [\{i\zeta H_n(\alpha r)\}A^{(m)} - \{\beta H_n(\beta r)\}A_1^{(m)}]\cos n\theta e^{i(\omega t + \zeta z)}, \quad (63)$$

where $H_n(x)$ is the outgoing Hankel functions of the second kind consistent with the exp i$\omega$t given by:

$$H_n(\chi) = J_n(\chi) - iY_n(\chi). \quad (64)$$

The corresponding displacement components in an inviscid fluid take the reduced form:

$$u_r^f = \left\{\left[\frac{n}{r}J_n(\alpha^f r) - \alpha^f J_{n+1}(\alpha^f r)\right]A^{(m)} + \right. \quad (65)$$
$$\left.\left[\frac{n}{r}Y_n(\alpha^f r) - \alpha^f Y_{n+1}(\alpha^f r)\right]B^{(m)}\right\} \times \cos n\theta e^{i(\omega t + \zeta z)},$$

$$u_\theta^f = \left\{-\frac{n}{r}[J_n(\alpha^f r)A^{(m)} + Y_n(\alpha^f r)B^{(m)}]\right\}\sin n\theta e^{i(\omega t + \zeta z)}, \quad (66)$$

$$u_2^f = i\zeta[J_n(\alpha^f r)A^{(m)} + Y_n(\alpha^f r)B^{(m)}]\cos n\theta e^{i(\omega t+\zeta z)}, \quad (67)$$

where $$\alpha^f = \frac{\omega^2}{V_f^2} - \zeta^2, \quad (68)$$

$V_f$ is the compressional wave velocity in the fluid, and the superscript "$f$" refers the quantity to the fluid medium.

Note that the solution given by Eqs. (65)-(67) is valid for a liquid annulus between the rigid column of radius b, and borehole surface at r=a. The surface-impedance condition at r=b can be expressed as:

$$\frac{u_r^f}{\tau_{rr}^f} = \frac{b}{2}\text{Real}(C_{tool}), \quad (69)$$

where the frequency-dependent tool compressibility $C_{tool}$ is given by:

$$C_{tool} = C\left[1 + \left(1 - \frac{1}{C_{inf}}\right)\frac{\omega_o^2}{\omega^2 - \omega_o^2 + 2i\omega\gamma}\right], \quad (70)$$

and the acoustic tool parameters C, $C_{inf}$, $\omega_0$, and $\gamma$ determined from a calibration experiment are given by:

$$C = 1.1 \times 10^{-10}, (1/Pa), \quad (71)$$

$$C_{inf} = 0.315, \quad (72)$$

$$\omega_o = 2\pi \times 960, (\text{radians/sec}), \quad (73)$$

$$\gamma = 2990, (\text{radians/sec}), \quad (74)$$

and $\omega$ is the wave frequency in (radians/sec). Note that $C_{inf}$ and C are defined by $$C_{inf} = \frac{C_\infty}{C_o}, \quad (75)$$

$$C = C_\infty, \quad (76)$$

where $C\infty$ and $C_o$ denote the tool compressibility in the high and low frequency limits, respectively.

The acoustic wave solution for a liquid column is obtained by discarding the terms containing $Y_{0,1}(\alpha^f r)$ which diverge as r→0, Eqs. (65)-(67). On the other hand, the wave solution in a fluid medium of infinite radial extent takes the form:

$$u_r^f = -\alpha^f H_{n+1}(\alpha^f r)D_1^{(m)}\cos n\theta e^{i(\omega t+\zeta z)}, \quad (77)$$

$$u_\theta^f = \left\{-\alpha^f H_{n+1}(\alpha^f r) + \frac{n}{r}H_n(\alpha^f r)\right\}D_1^{(m)}\sin n\theta e^{i(\omega t+\zeta z)}, \quad (78)$$

$$u_z^f = i\zeta H_n(\alpha^f r)D_1^{(m)}\cos n\theta e^{i(\omega t+\zeta z)}. \quad (79)$$

The classical boundary conditions at a fluid-solid interface are given by:

$$[\tau_{rr}^{(1)}, \tau_{r\theta}^{(1)}, \tau_{rz}^{(1)}, u_r^{(1)}]_{r=a} = [\tau_{rr}^{(2)}, \tau_{r\theta}^{(2)}, \tau_{rz}^{(2)}, u_r^{(2)}]_{r=a}, \quad (80)$$

where the superscripts 1 and 2 refer to the media on either side of the surface of discontinuity r=a. However, it should be noted that the shear stress $\tau_{rz}^{(1)}$ and $\tau_{r\theta}^{(1)}$ in an inviscid fluid are identically equal to zero. At a solid-solid interface, the continuity conditions are:

$$[T_{rr}^{(1)}, T_{r\theta}^{(1)}, T_{rz}^{(1)}, u_r^{(1)}, u_\theta^{(1)}, u_z^{(1)}]_{r=a} = [T_{rr}^{(2)}, T_{r\theta}^{(2)}, T_{rz}^{(2)}, u_r^{(2)}, u_\theta^{(2)}, u_z^{(2)}]_{r=a} \quad (81)$$

whereas the normal stress components are set equal to zero at traction-free surfaces. The unknown amplitudes associated with different cylindrical layers are determined by satisfying the boundary conditions at the relevant interfaces.

The solution to a cylindrically layered system can be obtained by satisfying appropriate boundary conditions at all the liquid-liquid, liquid-solid or solid-solid interfaces. These conditions can be expressed in terms of a matrix equation LC=0, where the vector c denotes the unknown amplitude coefficients. For nontrivial solutions of this matrix equation, we require that the determinant of coefficient matrix L be zero. The Appendix illustrates how these boundary conditions lead to the matrix equation for the case of a surface impedance condition prescribed at the tool radius b, placed in a fluid-filled borehole of radius a surrounded by an infinite formation. The surface-impedance condition at r=b, is given by:

$$\left[\frac{u_r^f}{T_{rr}^f}\right]_{r=b+} = \frac{b}{2}\text{Real}(C_{tool}), \quad (82)$$

and the other three boundary conditions at r=a are:

$$[T_{rr}^{(1)}, T_{rz}^{(1)}, u_r^{(1)}]_{r=a-} = [T_{rr}^{(2)}, T_{rz}^{(2)}, u_r^{(2)}]_{r=a+} \quad (83)$$

These results have been specialized for the lowest axi-symmetric Stoneley mode (n=0) in the presence of an acoustic tool (e.g. MSIP tool) with a complex surface-impedance condition at the tool radius b in a borehole of radius a.

Theoretical Validation

A newly developed semi-analytical method based on a standard spectral integration technique has been used to generate synthetic waveforms using the Resonance-Impedance Model (RIM) of an acoustic tool (e.g. MSIP). Synthetic waveforms at an array of receivers have been processed by the Ekstrom's modified matrix pencil algorithm to isolate both the dispersive and nondispersive arrivals for three cases: (a) radially homogeneous; (b) radially decreasing; and (c) radially increasing compressional and shear slownesses away from the borehole surface. Synthetic Stoneley dispersions have been used as input to the SRP algorithm and the inverted profiles have been compared with the input profiles.

FIG. 5 is a schematic of a column of radius b with an appropriate surface-impedance condition that constitute the resonance-impedance model of the acoustic tool. The annulus of thickness (a-b) is filled with the borehole mud. The resonance-impedance model with the calibrated parameters yield approximately the same amount of tool bias in the Stoneley dispersion as that predicted by the 3D finite-difference simulation of the detailed tool structure (MSIP) in both fast and slow formations. A fast or slow formation refers to the formation shear wave speed being faster or slower than the compressional wave speed in the borehole fluid.

TABLE Ia

Radially increasing velocities

| Radial coordinate cm | $V_p$ m/s | $V_s$ m/s | $\rho$ kg/m³ |
|---|---|---|---|
| 4.6 to 10 | 1500 | 0 | 1000 |
| 10 to 13 | 2040 | 1020 | 2000 |
| 13 to 16 | 2100 | 1050 | 2000 |
| 16 to 19 | 2160 | 1080 | 2000 |
| 19 to 22 | 2220 | 1110 | 2000 |
| 22 to 25 | 2280 | 1140 | 2000 |
| 25 to 28 | 2340 | 1170 | 2000 |
| 28 to infinity | 2400 | 1200 | 2000 |

TABLE Ib

Radially decreasing velocities

| Radial coordinate cm | $V_p$ m/s | $V_s$ m/s | $\rho$ kg/m³ |
|---|---|---|---|
| 4.6 to 10 | 1500 | 0 | 1000 |
| 10 to 13 | 2760 | 1380 | 2000 |
| 13 to 16 | 2700 | 1350 | 2000 |
| 16 to 19 | 2640 | 1320 | 2000 |
| 19 to 22 | 2580 | 1290 | 2000 |
| 22 to 25 | 2520 | 1260 | 2000 |
| 25 to 28 | 2460 | 1230 | 2000 |
| 28 to infinity | 2400 | 1200 | 2000 |

Table Ia and Ib, respectively, contain a summary of the material constants of the six annuli chosen to represent the altered zone surrounding the borehole with radially increasing and decreasing compressional and shear velocities away from the borehole.

The borehole fluid is water with compressional velocity $V_f$=1500 m/s, and mass density $\rho_f$=1000 kg/m³. Results for a homogeneous formation are obtained assuming that the compressional velocity $V_p$=2400 m/s, and shear velocity $V_s$=1200 m/s for radial position r=10 cm to infinity. However, note that the surface-impedance condition is prescribed at radius=4.6 cm.

In addition, we compare radial depths of investigation of data kernal $G_i$ at various frequencies of borehole Stoneley modes using the Resonance-Impedance Model with those for an empty borehole. The data kernel $G_i$ is a measure of the sensitivity of borehole Stoneley dispersions to changes in the formation horizontal shear modulus at various radial positions.

Figure 6A:
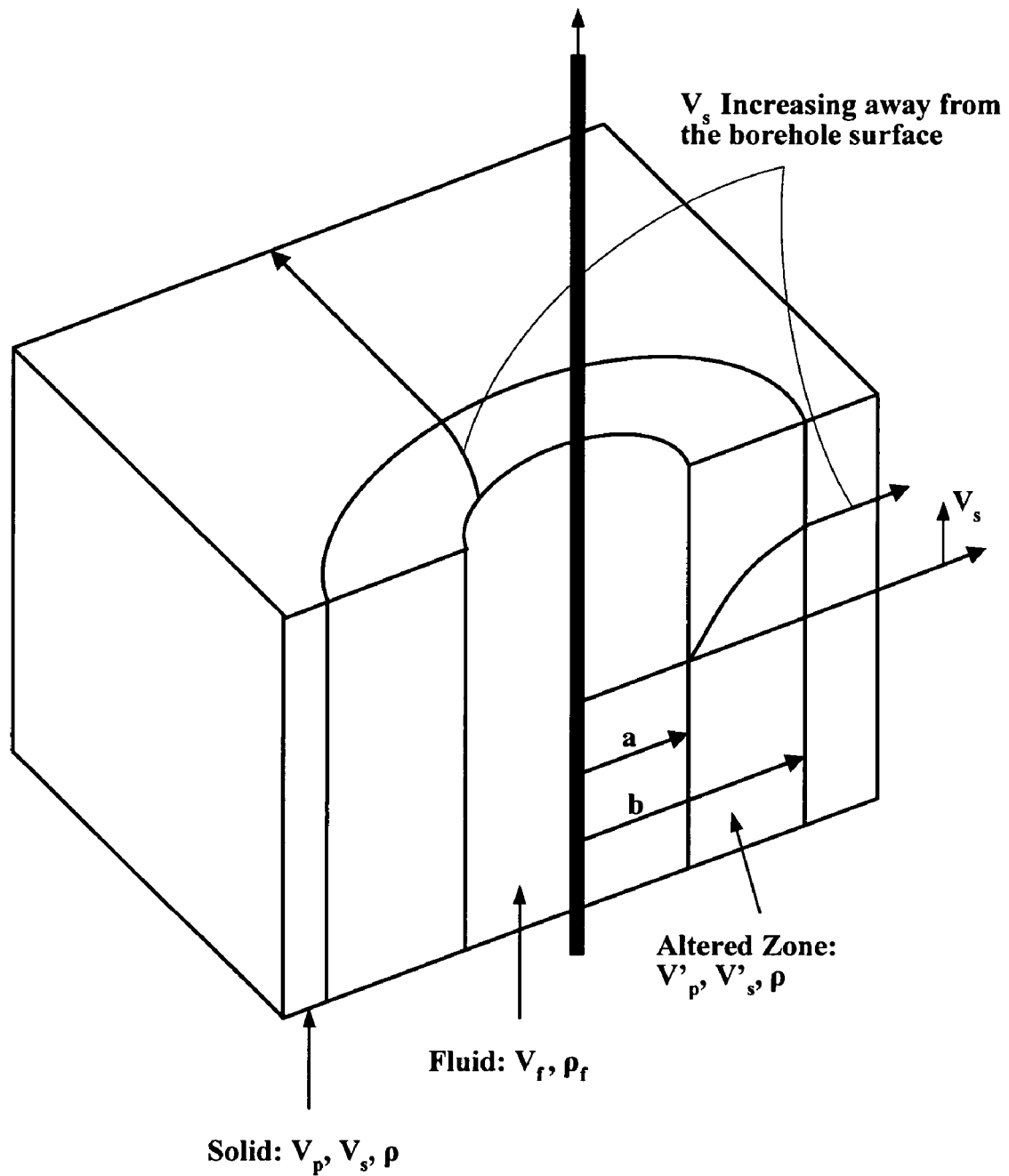
FIG. 6a illustrates a fluid-filled borehole in an elastic formation with a radially varying annulus.
Figure 6B:
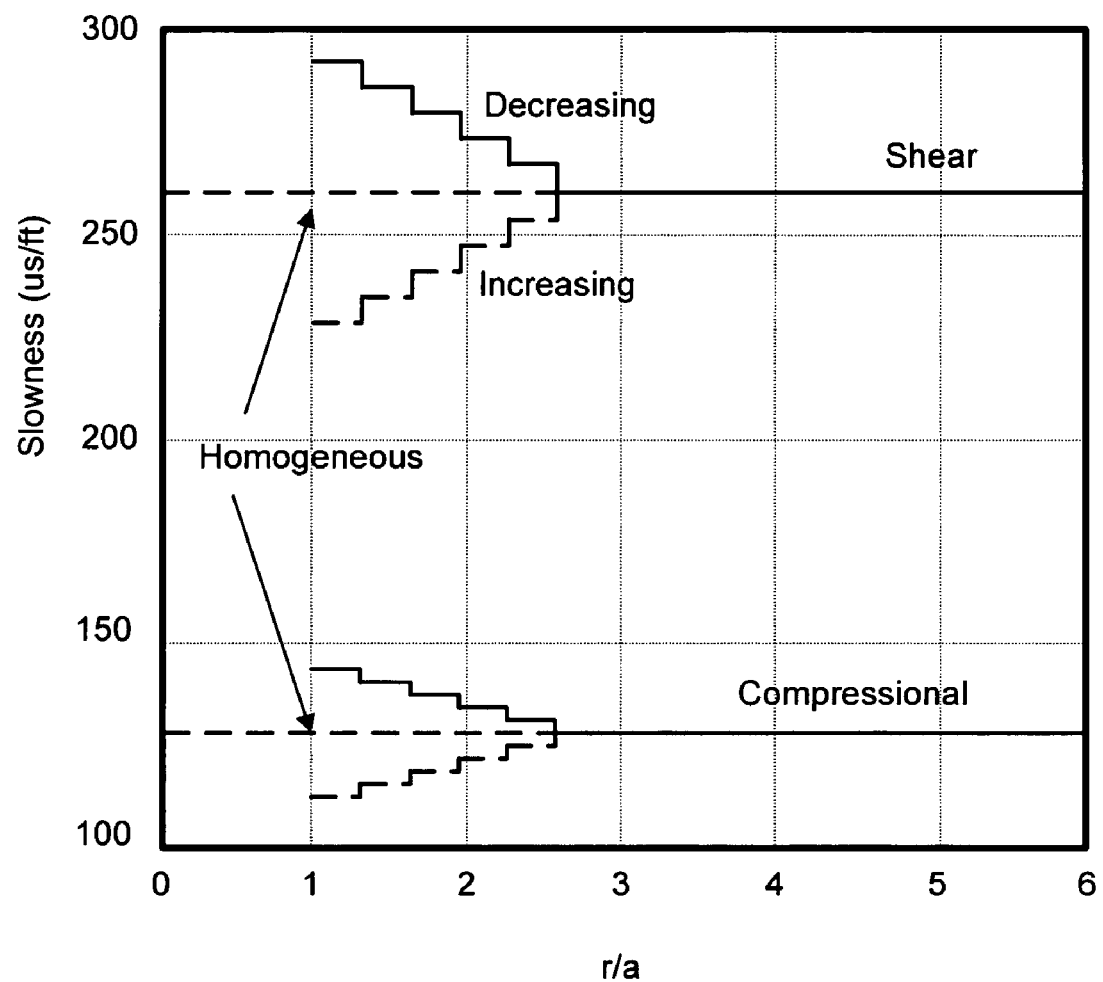

FIG. 6a is a schematic diagram of a borehole of radius a with an altered annulus of thickness (b-a) that exhibits increasing velocity away from the borehole surface. FIG. 6b displays both increasing and decreasing compressional and shear slowness profiles used in generating the synthetic data for testing the SRP algorithm.

Figure 7A:
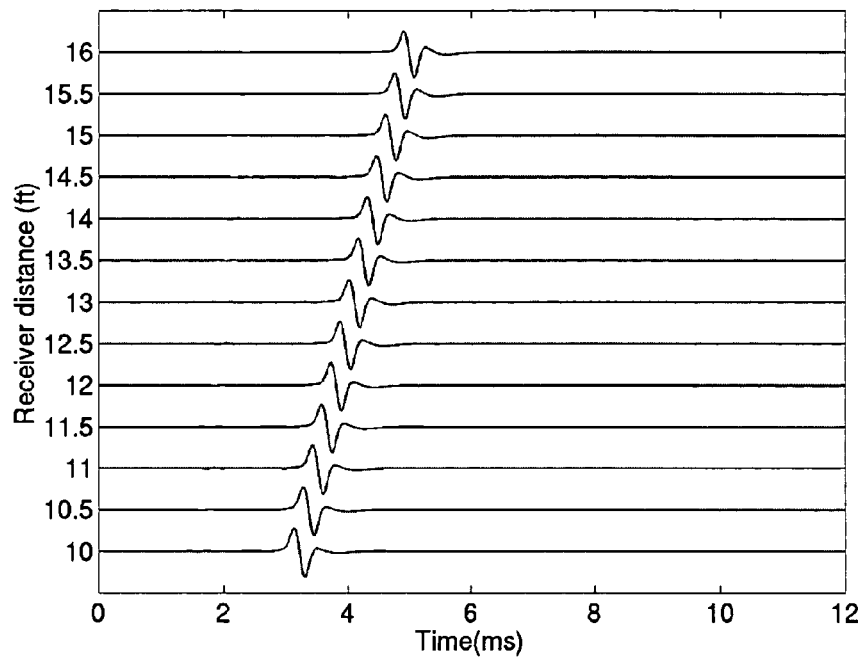
FIGS. 7a-7d illustrate a sequence of data acquisition and processing results to obtain a Stoneley radial profile of horizontal shear slowness using the RIM model for an acoustic tool in a radially homogeneous formation.
Figure 7B:
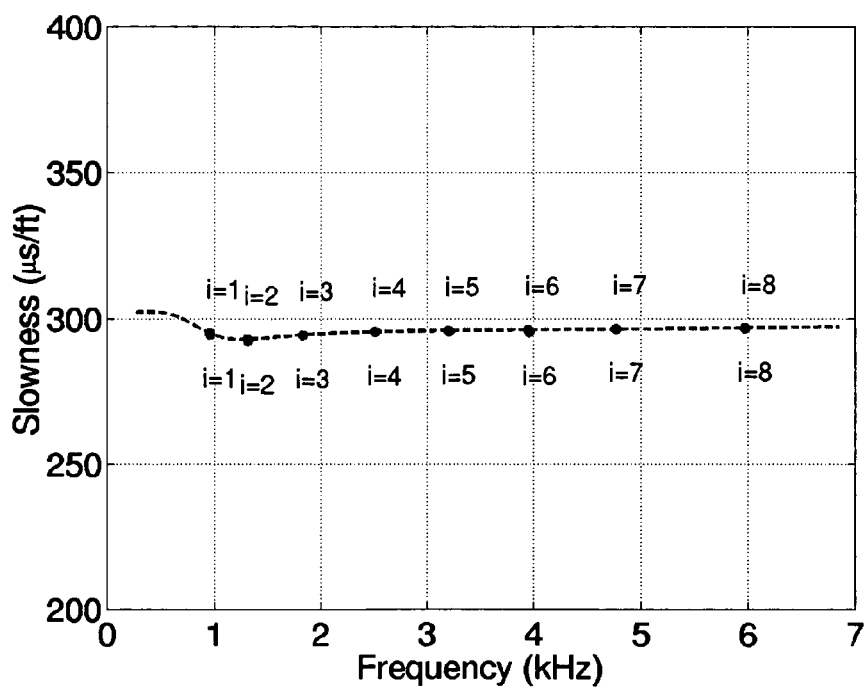
Figure 7C:
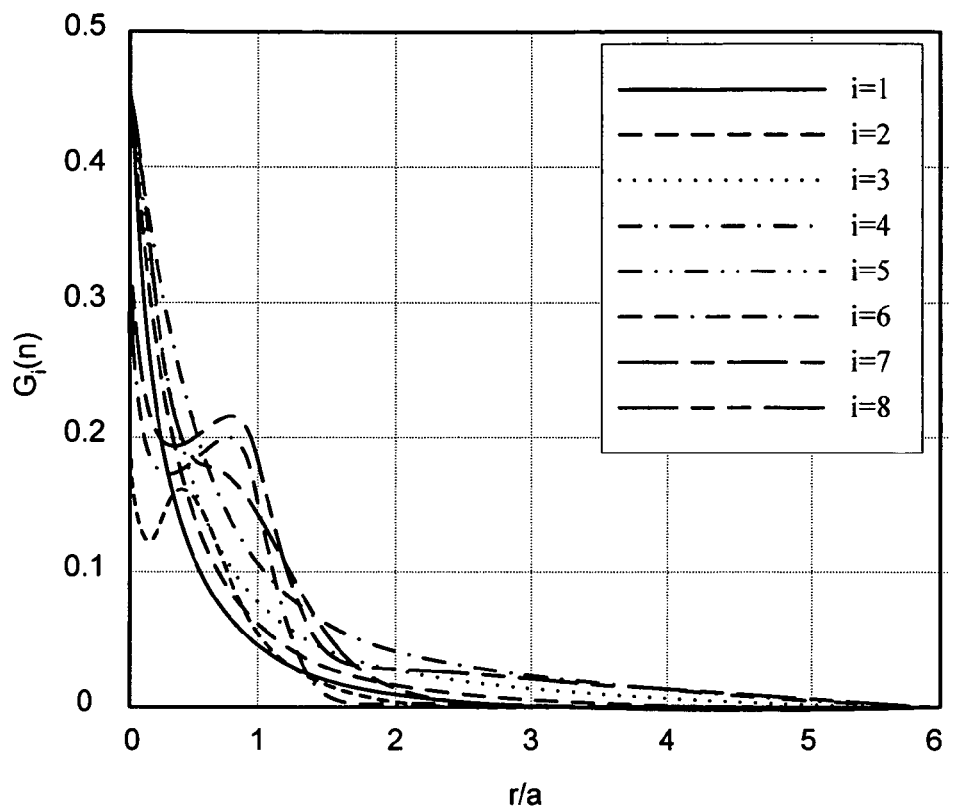

FIG. 7a illustrates synthetic waveforms at an array of thirteen receivers calculated for a radially homogeneous formation using the Resonance-Impedance Model of the MSIP tool. The reference Stoneley dispersion (dashed line) is calculated from a mode-search routine together with eight discrete points from the synthetic dispersion calculated from the waveforms shown in FIG. 7a. The discrete dispersion points are arbitrarily selected over a reasonable bandwidth in the different examples considered herein. FIG. 7c displays radial distributions of data kernels at the eight selected frequencies.

Figure 7D:
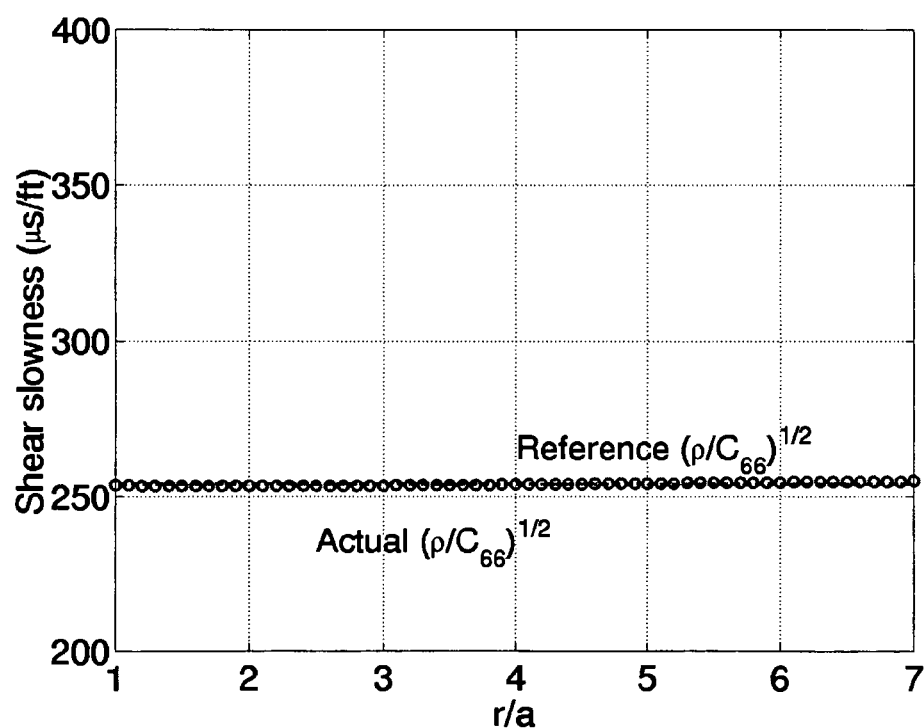

FIG. 7d compares the inverted radial profile of horizontal shear slowness with that of the uniform shear slowness profile used in generating the synthetic Stoneley dispersion. Excellent agreement is observed between the inverted shear slowness profile and the constant shear slowness of 254 µs/ft assumed in the radially homogeneous formation.

Figure 8A:
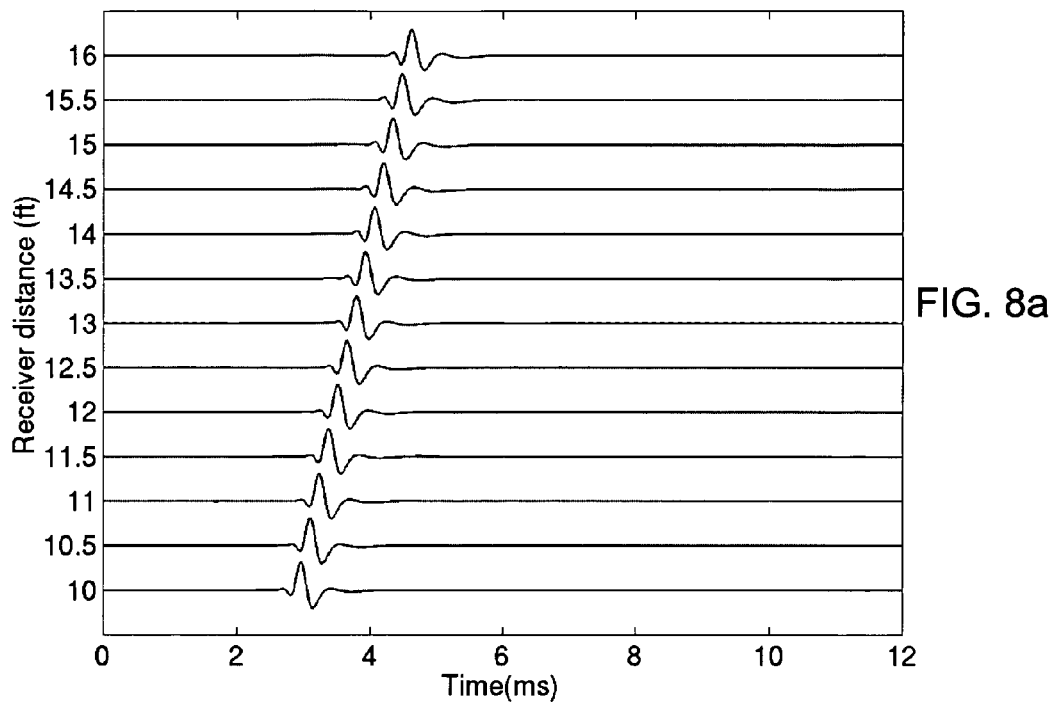
FIGS. 8a-8d illustrate a sequence of data acquisition and processing results to obtain a Stoneley radial profile of horizontal shear slowness using the RIM model for an acoustic tool in a formation with radially increasing compressional and shear slownesses.
Figure 8B:
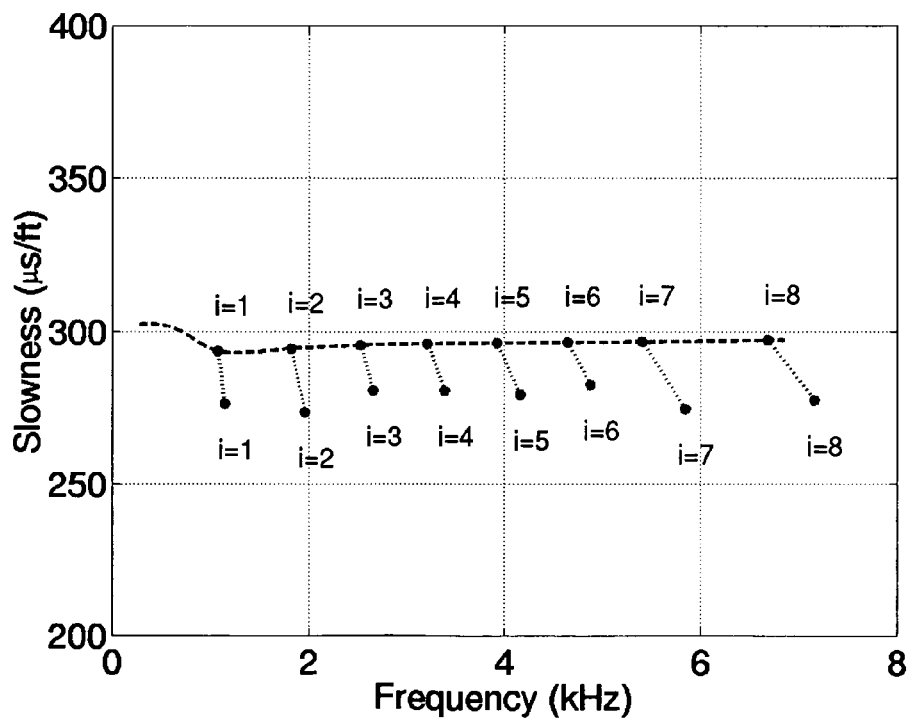
Figure 8C:
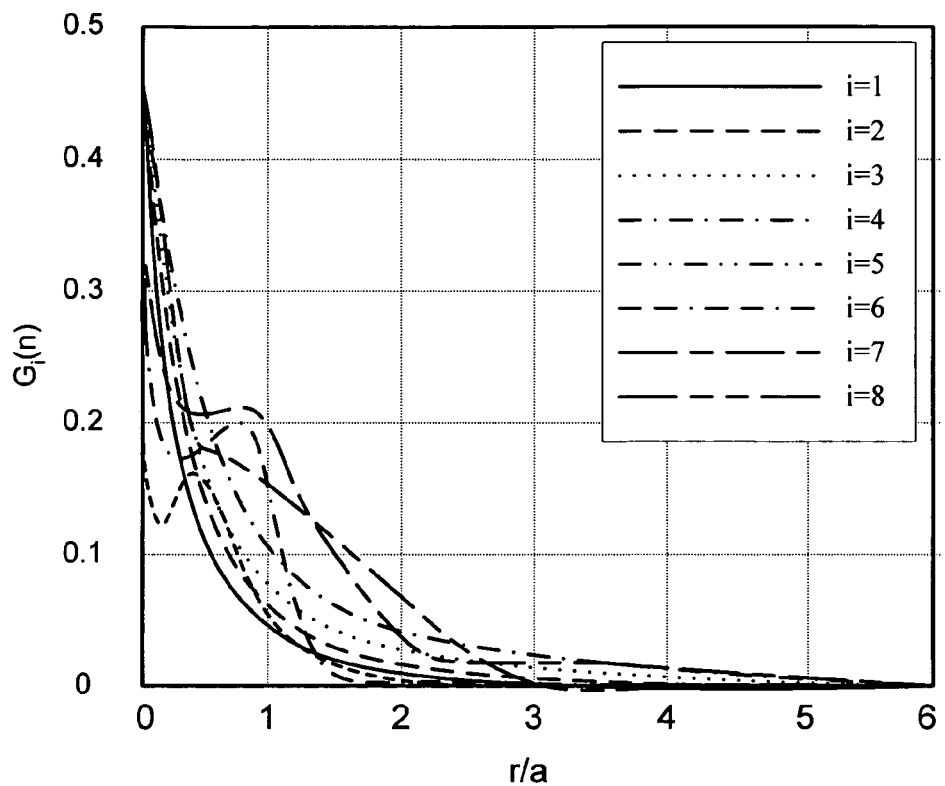
Figure 8D:
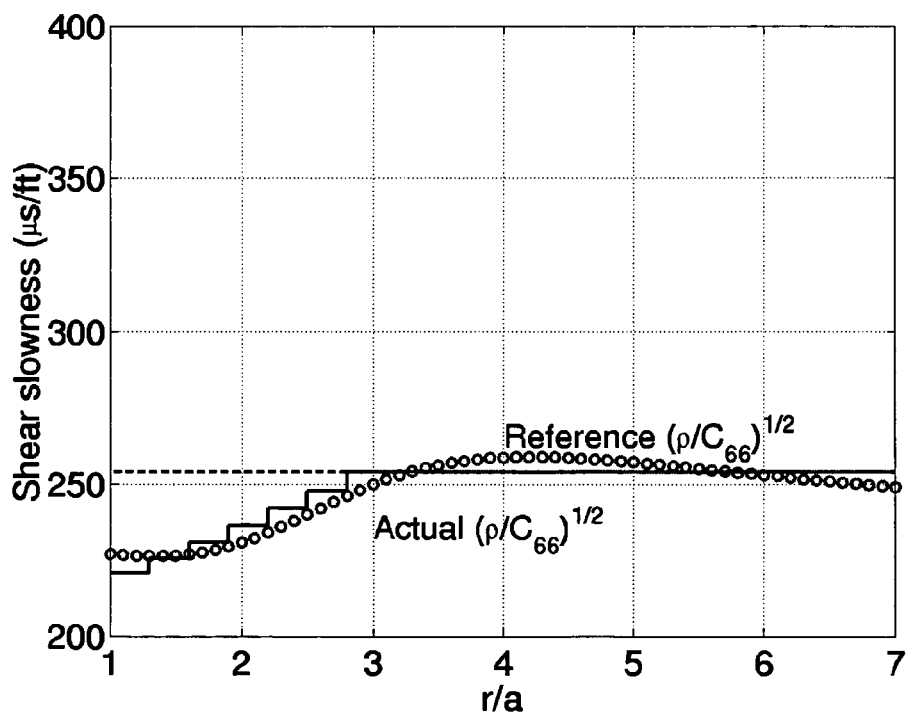

FIG. 8a displays synthetic waveforms at an array of thirteen receivers computed for a formation with radially increasing compressional and shear slownesses using the RIM of the MSIP tool. FIG. 8b shows the reference Stoneley dispersion calculated from a mode-search routine (dashed line) together with eight discrete points from the synthetic Stoneley dispersion obtained from the waveforms shown in FIG. 8a. Radial distributions of data kernels are illustrated in FIG. 8c at the eight selected frequencies. A comparison of the inverted radial profile of shear slowness shown in FIG. 8d is made with that of the stair-case profile used in obtaining the synthetic Stoneley dispersion data. Generally good agreement is observed between the inverted and input stair-case shear slowness profiles. Differences in the far-field are probably caused by some residual error in the input dispersion data. Note that a stair-case profile is likely to introduce some unknown errors in the synthetic waveforms as well.

Figure 9A:
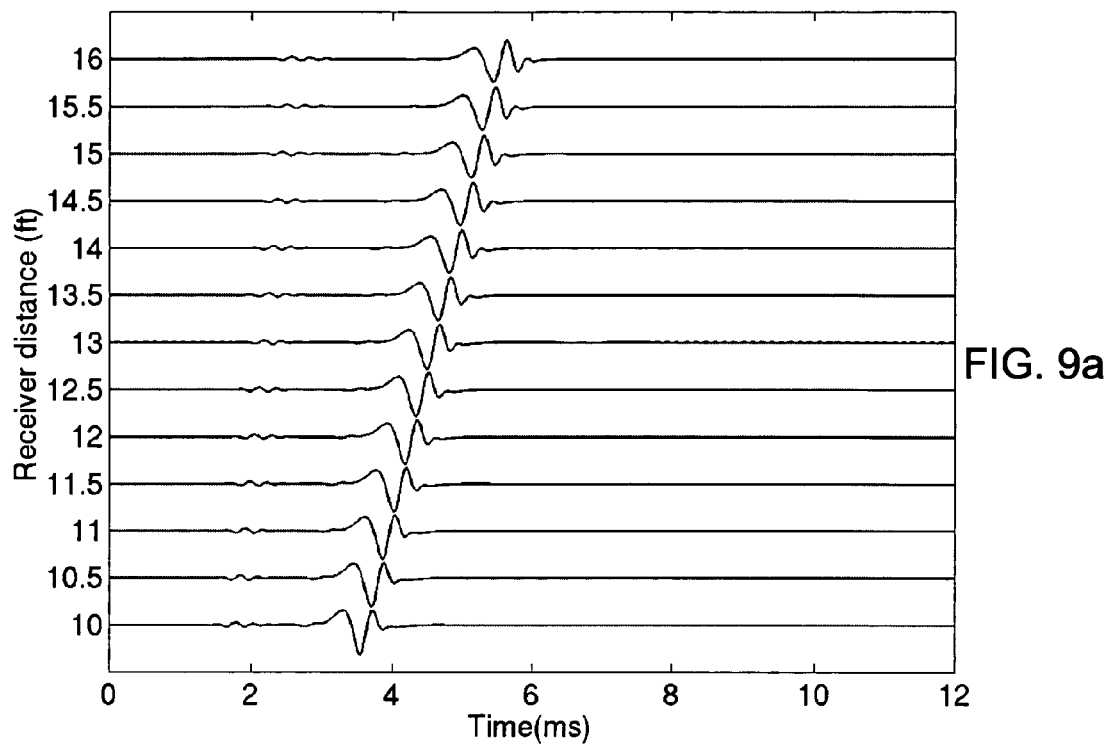
FIGS. 9a-9d illustrate a sequence of data acquisition and processing results to obtain a Stoneley radial profile of horizontal shear slowness using the RIM model for an acoustic tool in a formation with radially decreasing compressional and shear slownesses.
Figure 9B:
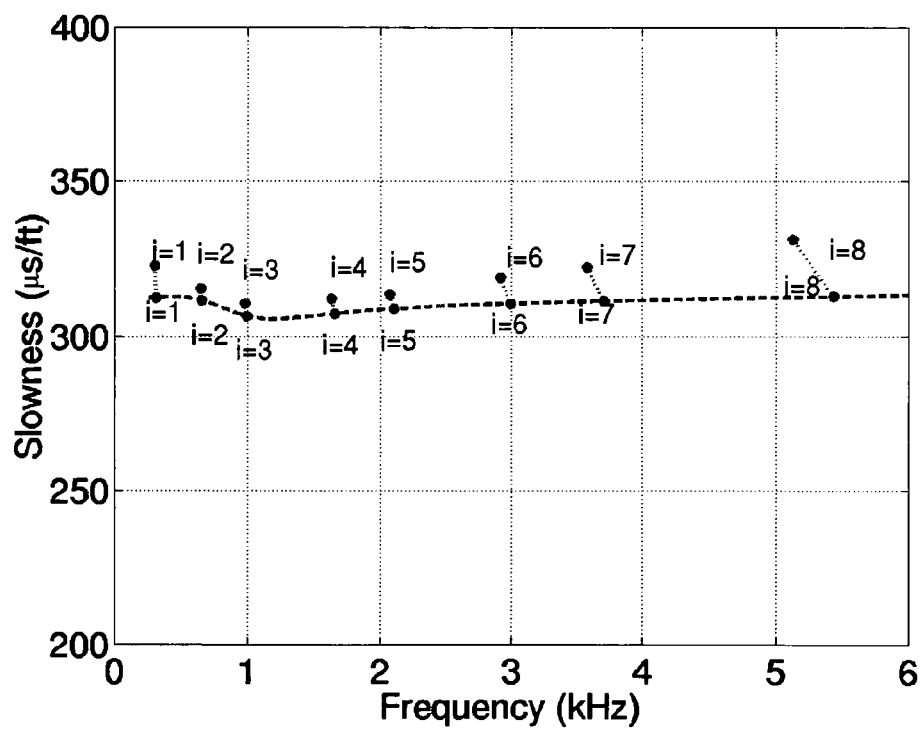
Figure 9C:
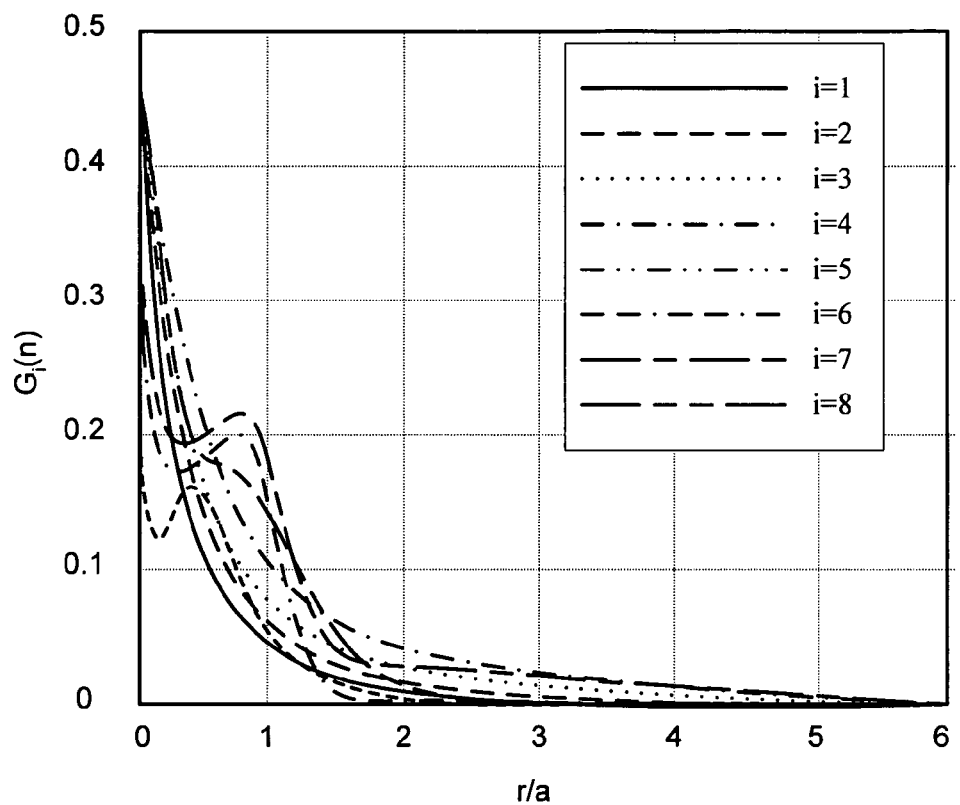
Figure 9D:
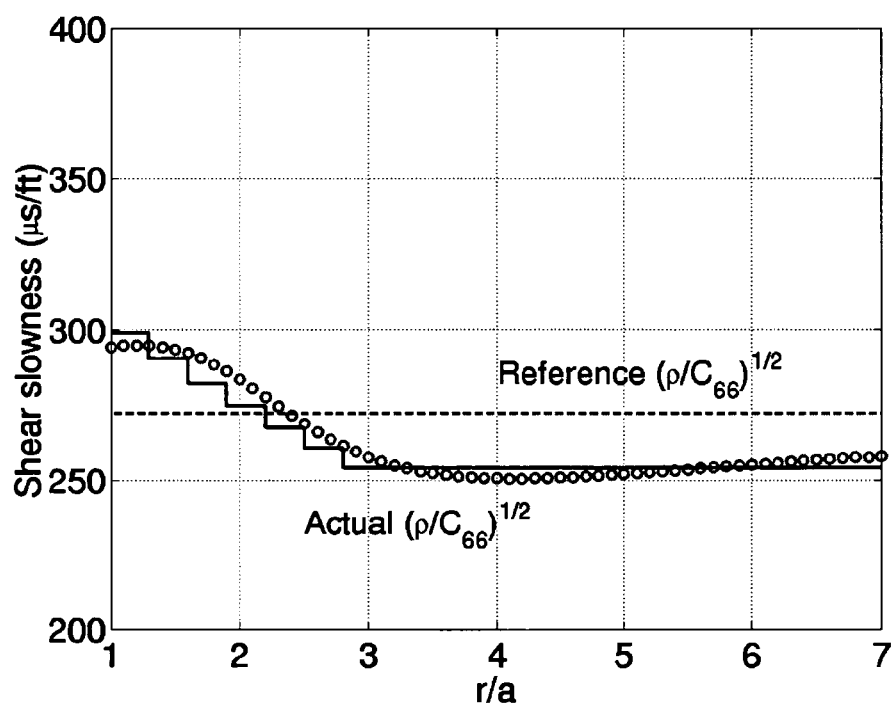

Next, results from the SRP algorithm are analyzed for the case of radially decreasing compressional and shear slownesses away from the borehole surface. FIG. 9a displays synthetic waveforms at an array of thirteen receivers computed for a formation with radially decreasing compressional and shear slownesses away from the borehole surface. FIG. 9b illustrates the reference Stoneley dispersion (dashed line) used to obtain the radial profile of shear slowness from the SRP algorithm. The eight discrete points in FIG. 9b denote the input data from the synthetic Stoneley dispersion calculated from the waveforms shown in FIG. 9a. FIG. 9c shows radial distributions of data kernels at the eight input frequencies selected for the SRP algorithm. Finally, one compares in FIG. 9d the inverted shear slowness profile with that of the stair-case profile used to obtain the synthetic Stoneley dispersion. Again, good agreement is observed between the inverted and synthetic profiles of shear slowness away from the borehole surface to within the uncertainty caused by errors in the input dispersion data. Note that a stair-case profile is difficult to simulate with a sparse sampling of the input dispersion data that has some errors in them as well. Thus the SRP algorithm is well validated against synthetic data.

Computational Results: Field Data

The SRP algorithm is applied as described below to measured Stoneley dispersions using acoustic data obtained from a well with known characteristics. Computational results for two different configurations are compared to study the acoustic tool effects on the borehole Stoneley modes. The two configurations include: (A) a concentric column with a surface-impedance condition to simulate the acoustic tool structure; and (B) an empty borehole.

The parameters for the formation at different depths appearing in the investigation are given in Table II. The geometrical parameters, consistent with an acoustic tool geometry (MSIP) are as follows: tool radius is b=4.6 cm (1.85 in) and the borehole radius is denoted by a. The borehole mud mass density $\rho_f$=107.23 kg/m³; and the mud compressional slowness is 212 µs/ft.

TABLE II

Material properties in the chosen reference state

| Depth ft | Diameter inches | $V_P$ m/s | $\rho$ kg/m$^3$ |
|---|---|---|---|
| 590 | 9.3 | 346 | 2310 |
| 724.5 | 9.6 | 346 | 2580 |
| 792 | 9.7 | 326 | 2530 |
| 920 | 9.3 | 346 | 2590 |
| 1108.5 | 9.6 | 346 | 2641 |
| 1217.5 | 10 | 336 | 2620 |

Figure 10A:
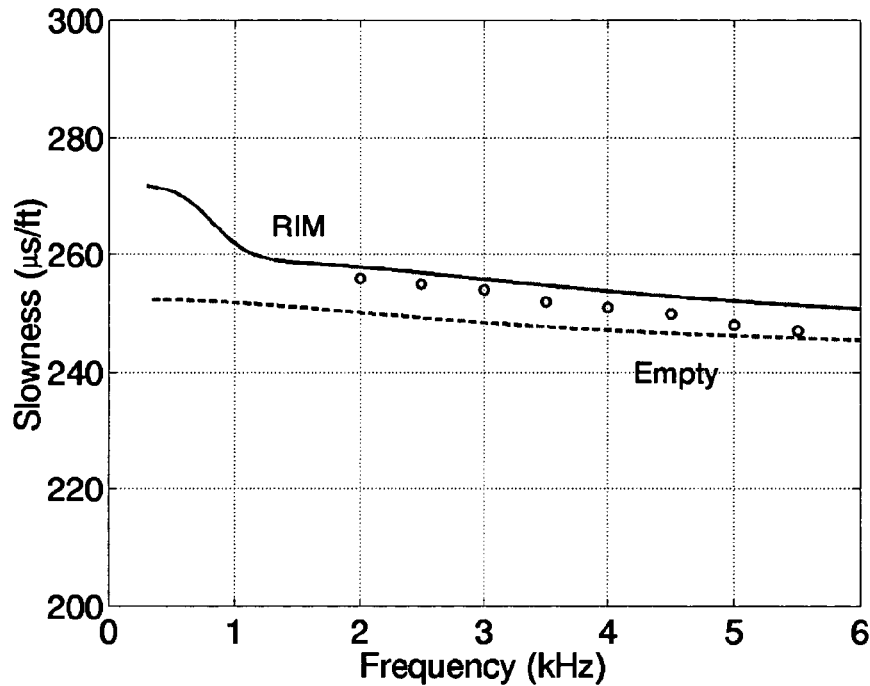
FIGS. 10a-10d illustrate a sequence of data acquisition and processing results to obtain a Stoneley radial profile of horizontal shear slowness using the RIM model for an acoustic tool in a well of known parameters at a depth of 590 feet.
Figure 10B:
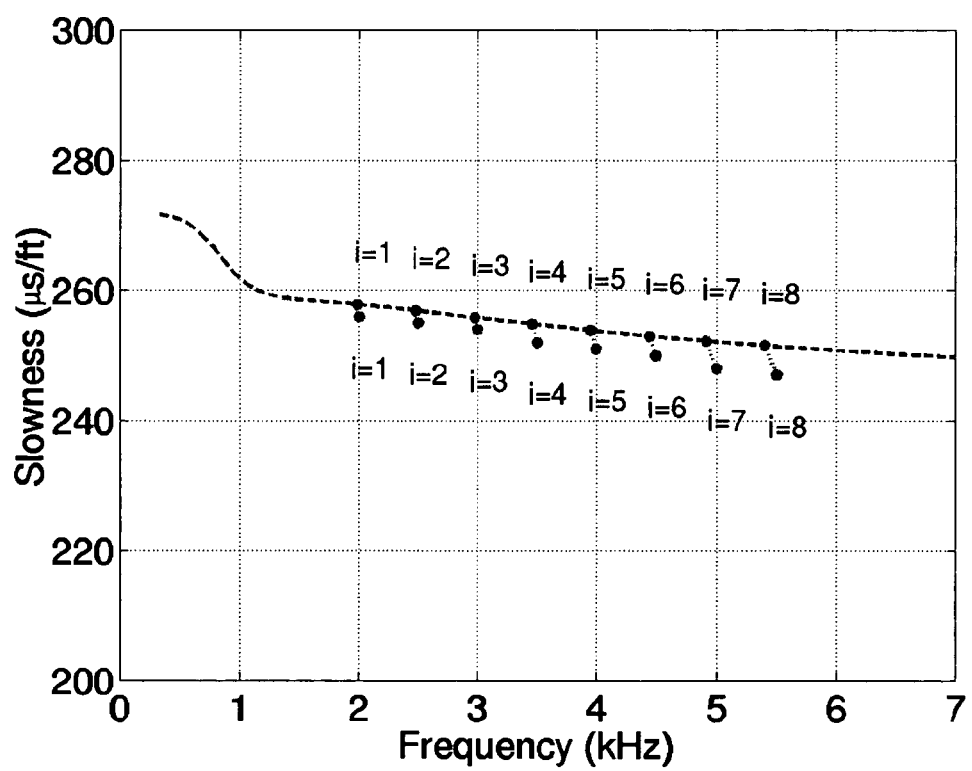
Figure 10C:
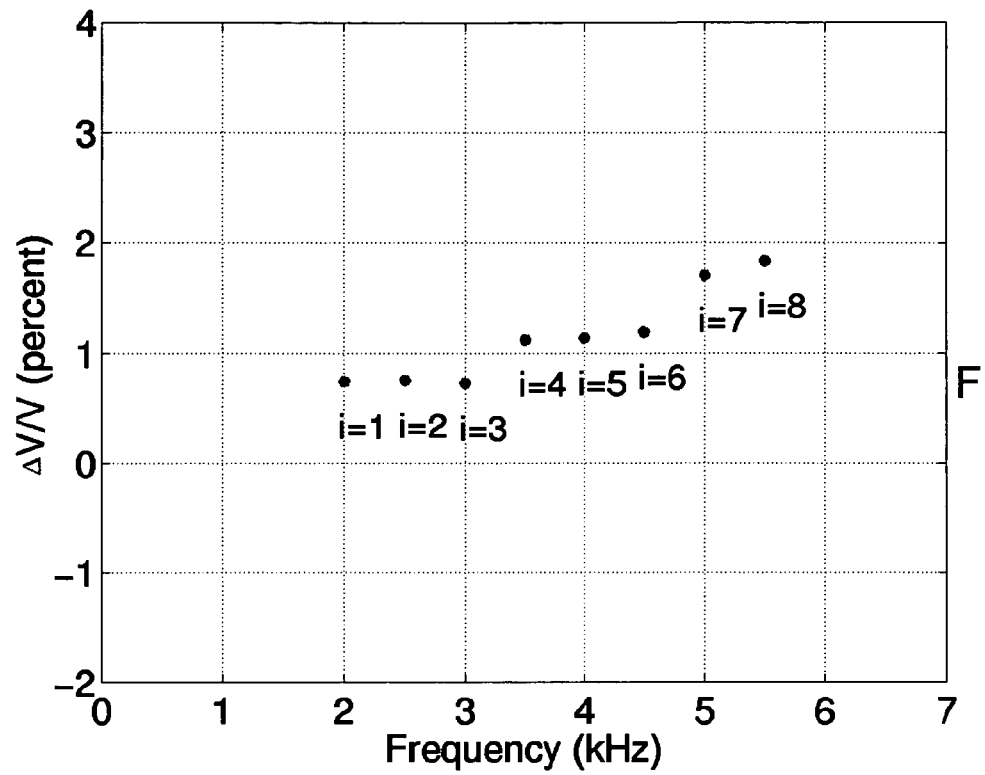
Figure 10D:
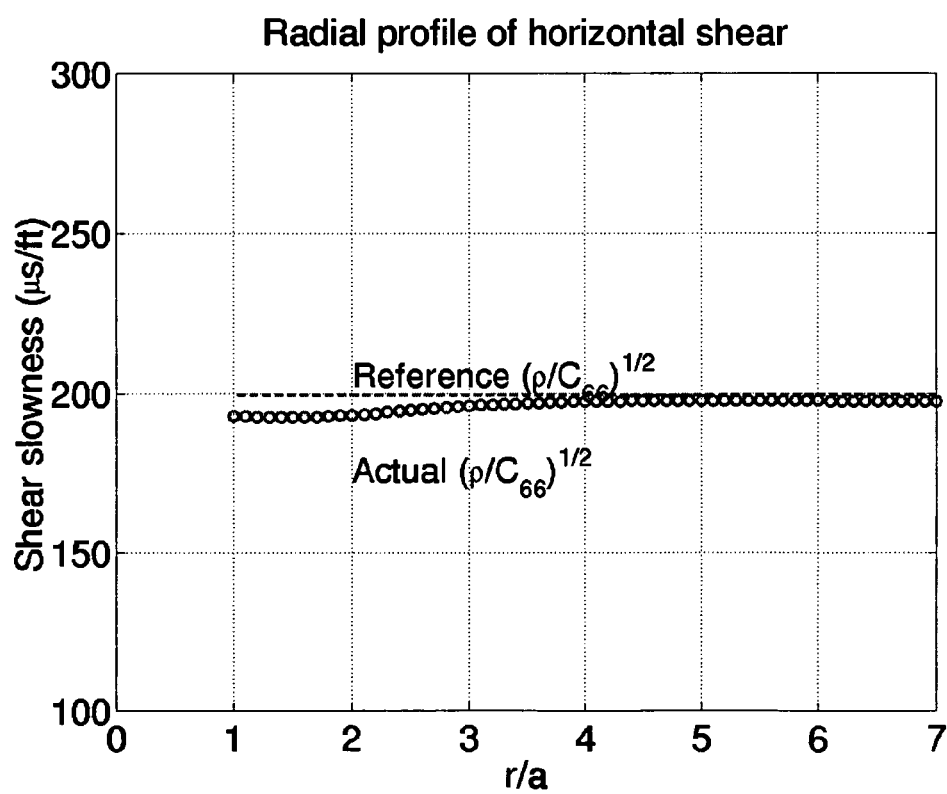

FIG. 10a compares Stoneley dispersions of an empty borehole (shown by a dashed curve) with that for the RIM (shown by a solid curve) in an homogenous and equivalent isotropic formation. The formation parameters are for a depth of 590 ft. The presence of MSIP tool causes the Stoneley slowness to be slower than an empty borehole over the entire bandwidth. However, it should be noted that differences between the RIM and empty borehole model become small with increasing borehole diameters and formation slownesses. Table II contains the formation parameters in the selected reference state at various depths considered in the well study. FIG. 10b displays the measured Stoneley dispersions by discrete points i=1, 2, 3, . . . . 8; and the dashed line denotes the RIM dispersion in the reference state. FIG. 10c shows fractional differences between the measured and reference dispersions at eight selected frequencies. FIG. 10d displays the inverted radial profile of the formation horizontal shear slowness using the resonance-impedance model for the MSIP tool structure at depth 590 ft.

Figure 11A:
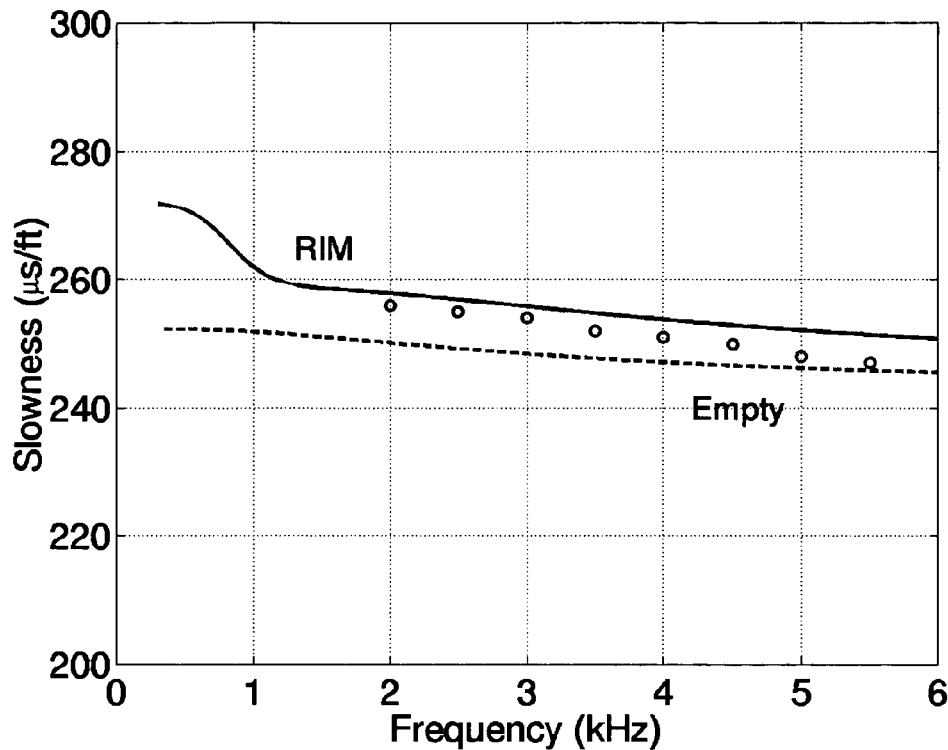
FIGS. 11a-11d illustrate a sequence of data acquisition and processing results to obtain a Stoneley radial profile of horizontal shear slowness using an empty borehole model for an acoustic tool in a well of known parameters at a depth of 590 feet.
Figure 11B:
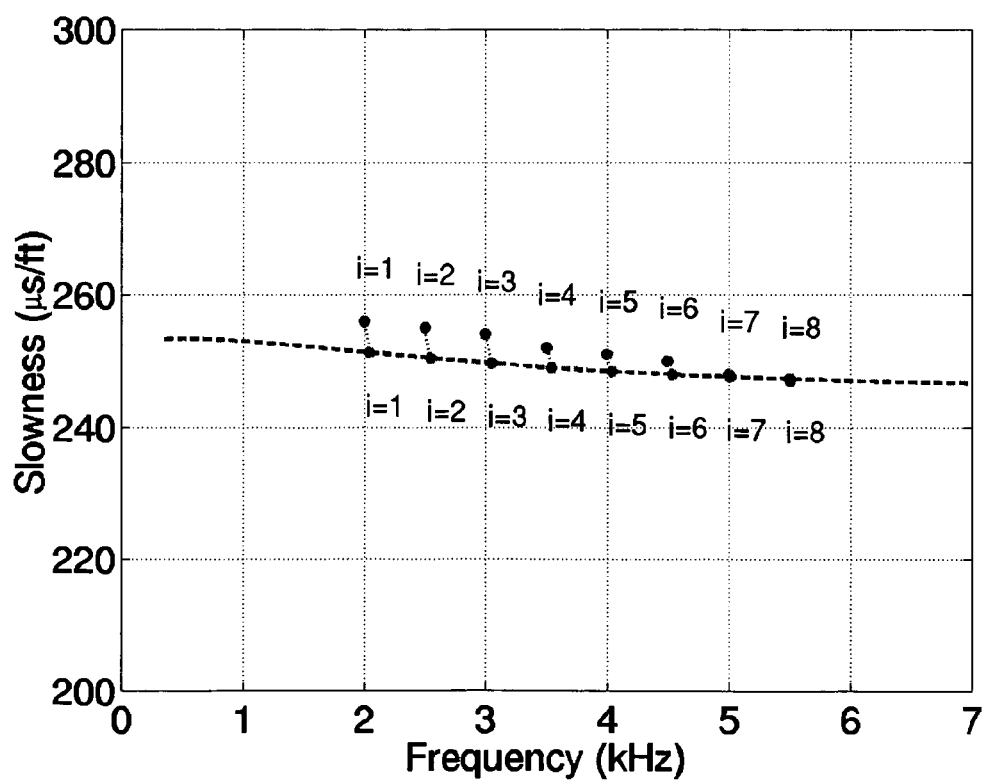
Figure 11C:
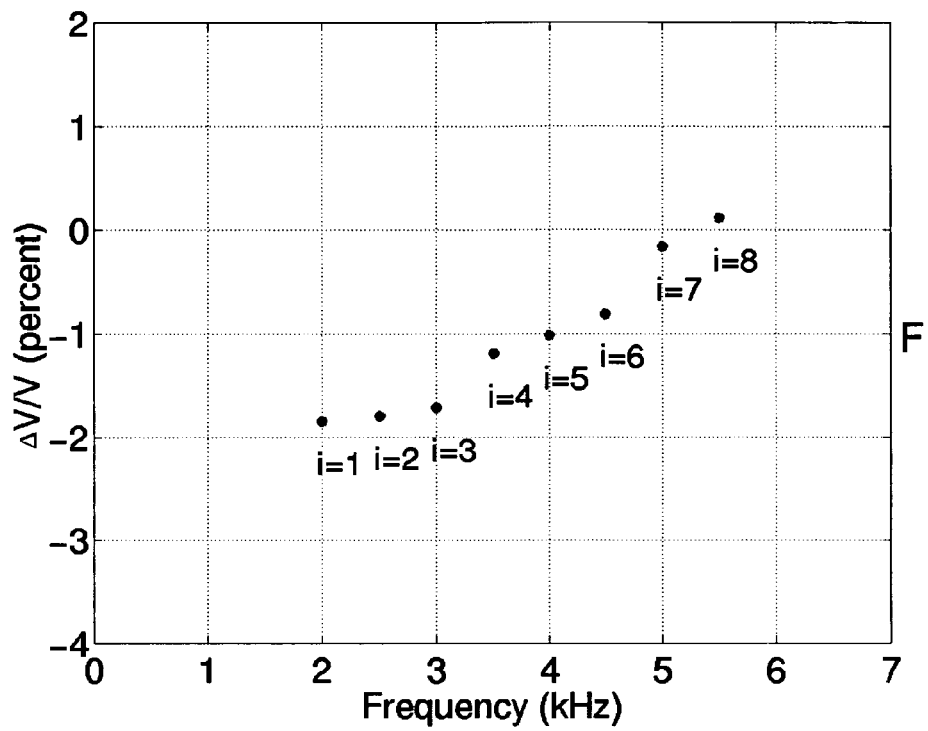
Figure 11D:
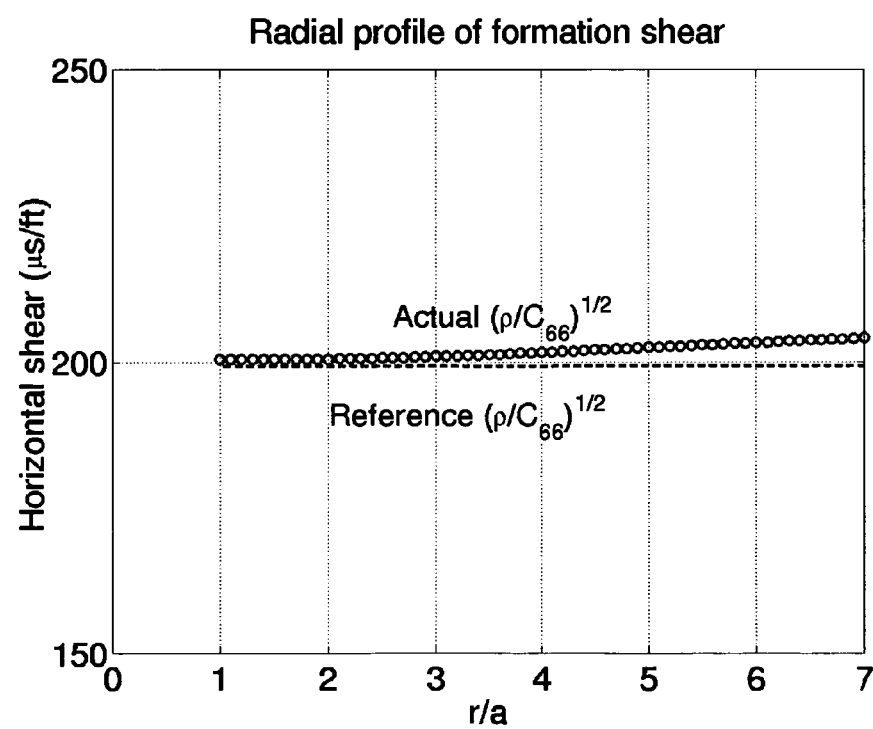
Figure 12A:
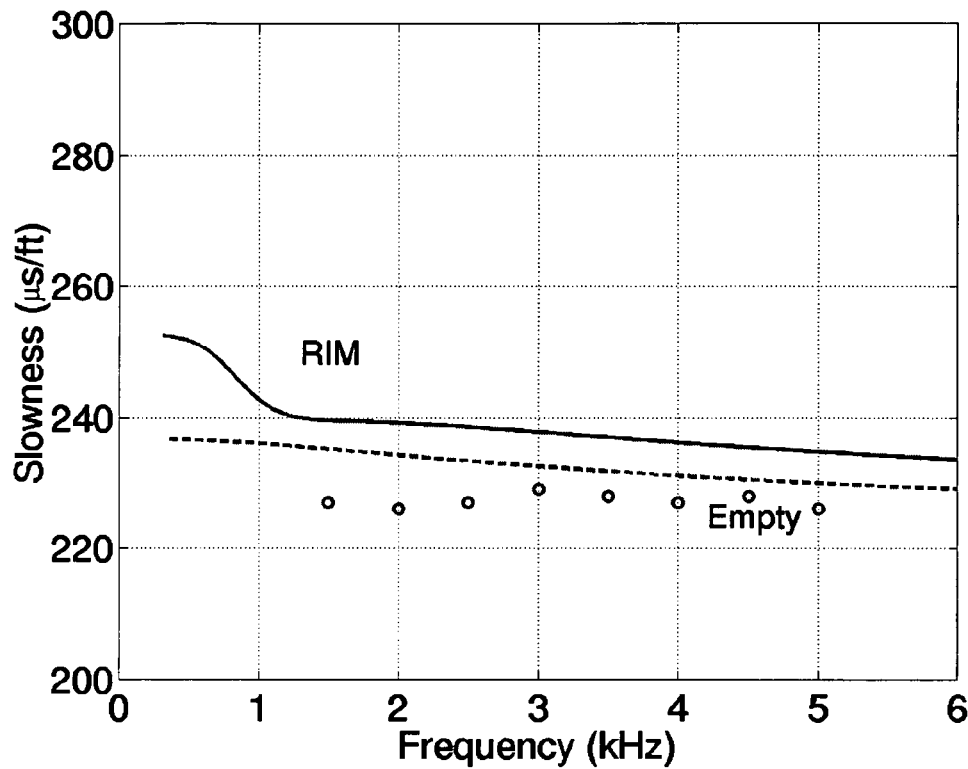
FIGS. 12a-12d illustrate a sequence of data acquisition and processing results to obtain a Stoneley radial profile of horizontal shear slowness using the RIM model for an acoustic tool in a well of known parameters at a depth of 724.5 feet.
Figure 12B:
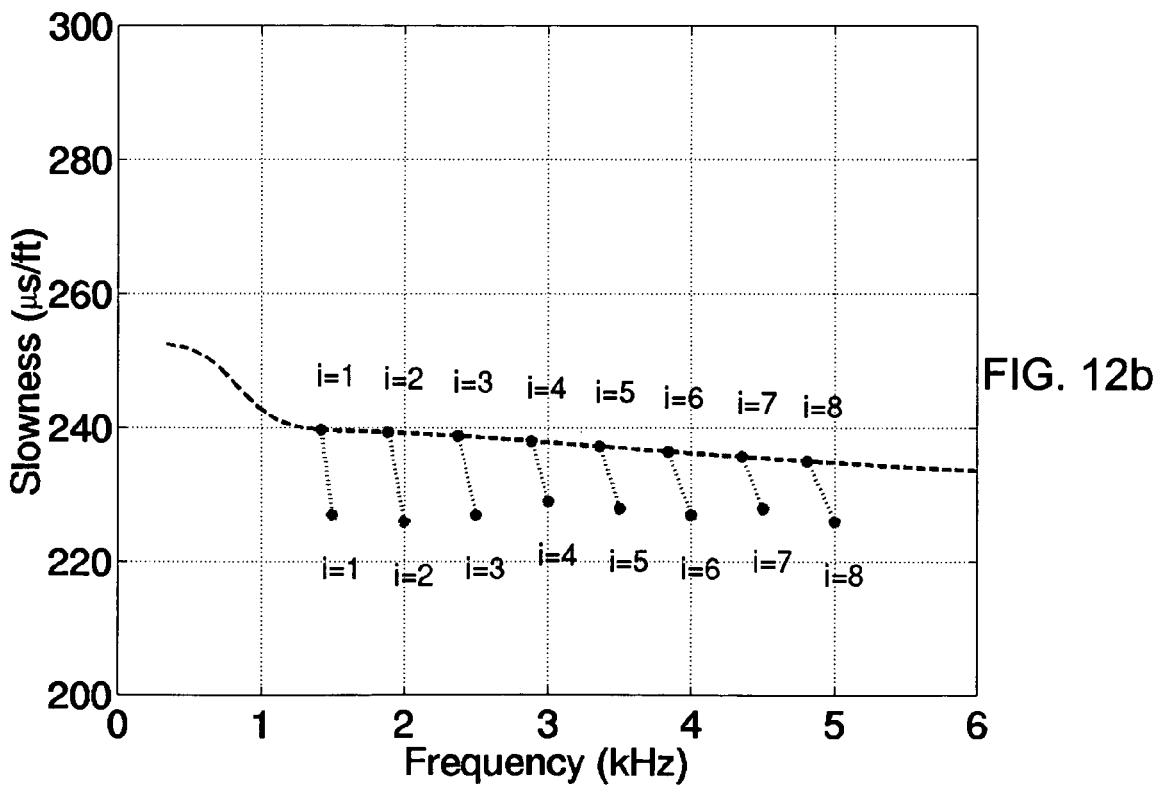
Figure 12C:
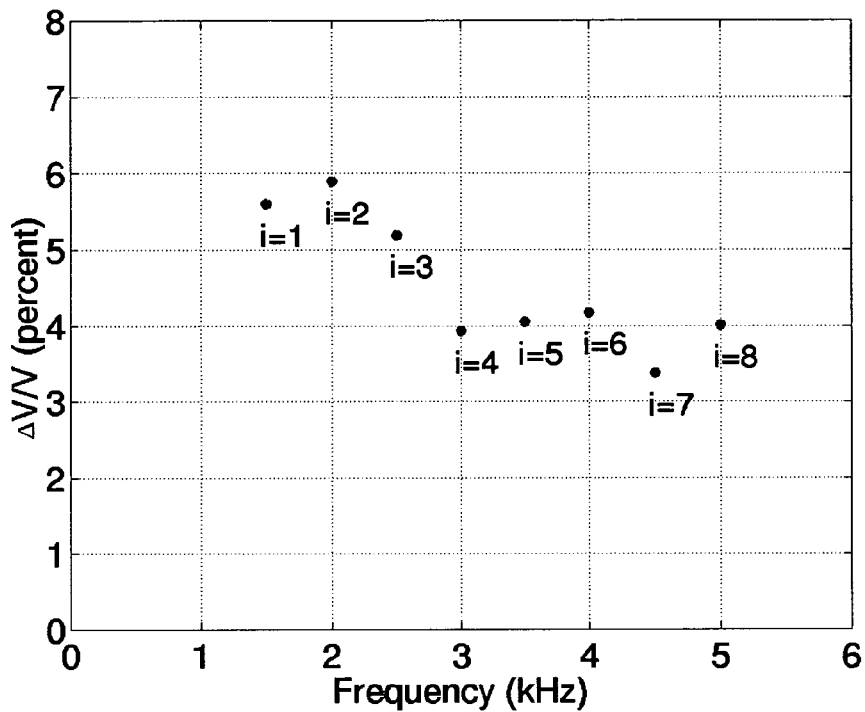
Figure 12D:
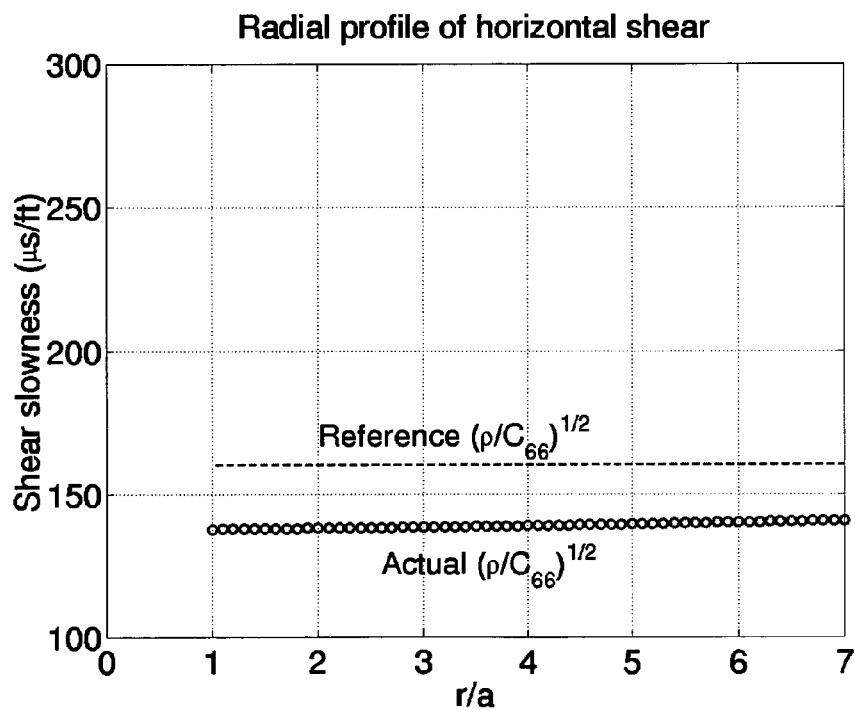
Figure 13A:
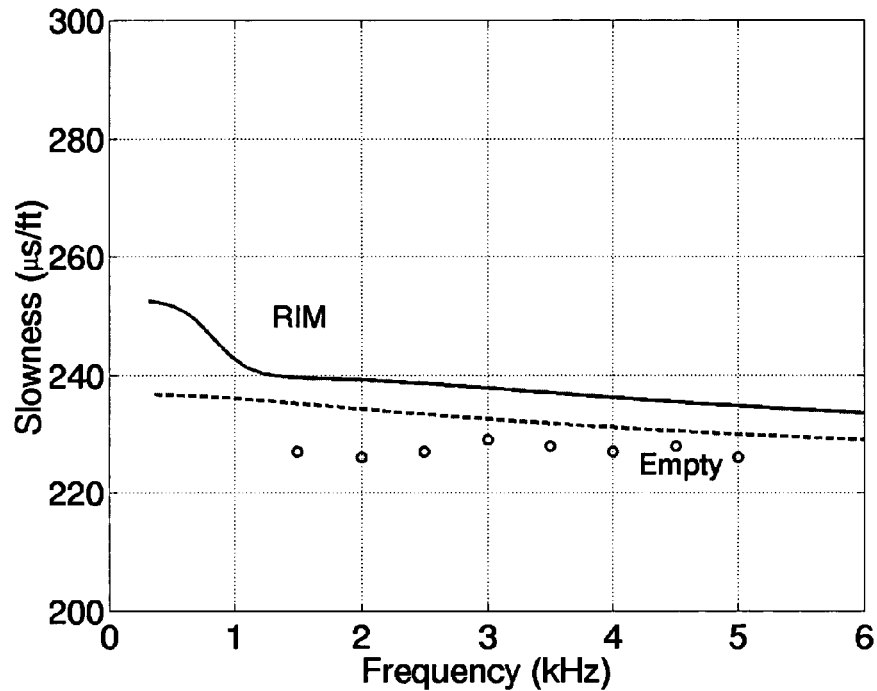
FIGS. 13a-13d illustrate a sequence of data acquisition and processing results to obtain a Stoneley radial profile of horizontal shear slowness using an empty borehole model for an acoustic tool in a well of known parameters at a depth of 724.5 feet.
Figure 13B:
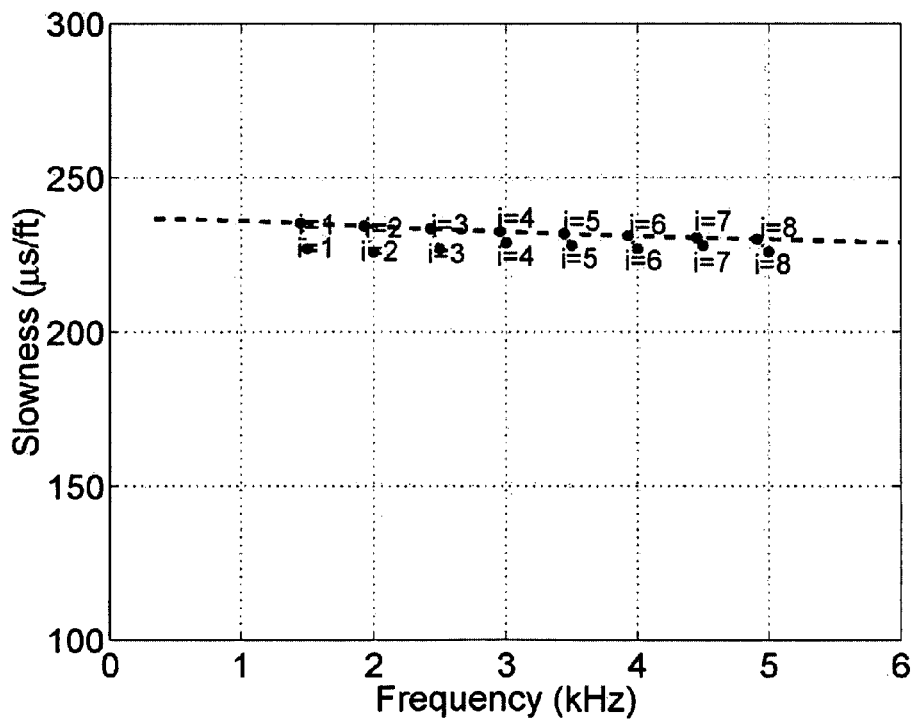
Figure 13C:
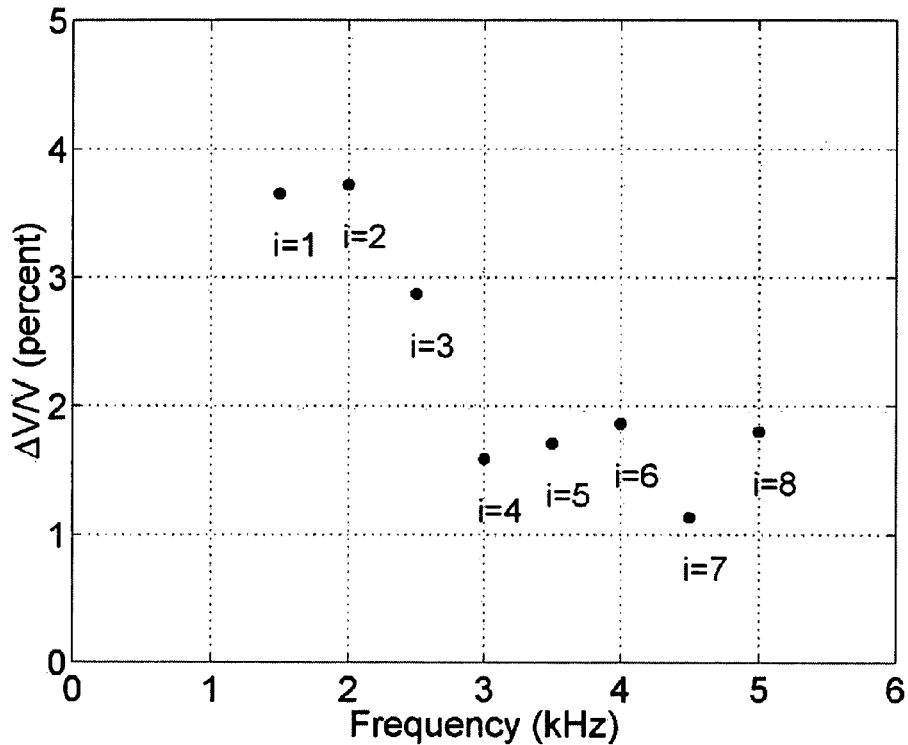
Figure 13D:
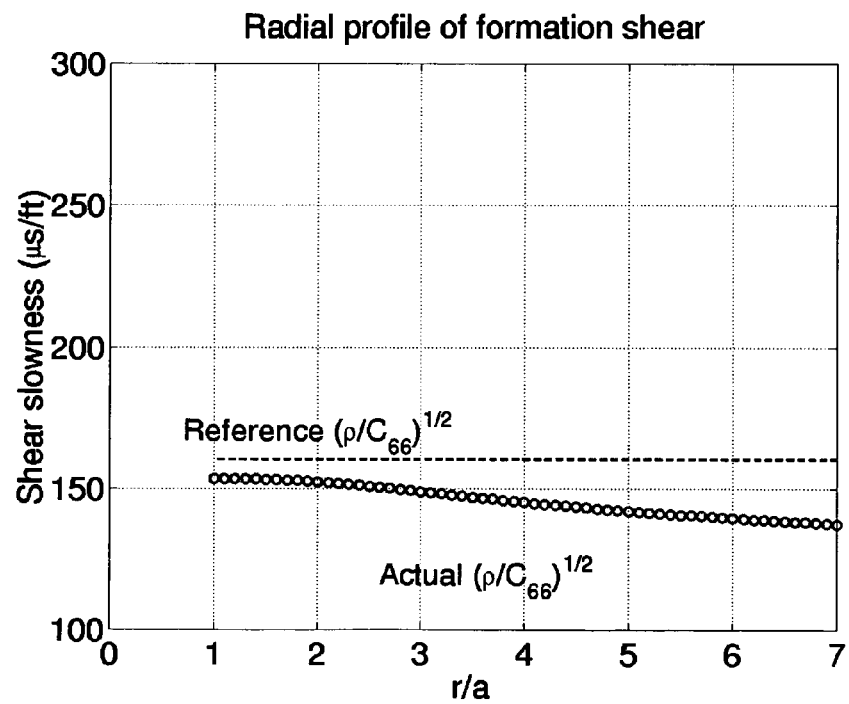
Figure 14A:
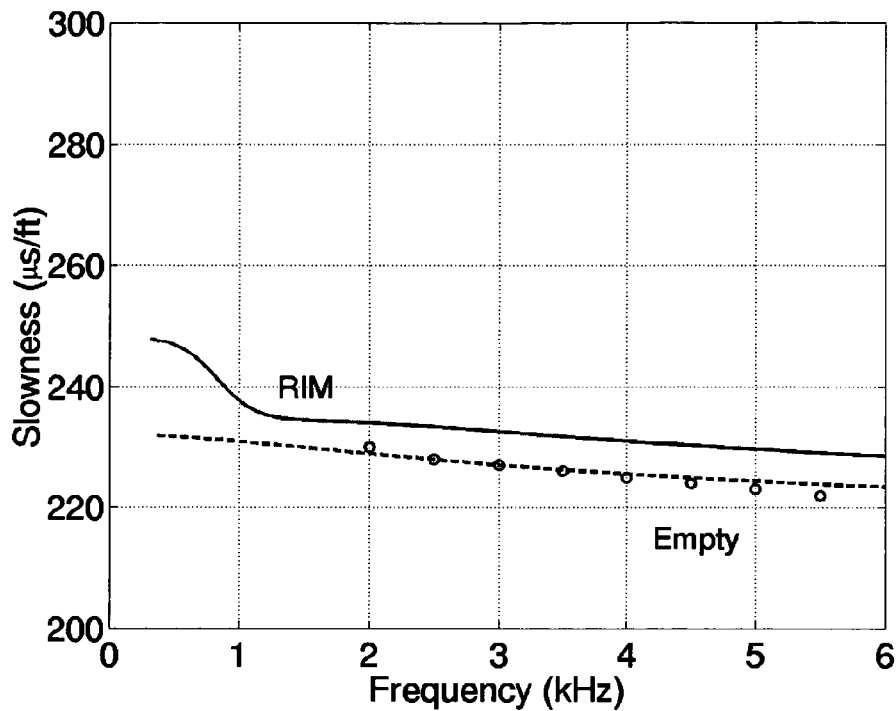
FIGS. 14a-14d illustrate a sequence of data acquisition and processing results to obtain a Stoneley radial profile of horizontal shear slowness using the RIM model for an acoustic tool in a well of known parameters at a depth of 792 feet.
Figure 14B:
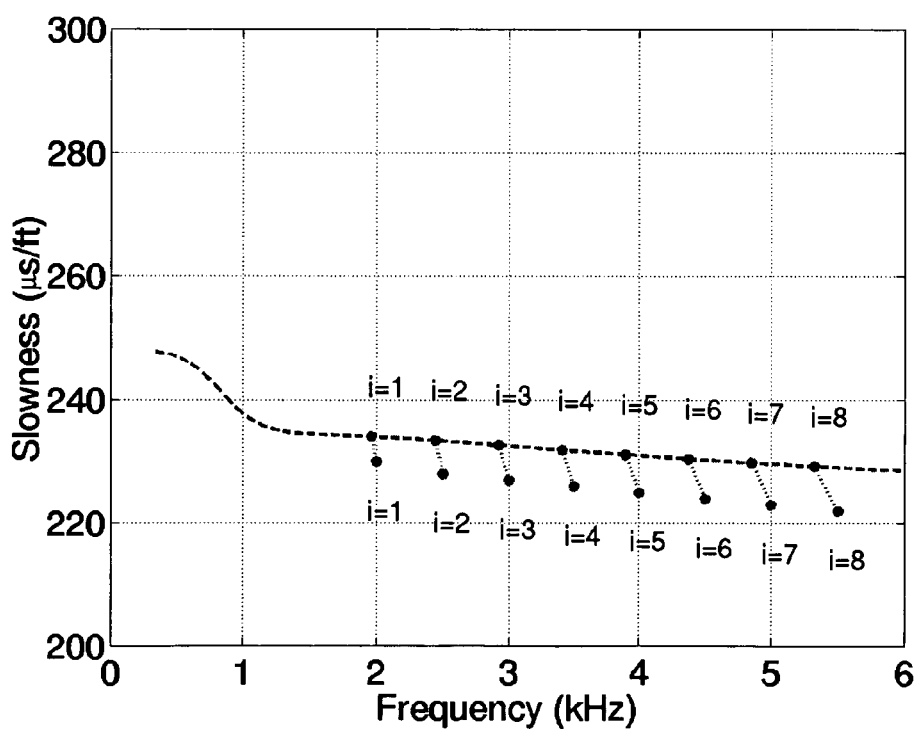
Figure 14C:
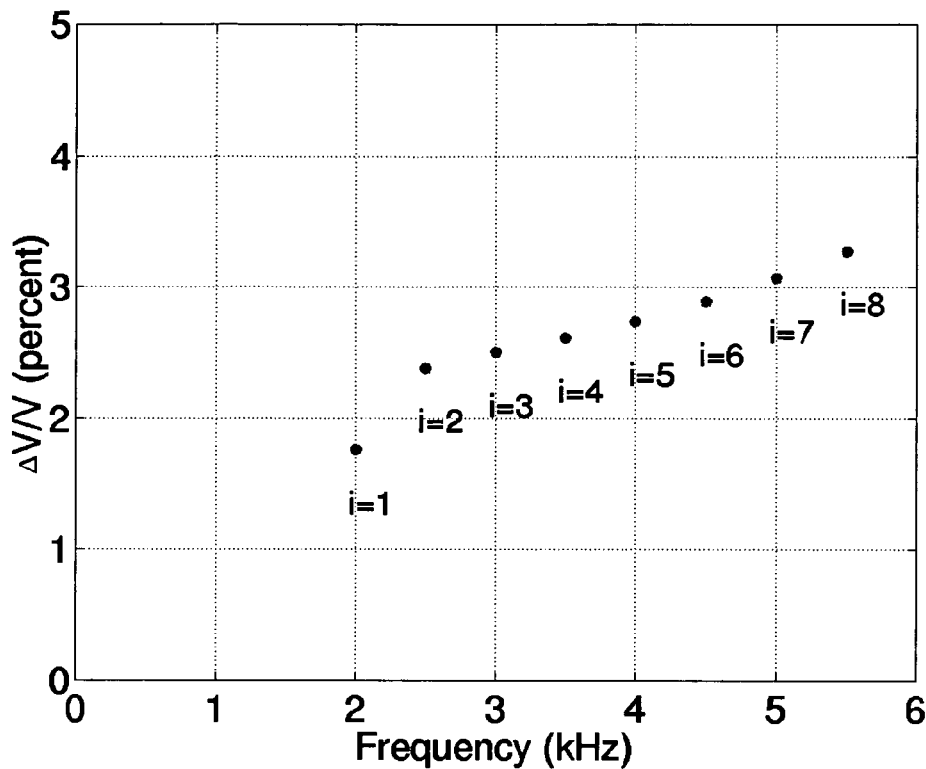
Figure 14D:
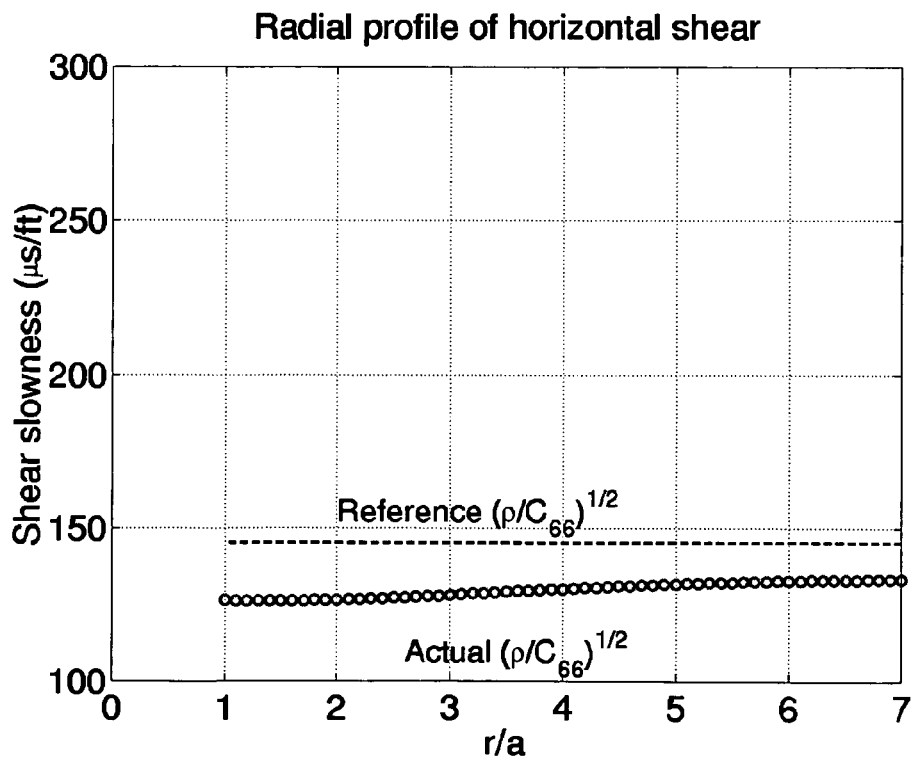
Figure 15A:
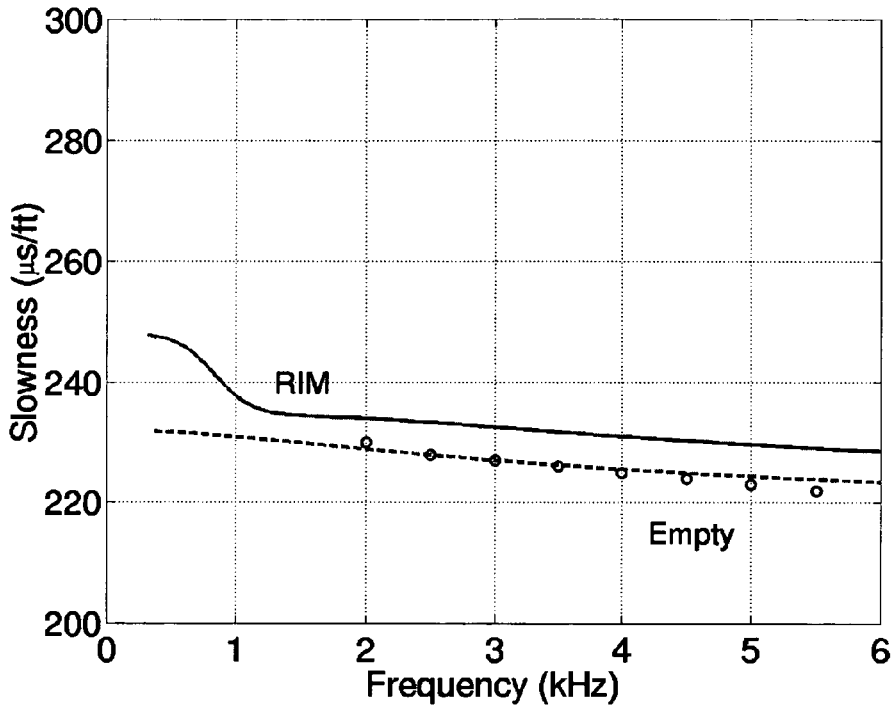
FIGS. 15a-15d illustrate a Stoneley radial profile of horizontal shear slowness using an empty borehole model for an acoustic tool in a well of known parameters at a depth of 792 feet.
Figure 15B:
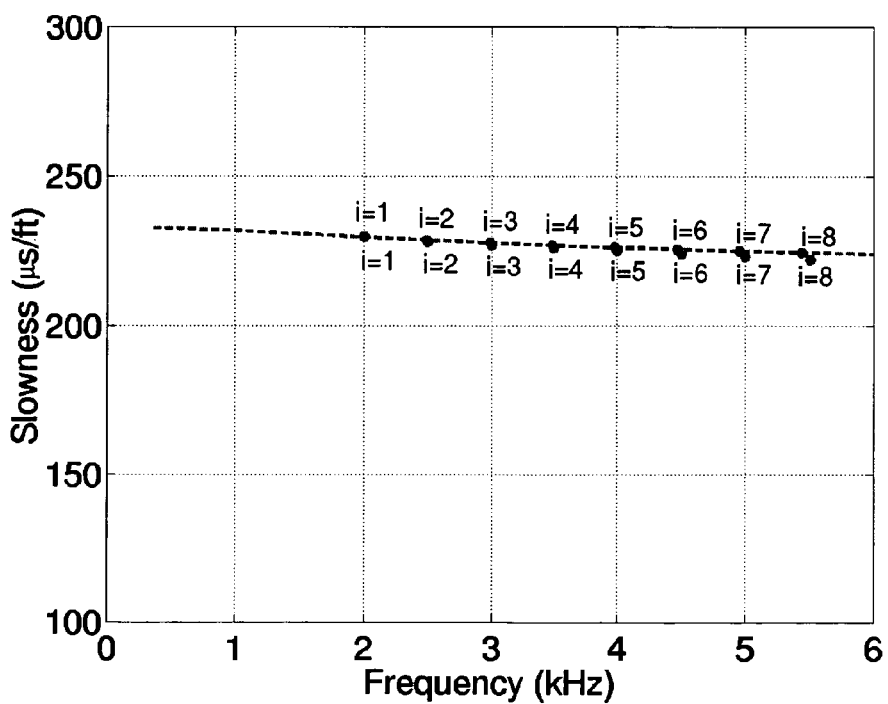
Figure 15C:
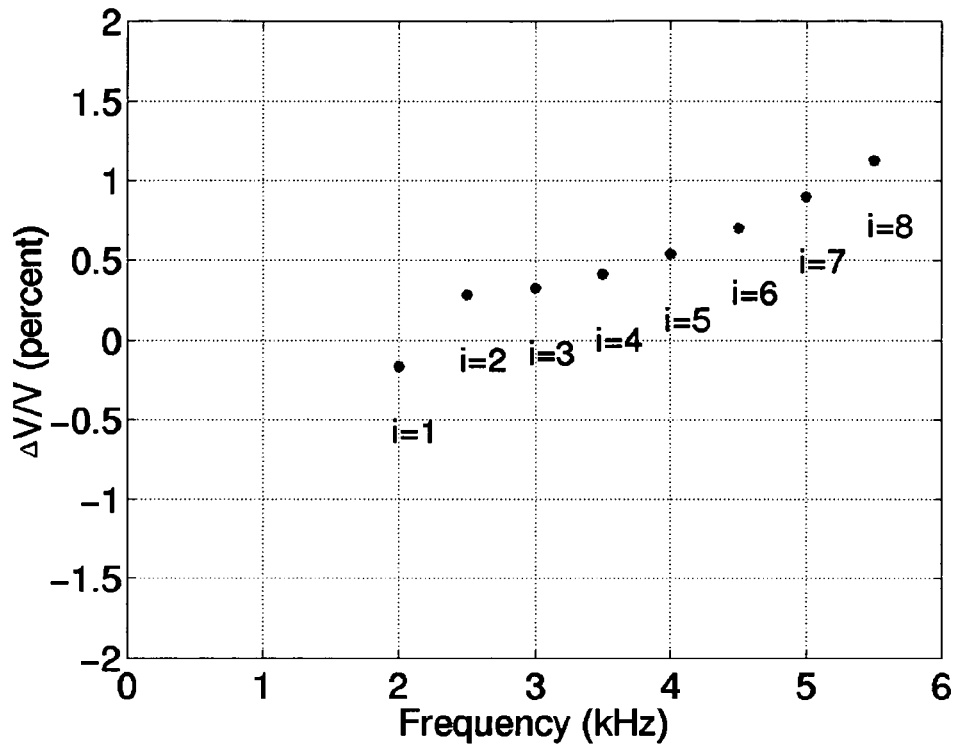
Figure 15D:
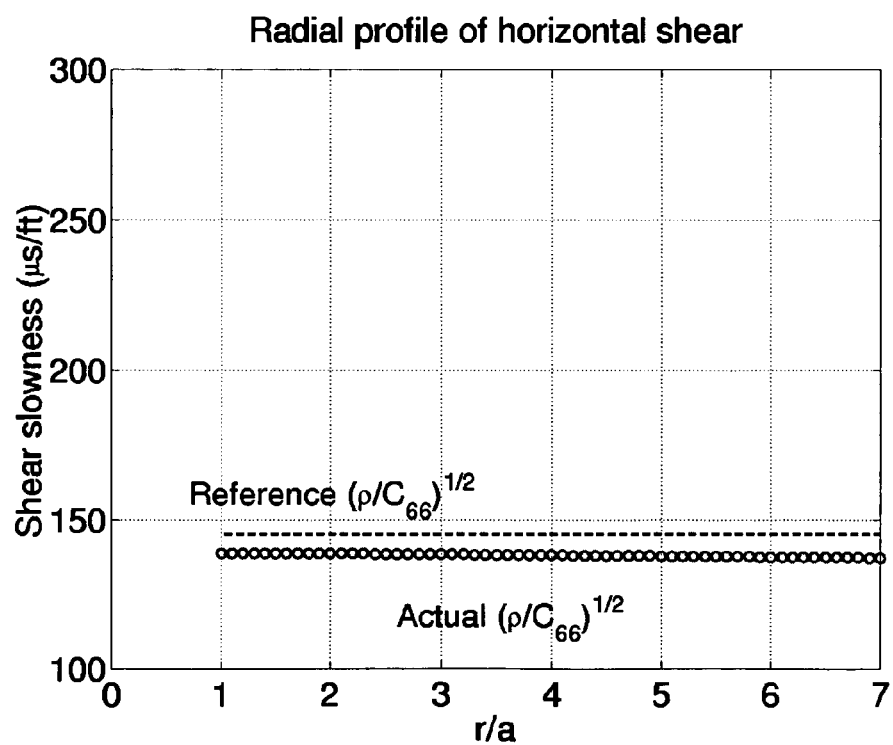
Figure 16A:
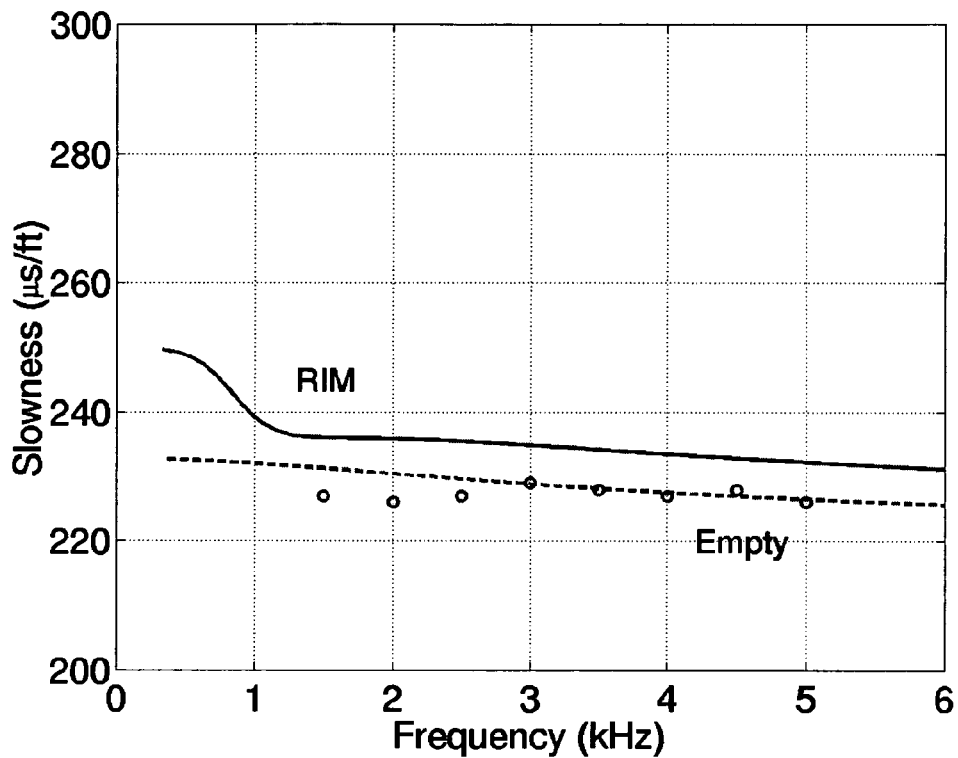
FIGS. 16a-16d illustrate a Stoneley radial profile of horizontal shear slowness using the RIM model for an acoustic tool in a well of known parameters at a depth of 920 feet.
Figure 16B:
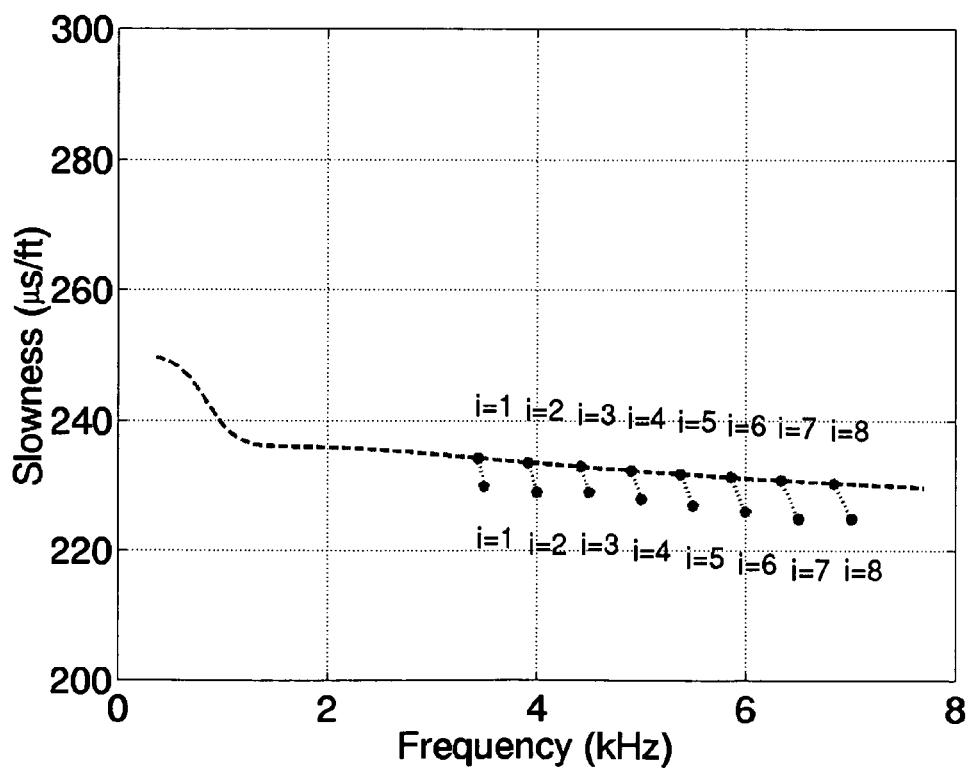
Figure 16C:
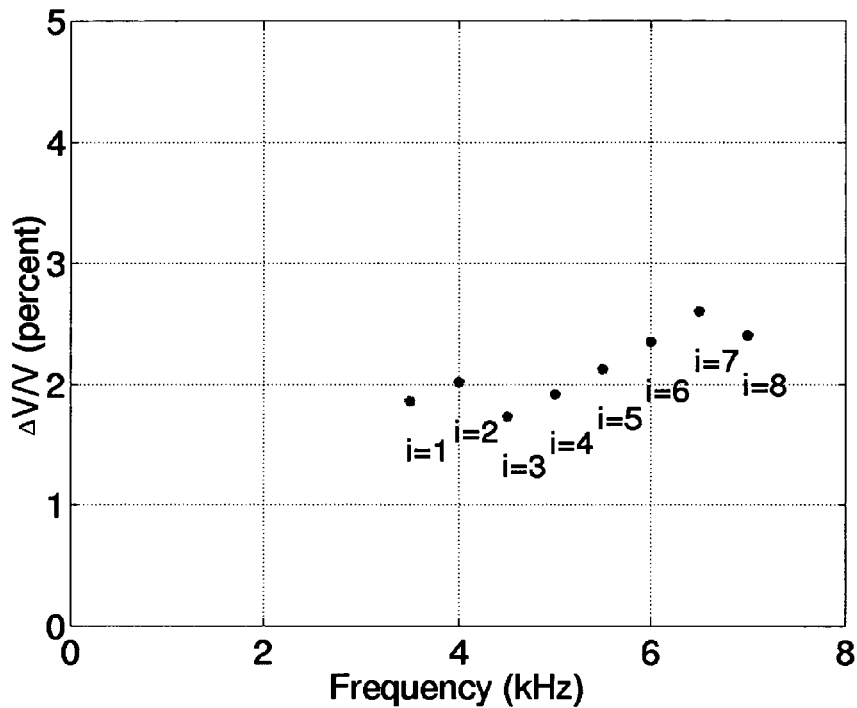
Figure 16D:
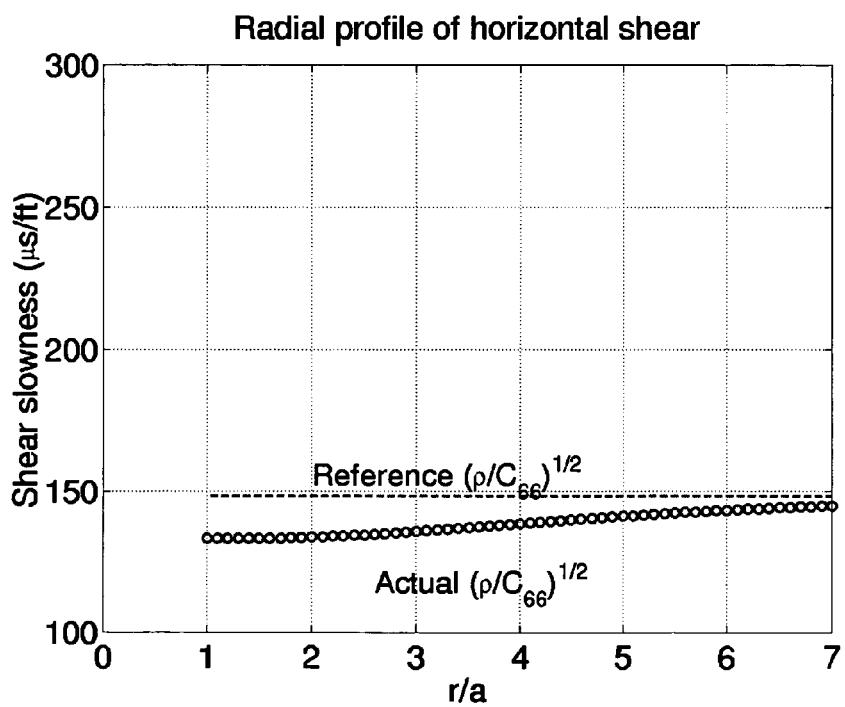
Figure 17A:
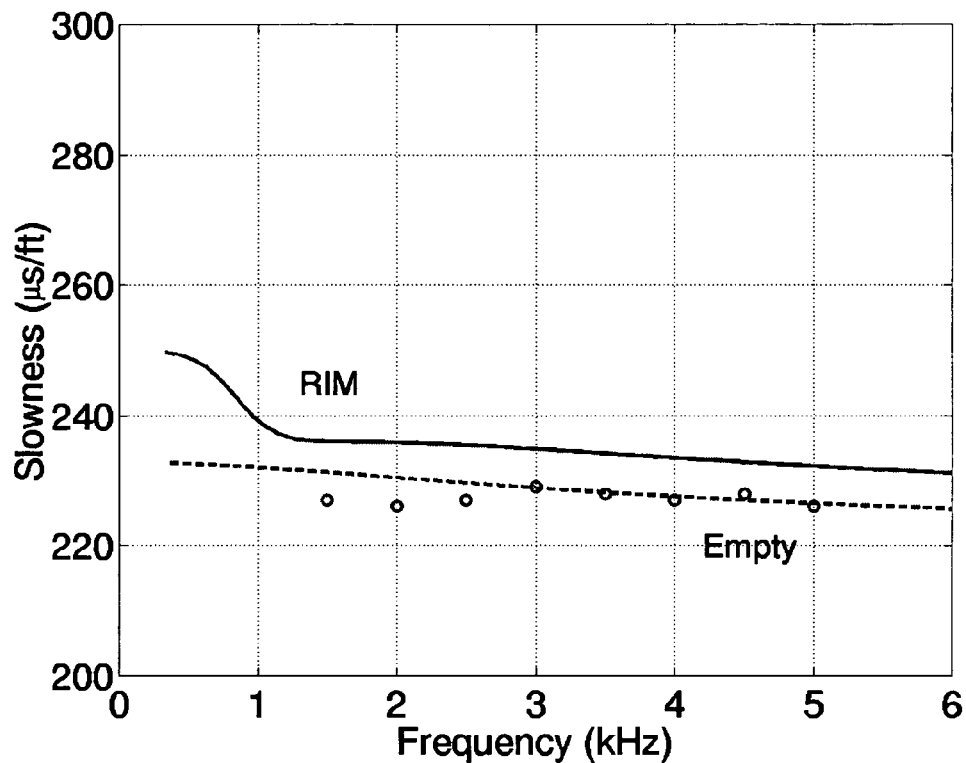
FIGS. 17a-17d illustrate a Stoneley radial profile of horizontal shear slowness using an empty borehole model for an acoustic tool in a well of known parameters at a depth of 920 feet.
Figure 17B:
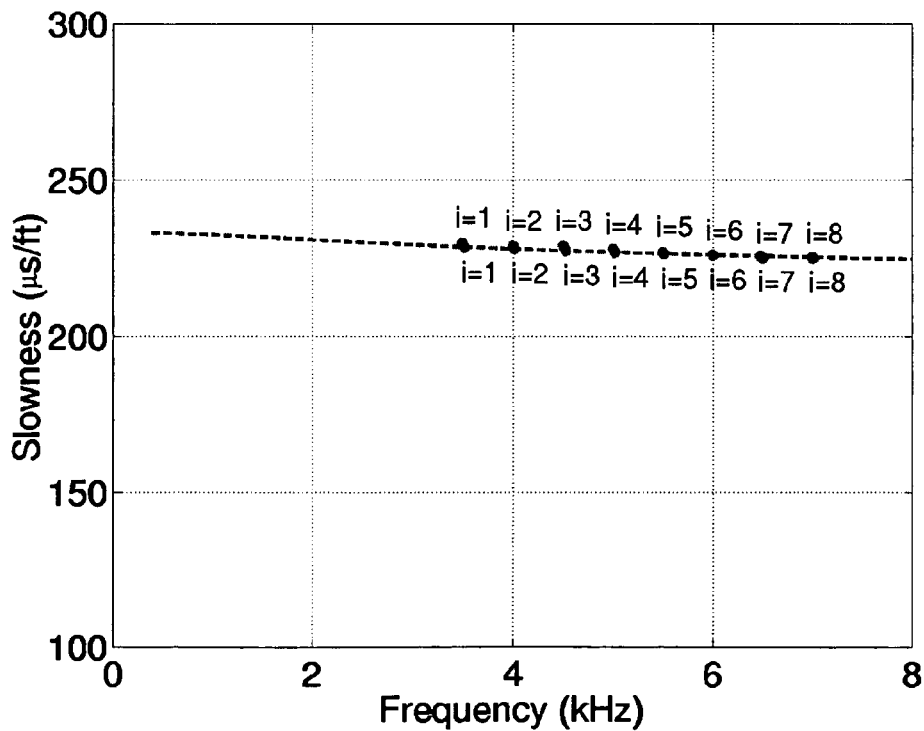
Figure 17C:
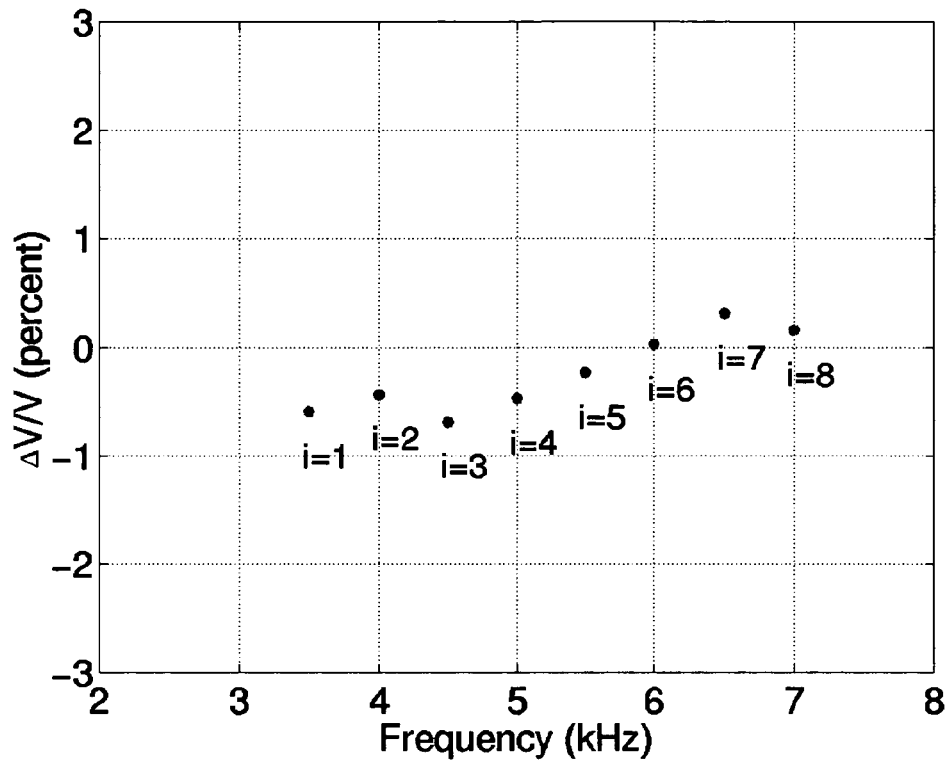
Figure 17D:
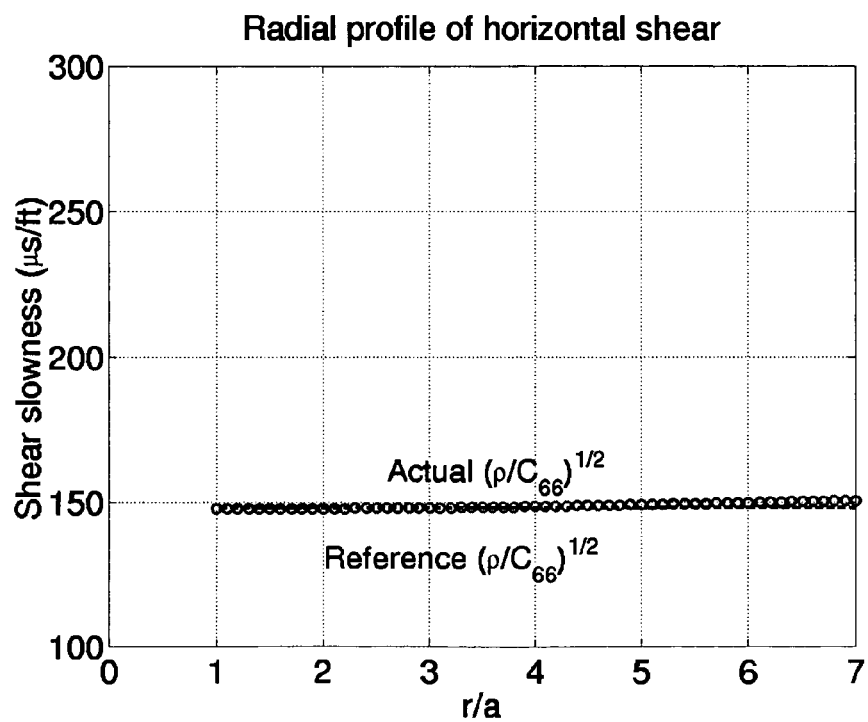
Figure 18A:
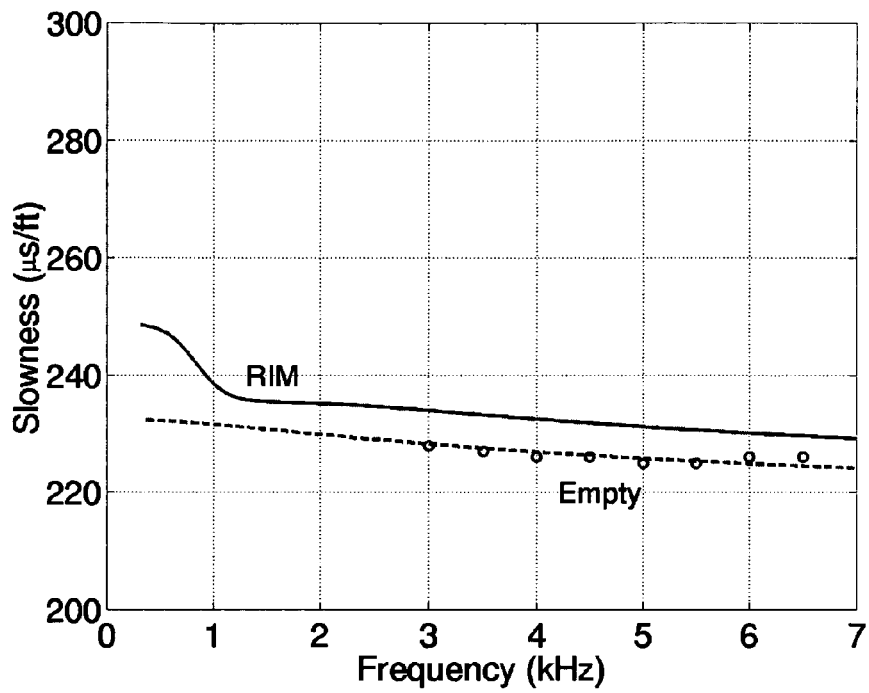
FIGS. 18a-18d illustrate a Stoneley radial profile of horizontal shear slowness using the RIM model for an acoustic tool in a well of known parameters at a depth of 1108.5 feet.
Figure 18B:
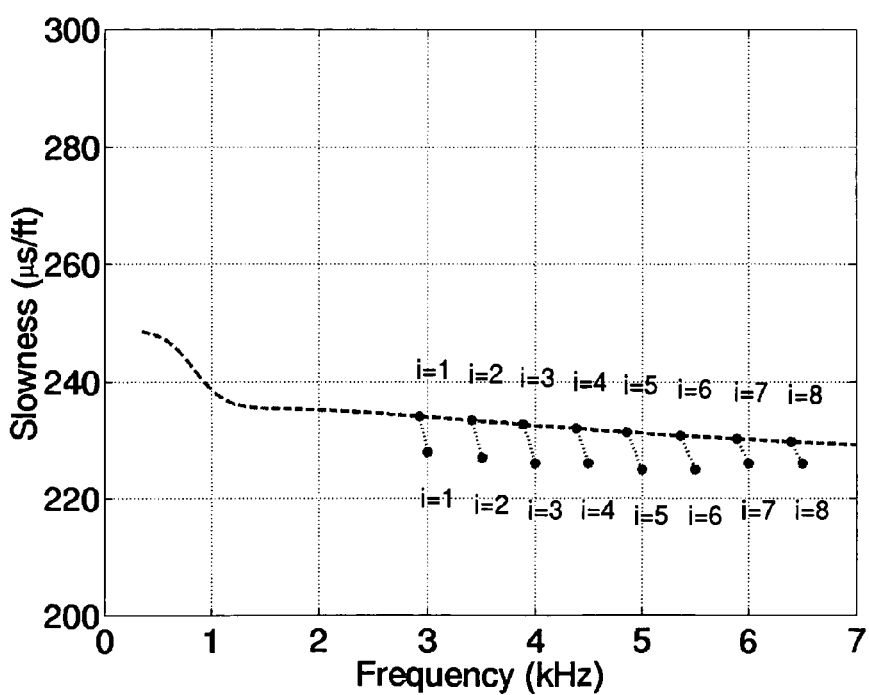
Figure 18C:
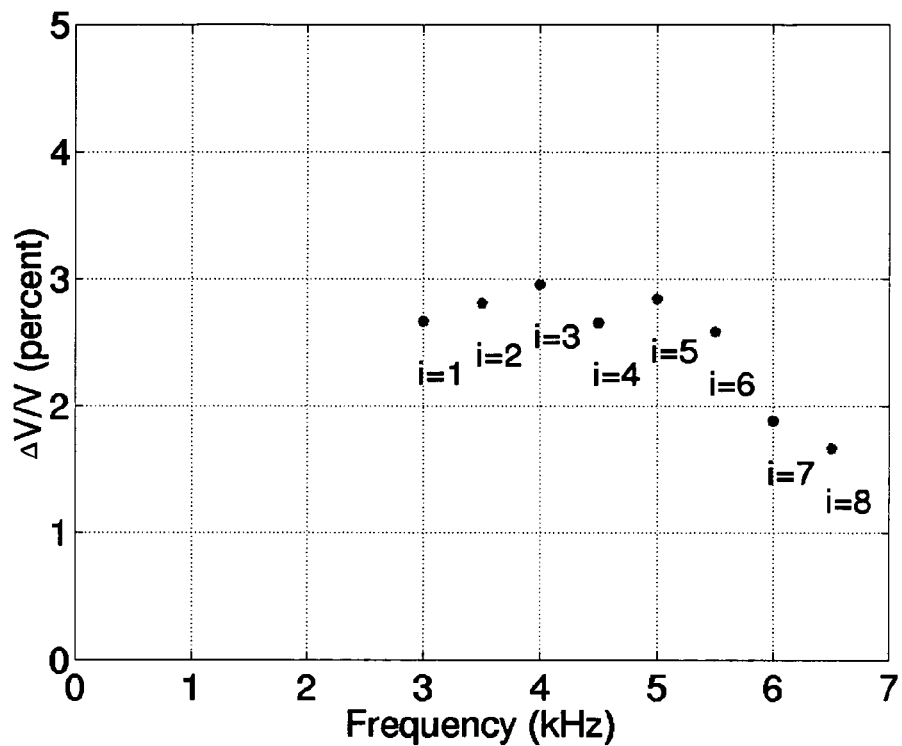
Figure 18D:
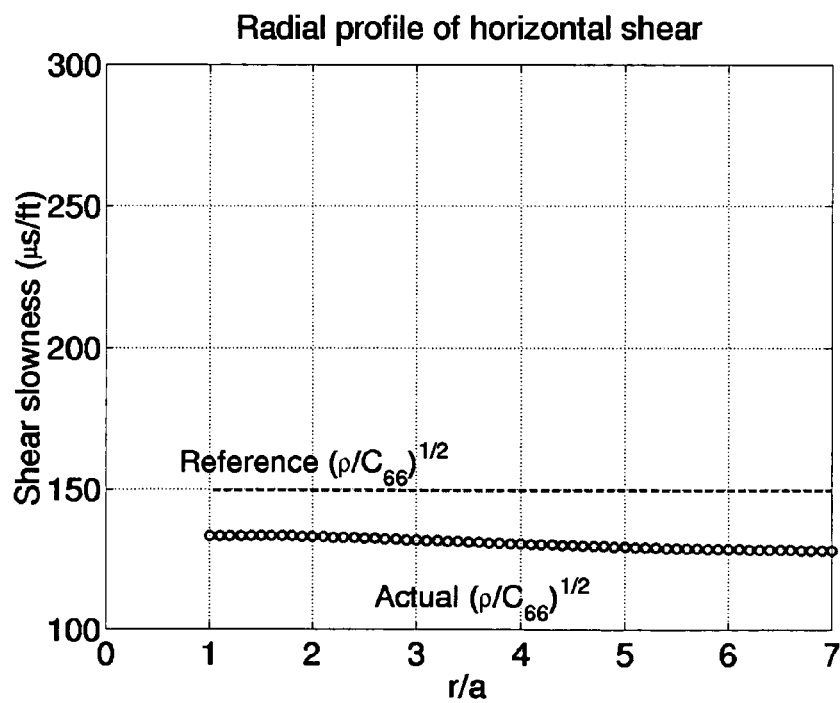
Figure 19A:
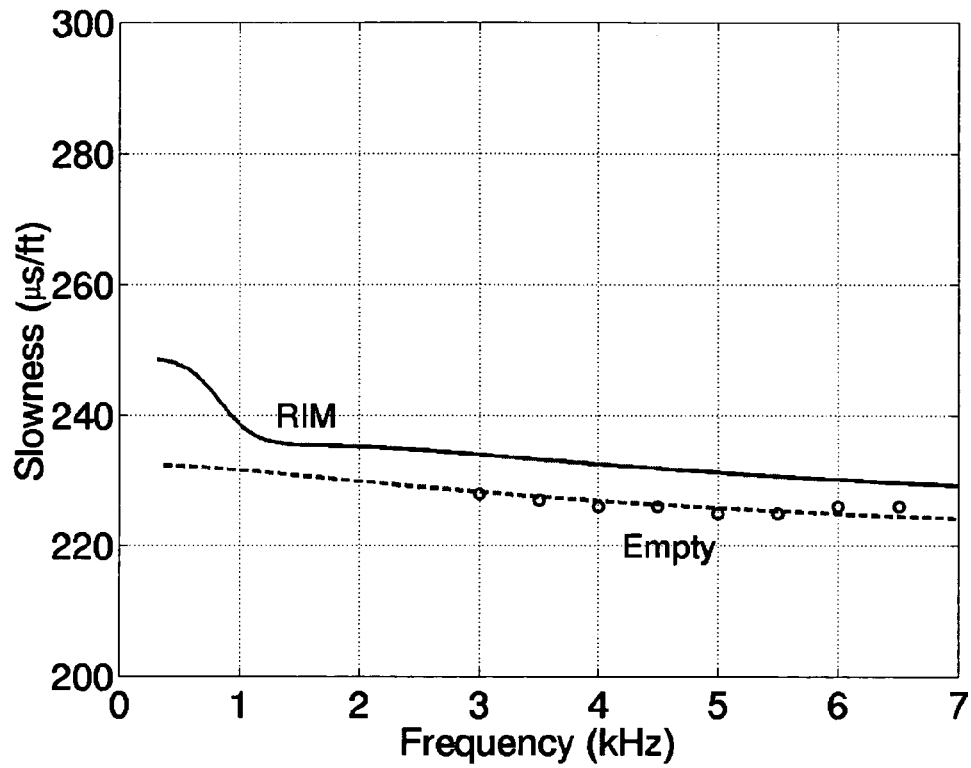
FIGS. 19a-19d illustrate a Stoneley radial profile of horizontal shear slowness using an empty borehole model for an acoustic tool in a well of known parameters at a depth of 1108.5 feet.
Figure 19B:
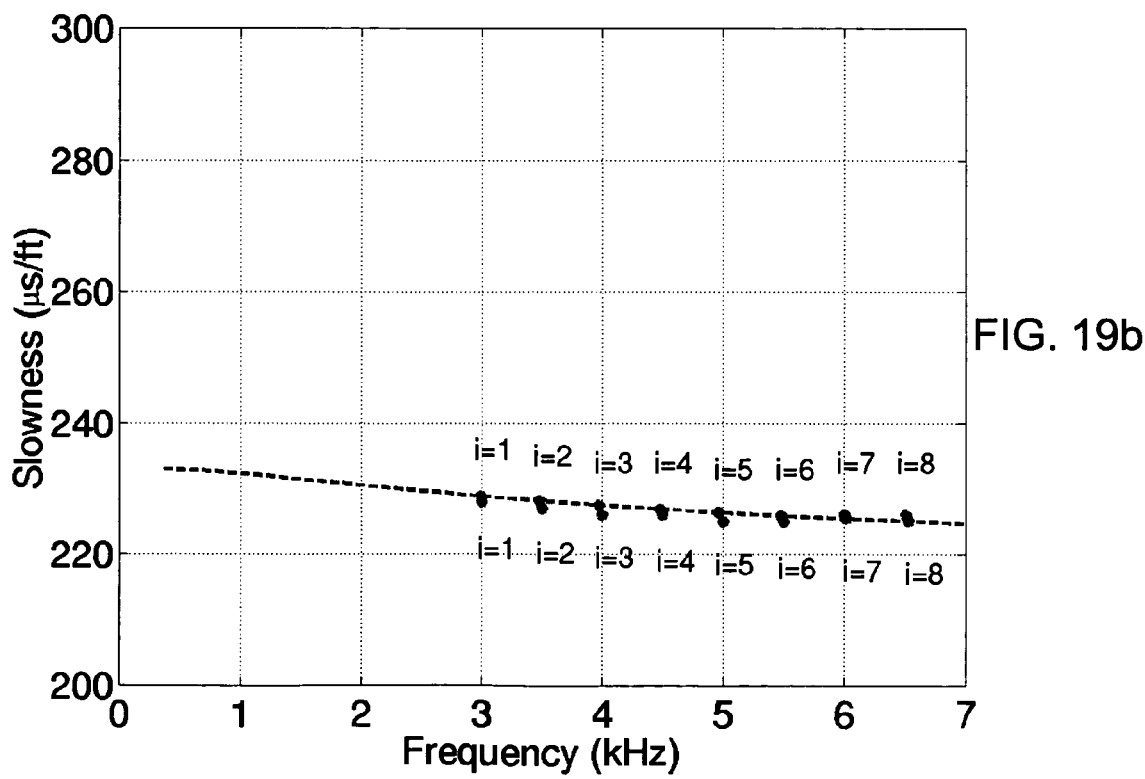
Figure 19C:
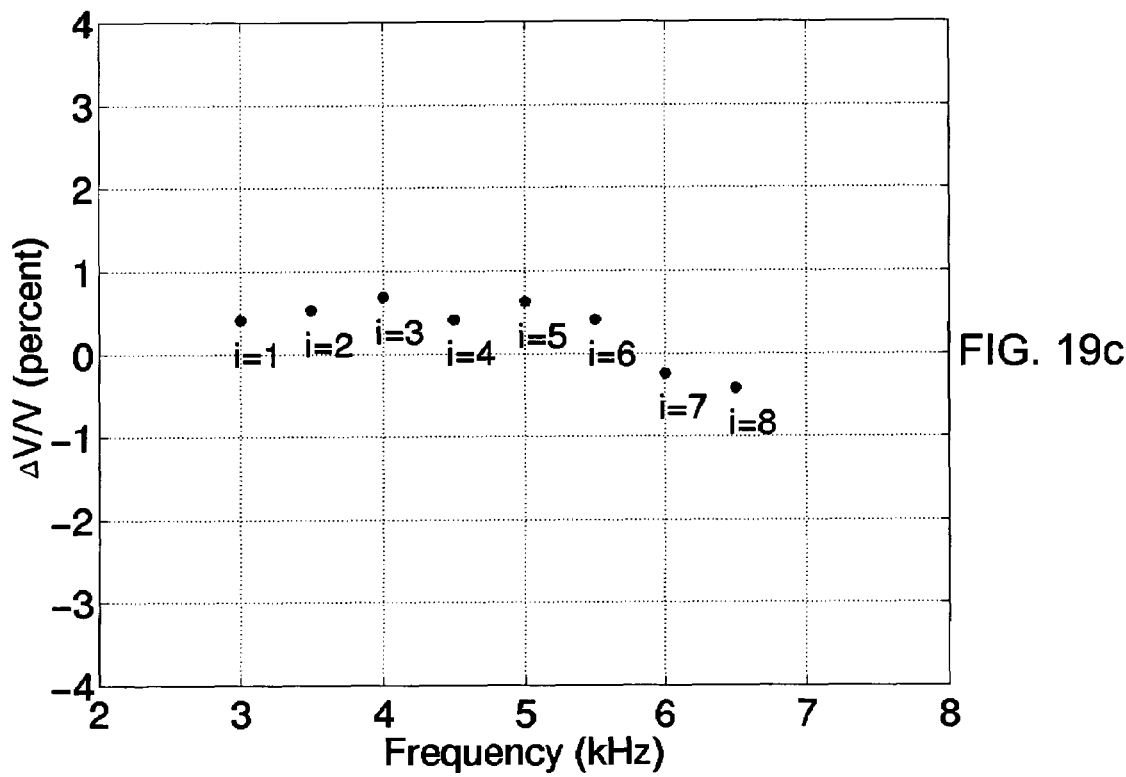
Figure 19D:
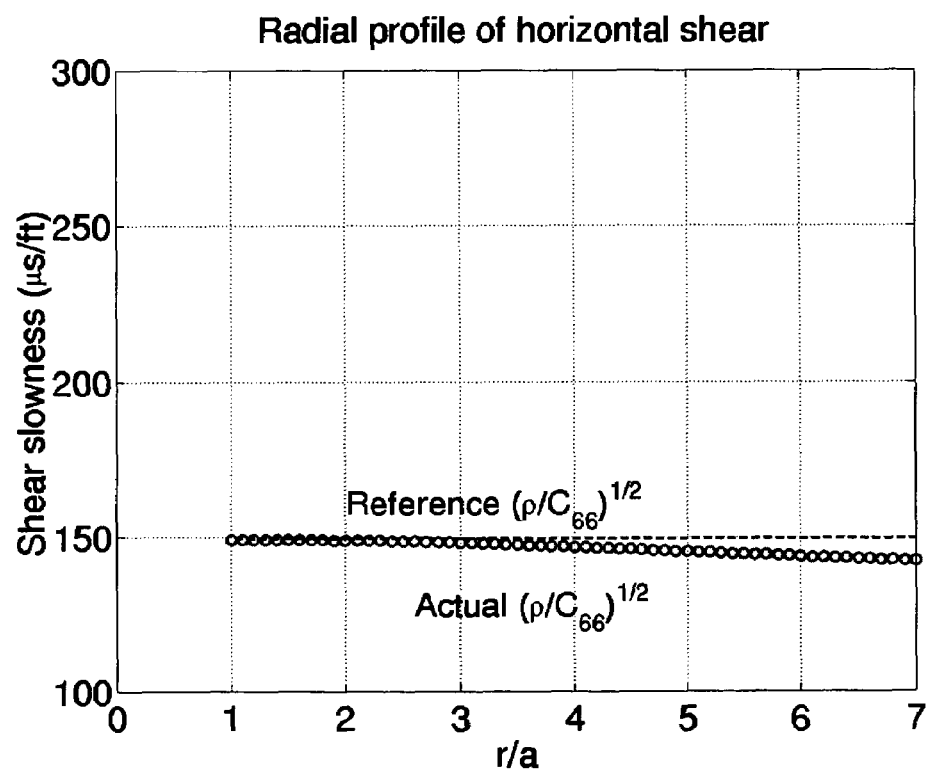

FIGS. 11a-11d summarize results for an empty borehole obtained from the same known well Stoneley data and depth as those shown in FIGS. 10a-10d. In view of the known tool bias in the data, results based on an empty borehole model may be unreliable. However, the goal of this comparison is simply to study differences in the radial profiles using the two different models. FIG. 11a is similar to FIG. 10a where we compare borehole Stoneley dispersions for the resonance-impedance model with that of an empty borehole surrounded by a formation with the same parameters. FIG. 11b displays the measured Stoneley dispersion by discrete, points and the dashed curve denotes the empty borehole Stoneley dispersion in the reference state. FIG. 11c shows fractional changes in the measured dispersion from the reference empty borehole Stoneley dispersion. FIG. 1d displays the inverted radial profile of shear slowness obtained using the empty borehole model at a depth of 590 ft in the known well. Comparing shear slowness radial profiles in FIGS. 10d and 11d, it is clear that the radial profile in FIG. 10d indicates a different radial profile than that shown in FIG. 11d.

FIGS. 12a-13d show results obtained from the Stoneley data at a depth of 724.5 ft. The layout and notation in these figures are the same as that found in FIGS. 10a-d and 11a-d, respectively. While the radial profile of horizontal shear slowness obtained using the resonance-impedance model in FIG. 12d is essentially uniform, results obtained using an empty borehole model show a significant near-wellbore alteration in FIG. 13d. Results shown in FIG. 12 using the resonance-impedance model are more meaningful than those in FIG. 13.

Similarly, FIGS. 14a-d and 15a-d show results obtained from the Stoneley data at depth 792 ft using the RIM and empty borehole models, respectively. Again the layout and notation in these figures are the same as in FIGS. 10a-d and 11a-d. The resonance-impedance model shows some degree of near-wellbore stiffening in FIG. 14d, whereas the empty borehole model shows a significantly lesser amount of near-wellbore stiffening of the formation. The far-field horizontal shear slowness estimates are about the same in the two cases.

FIGS. 16a-d and 17a-d, respectively, show similar results obtained from the Stoneley data at depth 920 ft using the RIM and empty borehole model. Since the Stoneley data at the lowest frequency of 3.5 kHz is somewhat high, we do not observe a steady-state far-field shear slowness in FIG. 16d. There is an evidence of near-wellbore stiffening that extends up to about three times borehole diameter. In contrast, radial profile of the horizontal shear slowness obtained from the empty borehole model exhibits almost no radial variation in FIG. 17d.

Continuing with additional illustrative examples, results are obtained from the Stoneley data at a depth of 1108.5 ft in FIGS. 18a-d and 19a-d, respectively, using the RIM and empty borehole model. Similar to the results at depth 920 ft, we observe that the radial profile of horizontal shear slowness obtained from the resonance-impedance model shows some degree of near-wellbore stiffening, whereas the radial profile obtained from an empty borehole model is essentially uniform.

Sensitivity and Radial Depth of Investigation

The sensitivity and radial depth of investigation of data kernels $G_i(r)$ associated with the Stoneley mode vary significantly with formation parameters and borehole diameters for the resonance-impedance and empty borehole models. The magnitude of data kernel shows sensitivity of fractional changes in the Stoneley dispersion to fractional changes in shear modulus at various radial positions.

Figure 20A:
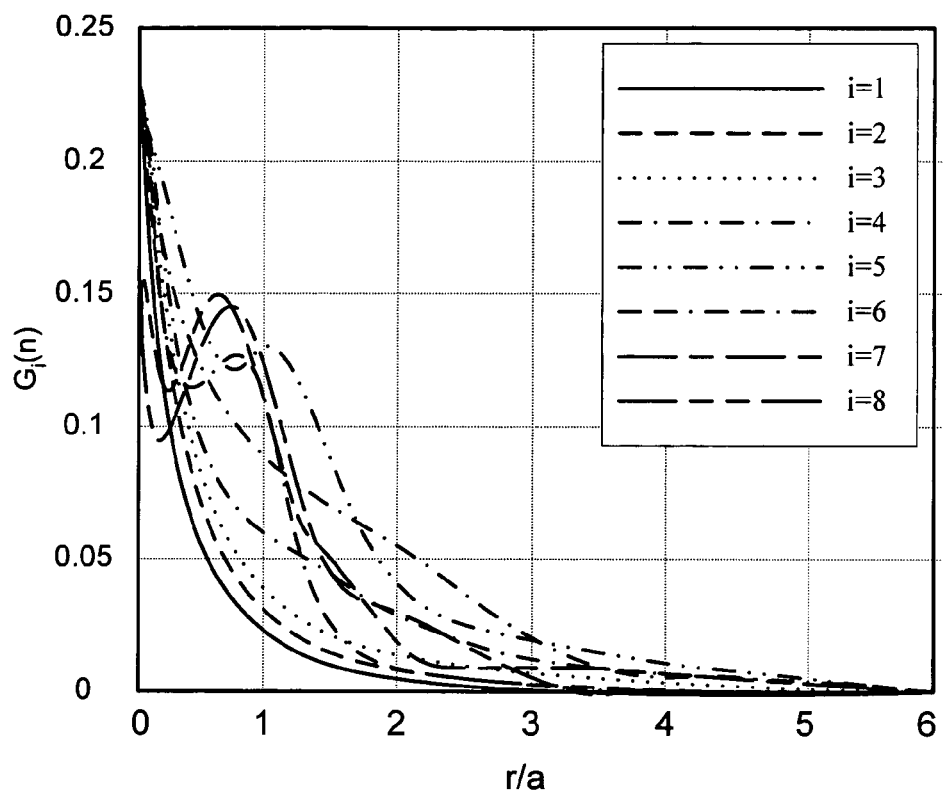
FIGS. 20a-20d illustrate data kernels and an averaging weight function at a depth of 590 feet according to one embodiment of the present invention.
Figure 20B:
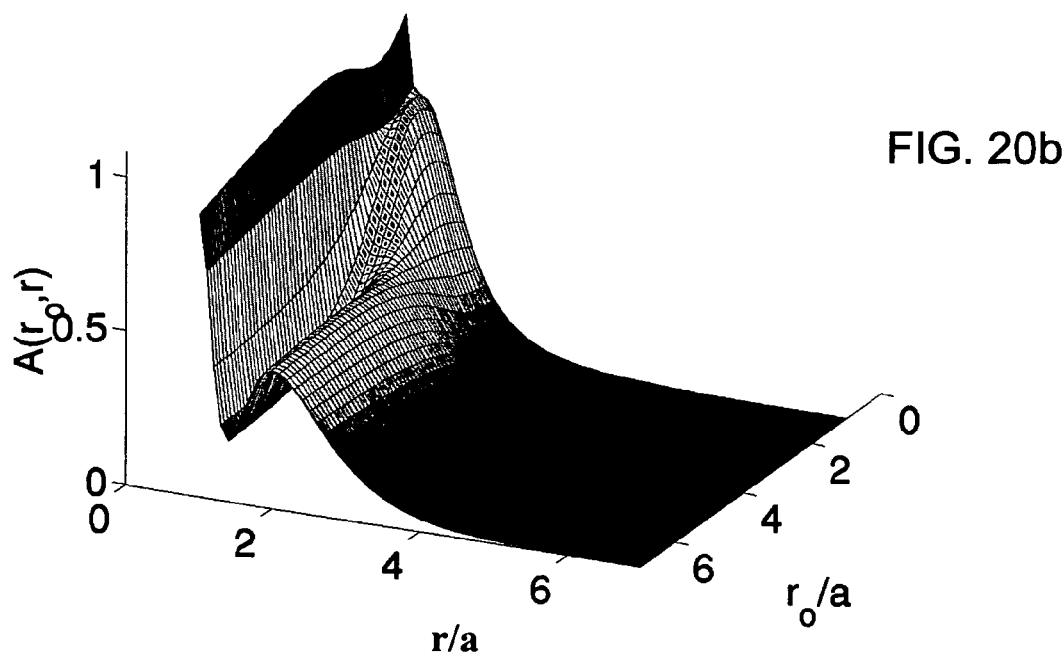
Figure 20C:
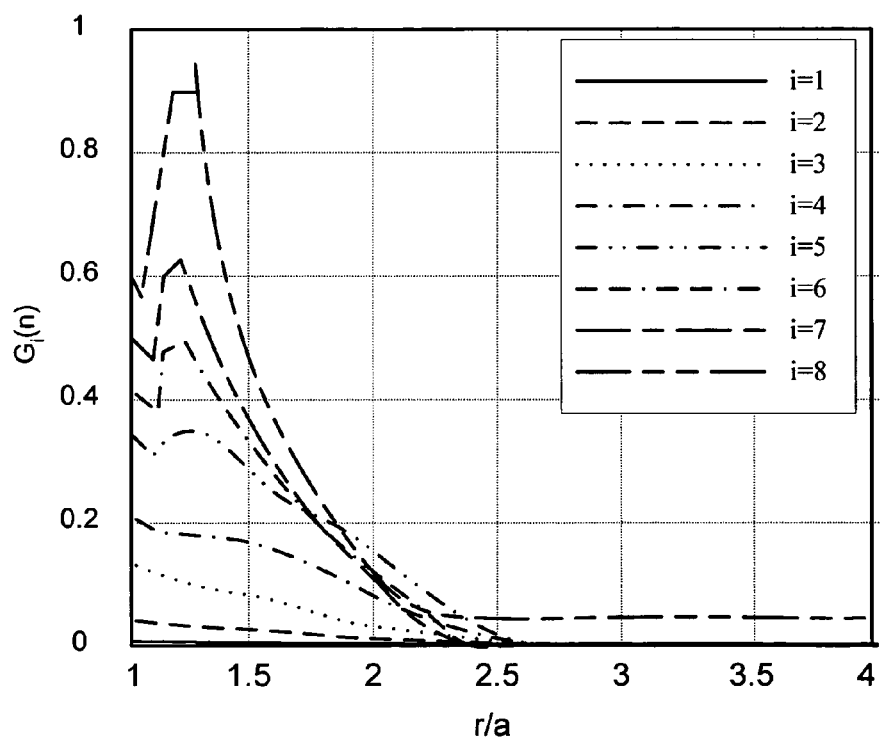
Figure 20D:
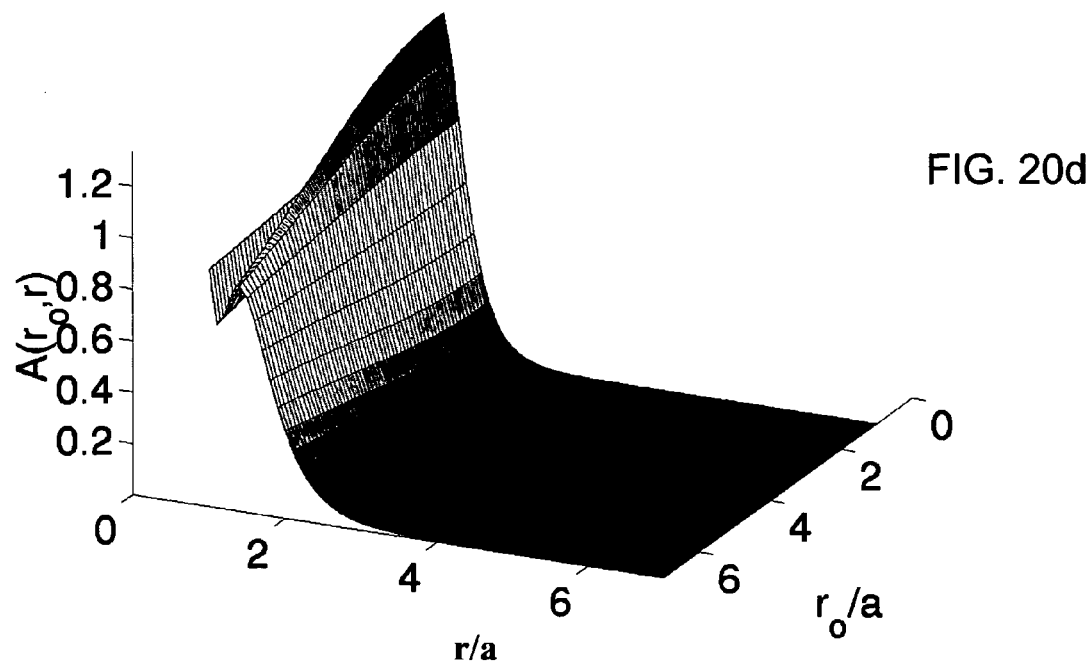
Figure 21A:
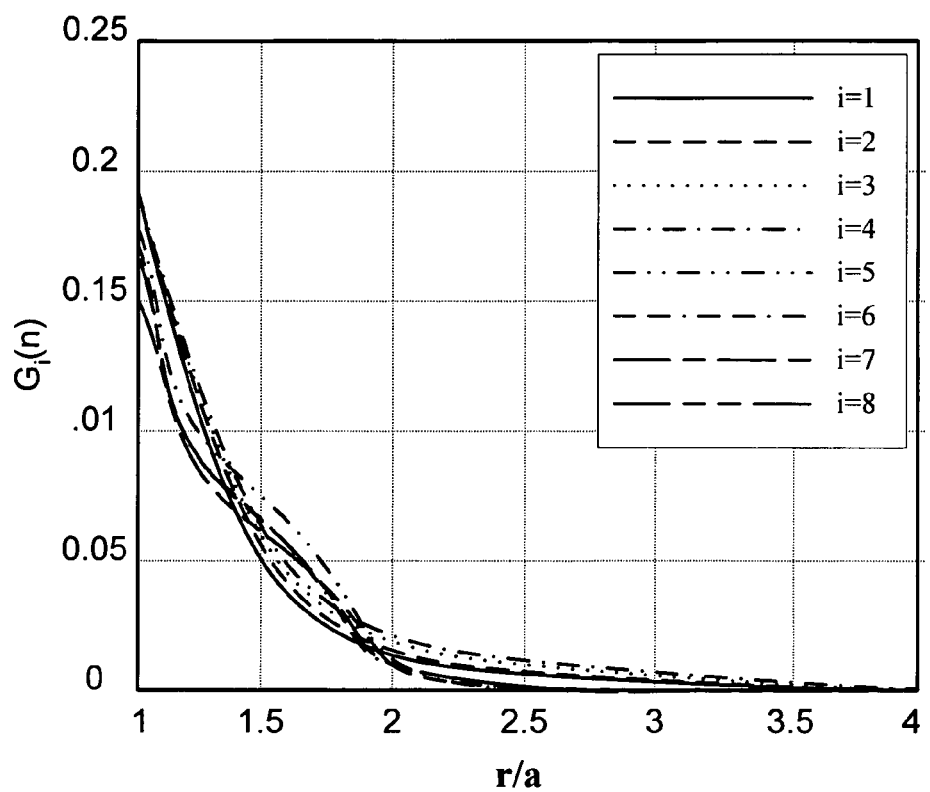
FIGS. 21a-21d illustrate data kernels and an averaging weight function at a depth of 920 feet according to one embodiment of the present invention.
Figure 21B:
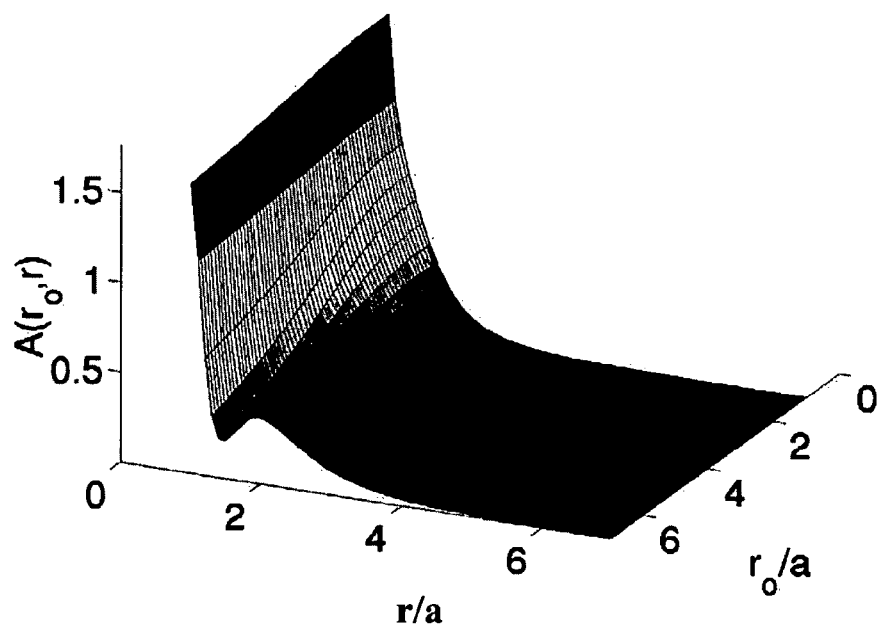
Figure 21C:
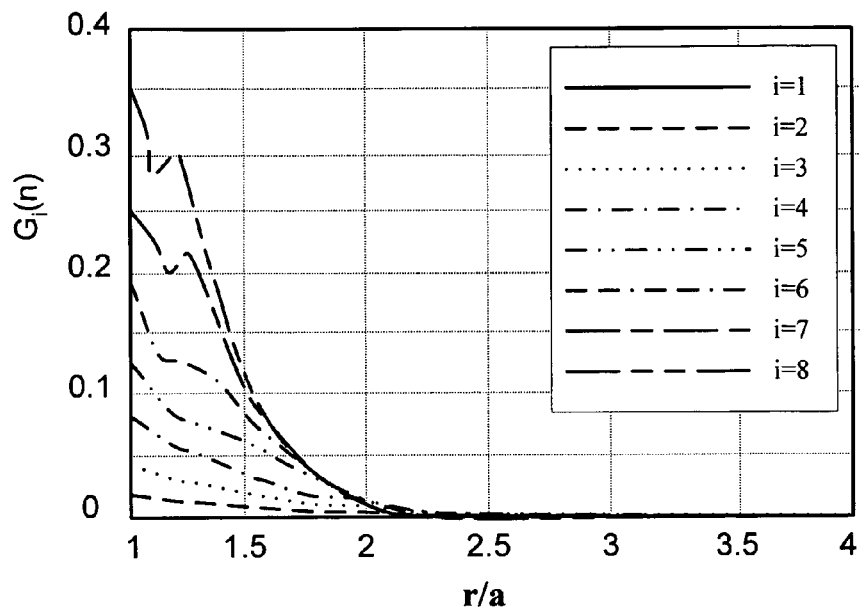
Figure 21D:
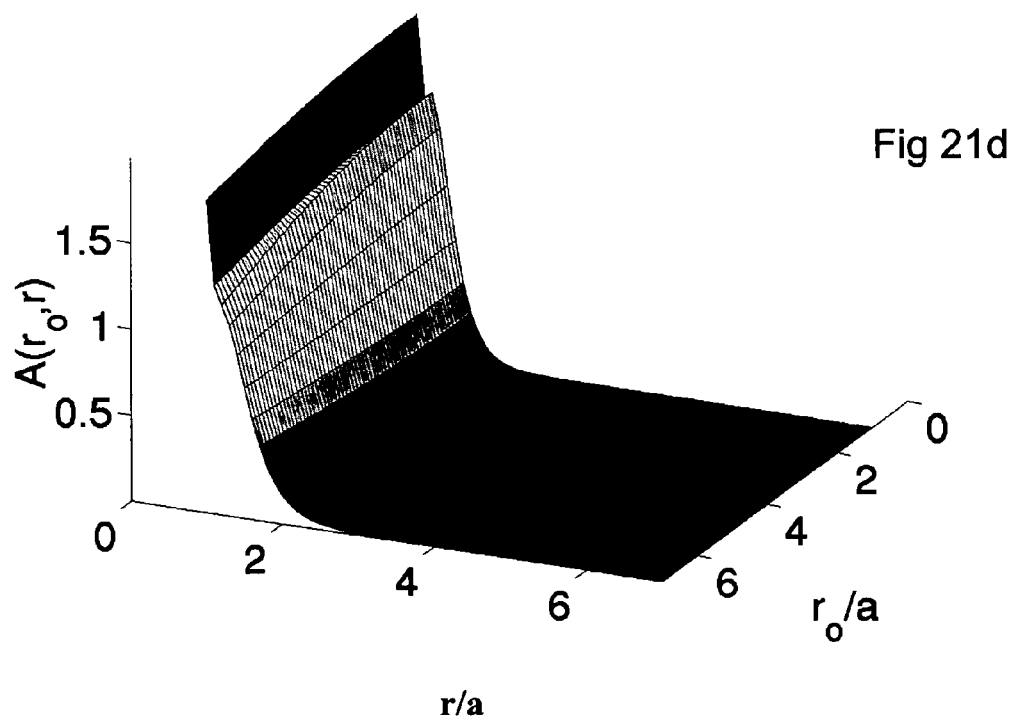
Figure 22A:
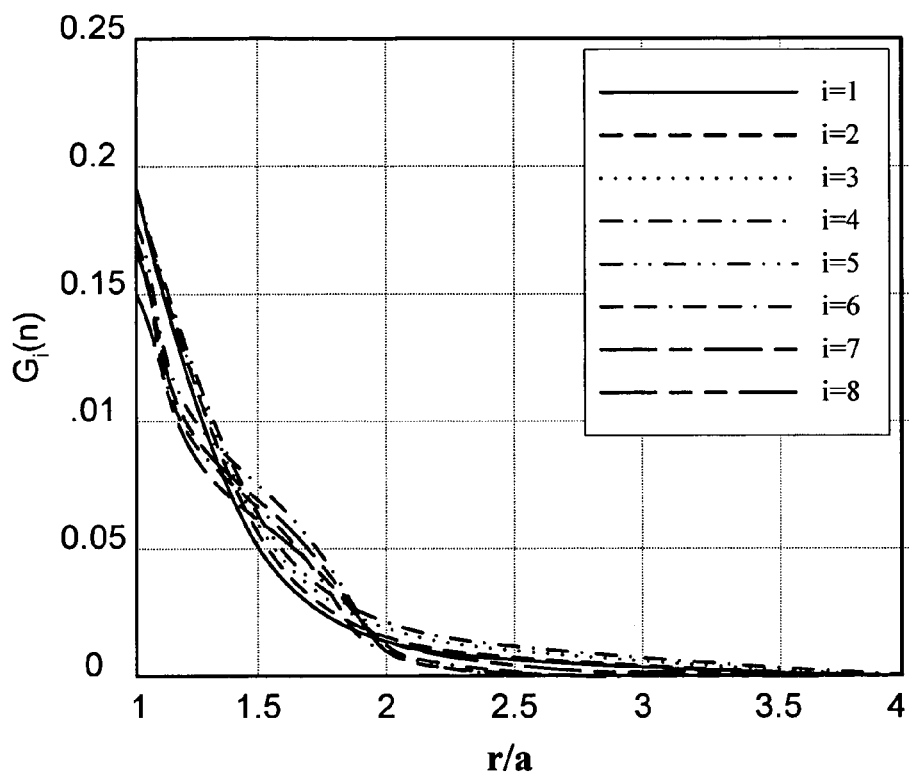
FIGS. 22a-22d illustrate data kernels and an averaging weight function at a depth of 1108.5 feet according to one embodiment of the present invention.
Figure 22B:
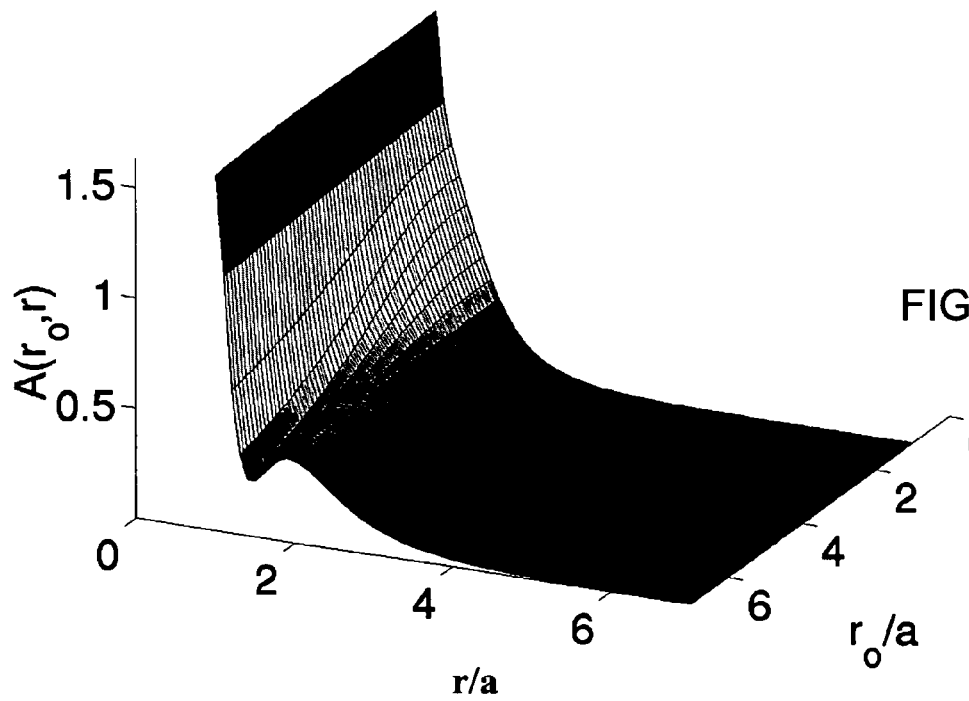
Figure 22C:
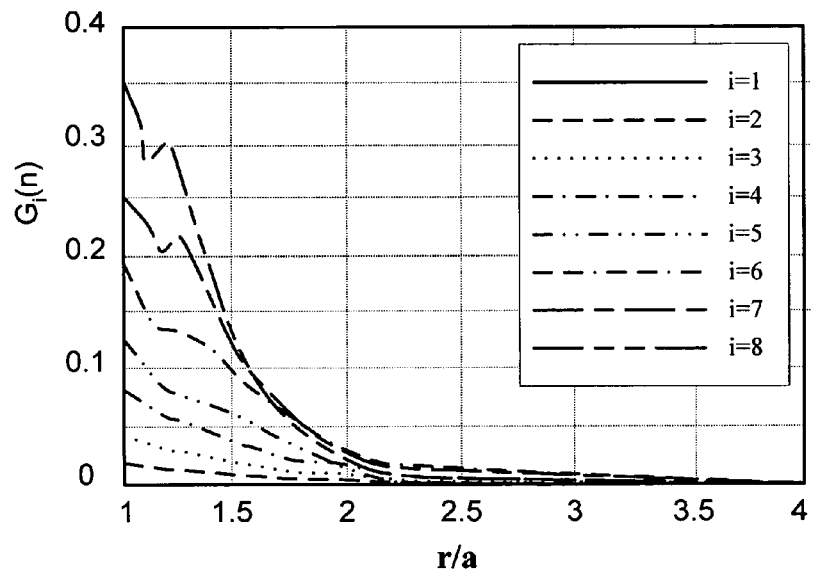
Figure 22D:
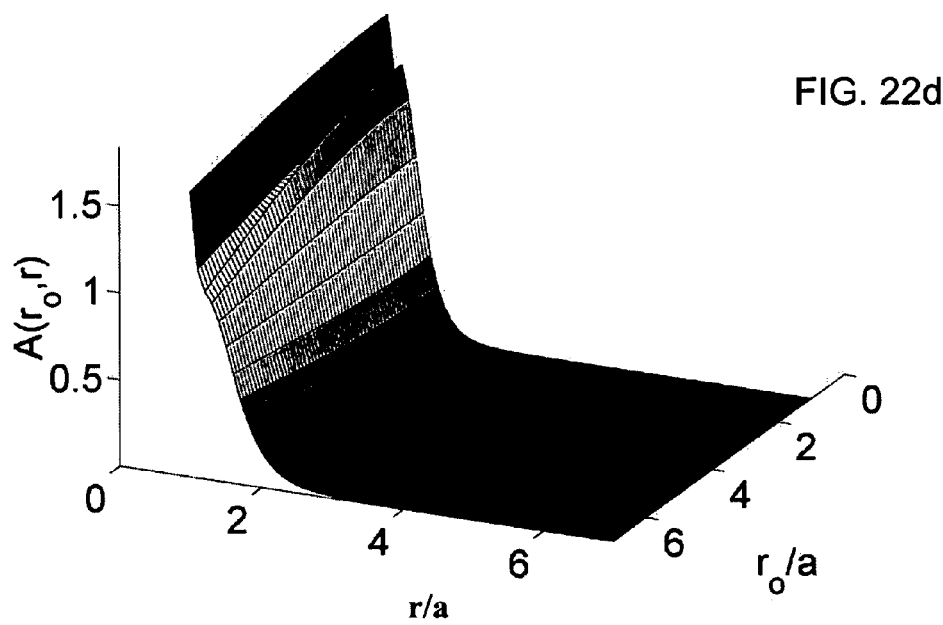

FIG. 20a shows a radial variation of data kernels $G_i$ for the Stoneley mode at eight different frequencies (i=1, 2, 3, . . . . 8) in the presence of an acoustic (MSIP) tool simulated by the RIM. Results for the formation parameters are at depth 590 ft. FIG. 20b shows the averaging weight function $A(r_o,r)$ that was been used for estimating the horizontal shear slowness at various radial positions. In contrast, FIG. 20c displays radial variation of data kernels $G_i$ for the Stoneley mode at the same eight frequencies for the empty borehole model. Similar to FIG. 20b, the averaging weight function $A(r_o,r)$ for the empty borehole model is shown in FIG. 20d.

FIGS. 21a-d and 22a-d, respectively, show similar plots for the data kernel and averaging function associated with the radial profile of horizontal shear slowness as a function of radial position for depths 920 and 1108.5 ft, respectively.

Generally speaking, one observes that the low-frequency data kernels for the resonance-impedance model possess larger magnitude and radial depth of investigation than those for the empty borehole model. In contrast, the high-frequency data kernels exhibit larger magnitude for the empty borehole model than those for the resonance-impedance model. In addition, the radial depth of investigation of the data kernel for the resonance-impedance model is larger than that for the empty borehole model.

SRP of Horizontal Shear Slowness

One procedure for the detection and estimation of mechanical alteration caused by radial variation of horizontal shear slowness around a borehole comprises: selecting a depth interval; measuring or estimating borehole diameter d with, for example, a standard 4- or 6-arm caliper; measuring or estimating mud compressional velocity $V_f$; from, for example, the mud composition, mass density, in-situ pressure and temperature; measuring or estimating formation mass bulk density $\rho_b$ and mud mass density $\rho_f$ from, for example the drilling mud weight used in the depth interval of interest; determining the formation compressional velocity $V_p$ in the (far-field) region outside any mechanically altered annulus from a standard sonic log; and estimating an initial guess of formation shear modulus $c_{66}$ using the measured Stoneley velocity at the lowest frequency from the equation:

$$c_{66} = \frac{V_T^2 \rho_f V_f^2}{(V_f^2 - V_T^2)}, \tag{84}$$

where $V_T$ is the measured Stoneley velocity at frequency $f_1$, $\rho_f$ is the borehole fluid (mud) mass density, and $V_f$ is the borehole fluid compressional velocity.

According to some aspects of the invention, however, the tube wave velocity expression for the acoustic tool resonance-impedance model can be used, which yields:

$$\frac{1}{c_{66}} = \frac{(1-\phi)}{\rho_f}\left(\frac{1}{V_T^2} - \frac{1}{V_f^2}\right) - \phi\,\text{real}(C_{tool}), \tag{85}$$

where $$\phi = \frac{b^2}{a^2} \tag{86}$$

and real part of $C_{tool}$ is defined in Eq. (70) at the chosen frequency $f_1$, corresponding to the measured Stoneley velocity $V_T$.

An initial guess of the formation shear velocity (or slowness) may be selected using either Eq. (84) or Eq. (85) so that the reference Stoneley dispersion for an equivalent homogeneous and isotropic formation is rather close to the measured dispersion. Consequently, Eq. (85) may be used to account for the acoustic tool effects that can be quite large in fast formations and small borehole diameters.

A reference shear velocity $V_S$ is calculated for an equivalent isotropic formation using the equation:

$$V_s = \left(\frac{c_{66}}{\rho_b}\right)^{\frac{1}{2}} \tag{87}$$

The method may further include determining four acoustic tool parameters, C, $C_{inf}$, $\omega_o$, and $\gamma$ for the resonance-impedance model from a calibration experiment; calculating a reference Stoneley dispersion for an assumed homogeneous, isotropic formation with the five parameters (d, $V_f$, $V_p$, $V_S$ and $\rho_b/\rho_f$) obtained from steps described above together with the four resonance-impedance model parameters; comparing the measured Stoneley dispersion at a chosen depth with the reference Stoneley dispersion in the previous step.

Any observed difference between the measured and reference borehole Stoneley dispersions is a potential indicator of radially varying formation properties. Therefore, in the presence of a difference between the measured and reference borehole Stoneley dispersions, a number of Stoneley velocity data sets at several frequencies is selected from the measured Stoneley dispersion. These velocity data sets may be sufficiently separated in frequency so that they are uncorrelated. A frequency separation of about 200 Hz is generally adequate. Corresponding axial wave numbers $k_i$ are calculated by:

$$k_i = \frac{2\pi f_i}{V_i} \tag{88}$$

where $V_i$ is the measured Stoneley velocity at frequency $f_i$.

Fractional changes in the measured Stoneley velocities from those in the reference dispersion calculated above for selected axial wave numbers obtained from Eq. (88) are calculated. A fractional change in the Stoneley velocity is given by:

$$\frac{\Delta V_i}{V_i} = \frac{(V_i^{measured} - V_i^{reference})}{V_i^{reference}} \tag{89}$$

where i=1, 2, ..., n, and n denotes the number of axial wavenumbers calculated according to Eq. (88).

The kernel $G_i(r)$ at a selected wave number $k_i$ is calculated in terms of the Stoneley wave eigenfunction in the reference state defined above. The borehole axis is assumed to be parallel to the $X_3$-axis. The kernel $G_i(r)$ relates a fractional change in the Stoneley velocity at a given axial wavenumber $k_i$ from that in the isotropic, homogeneous reference state to a corresponding fractional change in the horizontal shear modulus $c_{66}$:

$$\frac{\Delta V_i}{V_i} = \int_a^\infty G_i \frac{\Delta c_{66}(r)}{c_{66}} r\,dr, \tag{90}$$

where a=d/2, is the borehole radius, and i=1, 2, ..., n.

A description of a procedure for determining the kernel $G_i$ is given by B. K. Sinha, in "Sensitivity and inversion of borehole flexural dispersions for formation parameters," (Geophysical Journal International, vol. 128(1), pp. 84-96, January 1997; C. J. Hsu and B. K. Sinha, "Mandrel effects on the dipole flexural mode in a borehole", Journal of Acoustical Society of America, volume 104(4), pp. 2025-2039, October 1998) and is known to those of skill in the art having the benefit of this disclosure.

The integrals below are calculated according to:

$$u_i = \int_a^\infty G_i(r)dr, \tag{91}$$

$$S_{ij}(r_0) = \int_a^\infty (r-r_0)^2 G_i(r) G_j(r) dr, \tag{92}$$

where $r_o$ denotes the radial position in the formation; i,j=1, 2, ..., n, and a is the borehole radius.

$$a_i(r_o) = \frac{S_{ij}^{-1}(r_o)u_j}{u_i S_{ij}^{-1}(r_o)u_j}. \tag{93}$$

where $a_i$ is the weighting coefficient of the data kernel $G_i(r)$, and $u_i$ is the integral of the data kernel $G_i(r)$ as shown above and denotes the sensitivity of the measured shear velocity $V_i^{measured}$ to radial variations in the shear modulus $c_{66}$.

A fractional change in the horizontal shear modulus $c_{66}$ can then be calculated from the relation:

$$\frac{\Delta c_{66}(r_0)}{c_{66}} = a_i(r_o)\frac{\Delta V_i}{V_i}, \quad (94)$$

where $\Delta V_i/V_i$ are known at selected axial wavenumbers $k_i$, from Eq. (88).

Radial variation in the formation horizontal shear modulus can then be calculated from the relation:

$$c_{66}(r_0) = \left(1 + \frac{\Delta c_{66}(r_0)}{c_{66}}\right)c_{66}, \quad (95)$$

Radial variation in the formation horizontal shear velocity $V_{hs}$ is then calculated from:

$$V_S(r_0) = \left[\left(1 + \frac{\Delta c_{66}(r_0)}{c_{66}}\right)\frac{c_{66}}{\rho_b}\right]^{\frac{1}{2}}, \quad (96)$$

Following Backus and Gilbert inverse theory (Burridge and Sinha, "Inversion for formation shear modulus and radial depth of investigation using borehole flexural waves", 66th Annual International Meeting, Society of Exploration Geophysicists Expanded Abstracts, pp. 158-161, 1996) known to those of skill in the art having the benefit of this disclosure, a trade-off between the error e, defined by Eq. (100) (below); and radial spread S, defined by Eq. (99) (below), in the inverted shear modulus can be expressed in terms of a and the new spread function. W can then be expressed as:

$$W_{ij}(\alpha, r_o) = E_{ij} + \alpha S_{ij}(r_o), \quad (97)$$

where $$a_i(\alpha, r_0) = \frac{W_{ij}^{-1}(r_0)u_j}{u_i W_{ij}^{-1}(r_0)u_j}, \quad (98)$$

$$S(\alpha, r_0) = a_i(\alpha, r_0)S_{ij}(r_0)a_j(\alpha, r_0), \quad (99)$$

$$e^2 = a_i(\alpha, r_0)E_{ij}a_j(\alpha, r_0). \quad (100)$$

In the presence of error in the measured Stoneley velocity at various axial wavenumbers $k_i$, expressed in terms of the error covariance matrix $E_{ij}$, and an assumed value of the trade-off parameter $\alpha$, one can use the spread function $W_{ij}$ instead of $S_{ij}(r_o)$, and follow the same method described above for estimating the radial variation in the formation horizontal shear velocity.

Therefore, according to principles described herein, there are methods and apparatus for Stoneley radial profiling (SRP) of horizontal shear slowness in the presence of an acoustic tool (e.g. an MSIP tool) structure. The MSIP tool structure is described by an equivalent structure with a prescribed surface impedance at the acoustic tool radius in contact with the borehole fluid. The equivalent structure placed concentric with the borehole axis has been shown to adequately describe the acoustic tool bias on measured Stoneley dispersions in a wide range of formations and hole diameters.

The radial depth of investigation of data kernel $G_i$ associated with the Stoneley dispersion for the resonance-impedance model is larger than that for the empty borehole model. In addition, the sensitivity of Stoneley dispersion to changes in the horizontal shear modulus $c_{66}$ at low frequencies is larger in the presence of an acoustic tool simulated by a resonance-impedance model than in an empty borehole.

The methods and apparatus in accordance with principles of the present invention for SRP of horizontal shear slowness algorithm has been validated against synthetic data for formations exhibiting (a) radially homogeneous; (b) radially decreasing; and (c) radially increasing compressional and shear slownesses away from the borehole surface. Synthetic Stoneley dispersions have been obtained using the Resonance-Impedance Model (RIM) of the acoustic logging tool. It has been demonstrated that use of the SRP algorithm yields verifiable far-field shear slowness (or the shear modulus $c_{66}$) in the presence of near-wellbore alteration and accounts for the acoustic logging tool effects on measured Stoneley dispersions. However, according to the principles described herein, an acoustic tool effects model is appropriately embedded into an appropriate point in the inversion algorithm so that the inversion produces the appropriate answer product result (e.g. Stoneley permeability) in a way that is not biased by the presence of a non-transparent tool in the borehole. In this way, tool bias or effects are "removed" from the data processing method.

The principles of the present invention may be applied to any acoustic data processing technique to improve the ultimate results when a tool, drill string, or other apparatus is positioned in a wellbore. For example, the principles of the present invention may be incorporated into methods of processing data using a significantly acoustically non-transparent apparatus, including, but not limited to, methods taught in U.S. Pat. Nos. 5,278,805; 5,398,215; 5,475,650; 5,687,138; 5,838,633; 5,999,484; 6,351,991; 6,526,354; 6,611,761; 6,614,716; 6,631,327; 6,714,480; and 6,718,266, among many others. Other types of effective tool models may also be used in connection with the present invention, such as the effective tool model described in commonly-owned and concurrently-filed U.S. patent application Ser. No. 11/125,634, entitled "Stoneley Radial Profiling of Formation Shear Slowness" (SDR Docket No. 60.1576), incorporated herein by reference.

Similar effective tool models may be used to address other types of dispersive acoustic propagation modes, such as dipole, quadrupole, and leaky compressional modes. For dipole propagation mode signals, for instance, an effective tool model of the type discussed in the U.S. patent application entitled "Stoneley Radial Profiling of Formation Shear Slowness" may be used. In this case it may be desirable for the model to utilize different compressional velocities and mass densities than is used in connection with the Stoneley propagation model described in the patent application and it may be possible to eliminate the use of the described look-up table and utilize instead single compressional velocity and mass density values. See, for instance, commonly-assigned U.S. patent application Ser. No. 10/847,045, entitled "Methods for Processing Dispersive Acoustic Waveforms", filed May 17, 2004, incorporated herein by reference.

Appendix: Elements of the Boundary Condition Determinant

The boundary equations for the case of a prescribed surface impedance at the tool radius b placed in a fluid-filled borehole of radius a surrounded by an infinite formation are presented below. The surface-impedance at the interface between the tool and borehole fluid (r=b) is given by:

$$\frac{u_r^f}{T_{rr}^f} = \frac{b}{2}\,\text{real}(C_{tool}), \quad (A.1)$$

where the frequency-dependent tool compressibility $C_{tool}$ is given by:

$$C_{tool} = C\left[1 + \left(1 - \frac{1}{C_{inf}}\right)\frac{\omega_0^2}{\omega^2 - \omega_0^2 + 2i\omega\gamma}\right] \quad (A.2)$$

and $$C = 1.1 \times 10^{-10}, (1/Pa) \quad (A.3)$$

$$C_{inf} = 0.315, \quad (A.4)$$

$$\omega_o = 2\pi \times 960, \text{(radians/sec)}, \quad (A.5)$$

$$\gamma = 2990, \text{(radians/sec,} \quad (A.6)$$

and $\omega$ is the Stoneley wave frequency in radians/sec.

The boundary condition matrix is obtained by the substitution of appropriate solutions for the lowest-order axi-symmetric waves (where n=0, and $u_\theta$=0) given by Eqs. (57)-(59), (61)-(63), and (65)-(67) into the relevant boundary conditions at the fluid-fluid, and fluid-solid interfaces. These equations are summarized below:

$$Lc = 0, \quad (A.7)$$

where L is a 4×4 matrix and c is a 4×1 column vector of unknown amplitude coefficients.

The elements of L are given by:

$$L(1,1) = 0.5\lambda^{(1)}b\,\text{real}(C_{tool})(\alpha_{(1)}^2 + \xi^2)J_o(\alpha_{(1)}b) - \alpha_{(1)}J_o(\alpha_{(1)}b), \quad (A.8)$$

$$L(1,2) = 0.5\lambda^{(1)}b\,\text{real}(C_{tool})(\alpha_{(1)}^2 + \xi^2)Y_o(\alpha_{(1)}b) - \alpha_{(1)}Y_o(\alpha_{(1)}b), \quad (A.9)$$

$$L(2,1) = \alpha_{(1)}J_1(\alpha_{(1)}a), \quad (A.10)$$

$$L(2,2) = \alpha_{(1)}Y_1(\alpha_{(1)}a), \quad (A.11)$$

$$L(2,3) = \alpha_{(1)}H_1(\alpha_{(1)}a), \quad (A.12)$$

$$L(2,4) = i\xi H_{(1)}(\beta_{(1)}a), \quad (A.13)$$

$$L(3,1) = \lambda^{(1)}(\alpha_{(1)}^2 + \xi^2)J_{(0)}(\alpha_{(1)}a), \quad (A.14)$$

$$L(3,2) = \lambda^{(1)}(\alpha_{(1)}^2 + \xi^2)Y_{(0)}(\alpha_{(1)}a), \quad (A.15)$$

$$L(3,3) = \{\lambda^{(2)}(\alpha_{(2)}^2 + \xi^2) + 2\mu^{(2)}\alpha_{(2)}^2\}H_{(0)}(\alpha_{(2)}a) + 2\mu^{(2)}\alpha_{(1)}H_{(1)}(\alpha_{(2)}a)/a, \quad (A.16)$$

$$L(3,4) = 2i\mu^{(2)}\xi\beta_{(2)}\{H_{(0)}(\beta_{(2)}a) - H_{(1)}(\beta_{(2)}a)\}, \quad (A.17)$$

$$L(4,3) = -2i\xi\alpha_{(2)}H_1(\alpha_{(2)}a), \quad (A.18)$$

$$L(4,4) = (\beta_{(2)}^2 - \xi^2)H_{(1)}(\beta_{(2)}a). \quad (A.19)$$

where $\lambda$ and $\mu$ denote the Lame constants, and superscripts 1, and 2 refer to the borehole mud, and formation, respectively. The elements of L not defined above are zero. The column vector c is given by $$c = (A^{(1)}, B^{(1)}, A^{(2)}, A_1^{(2)})^T. \quad (A.20)$$

Eqs. (A.2) constitutes a system of 4 linear homogeneous algebraic equations in the wave amplitudes {c}, which yields nontrivial solutions when the determinant of the coefficients of the wave amplitudes c vanishes, i.e., when:

$$det(L) = 0. \quad (A.22)$$

Eq. (A.21) is a complex algebraic equation, both the real and imaginary parts of which vanish simultaneously. A solution, i.e., values of $\xi$ and $\omega$ satisfying the appropriate differential equations of motion and Eq. (A.21) must be found numerically. Once the solution is obtained, the amplitude ratios can be solved for from Eqs. (A.2).

It should be noted that Eq. (A.21) can be transformed into a real algebraic equation by redefining some of the amplitude coefficients in the following manner: $(A_1^{(1)}, B_1^{(1)}) \rightarrow (iA_1^{(1)}, iB_1^{(1)})$; and keeping the other coefficients the same in Eq. (A.20). However, in the case of leaky modes, Esq. (A.21) becomes a complex algebraic equation in spite of the aforementioned transformation.

The preceding description has been presented only to illustrate and describe the invention and some examples of its implementation. It is not intended to be exhaustive or to limit the invention to any precise form disclosed. Many modifications and variations are possible in light of the above teaching. The principles described herein may be used for radial profiling, particularly Stoneley radial profiling of horizontal shear slowness, and other methods of sonic logging data processing.

The preceding description is also intended to enable others skilled in the art to best utilize the invention in various embodiments and aspects and with various modifications as are suited to the particular use contemplated. It is intended that the scope of the invention be defined by the following claims.

What is claimed is:

1. A method of estimating a shear modulus in an anisotropic formation surrounding a borehole, comprising:
   measuring Stoneley dispersion around a vertical borehole with an acoustic tool;
   calculating a horizontal shear modulus $c_{66}$ from the measured Stoneley dispersion;
   accounting for acoustic tool bias on the horizontal shear modulus $c_{66}$ calculation by replacing the acoustic tool structure with a resonance-impedance model that comprises an equivalent surface impedance placed concentrically with a substantially vertical $X_3$- axis and simplifying the equivalent surface impedance to a column having frequency-dependent complex material properties and a surface impedance condition at an interface between the acoustic tool and a borehole fluid;
   introducing the equivalent surface impedance to an open hole and calculating fundamental eigenmodes associated with a lowest-order axi-symmetric Stoneley mode of the equivalent surface impedance using a mode-search routine;
   accounting for near-borehole alteration effects on horizontal shear slowness estimation; and
   storing an indication of the shear modulus.

2. The method of estimating the shear modulus in the anisotropic formation surrounding the borehole according to claim 1, wherein the equivalent surface impedance is imposed at an actual acoustic tool diameter.

3. The method of estimating the shear modulus in the anisotropic formation surrounding the borehole according to claim 2, wherein acoustic tool compressibility is described by a frequency-dependent complex function that simulates observed fluid-resonance in a vicinity of receiver mounts and associated attenuation with a borehole Stoneley mode in a variety of formations.

4. The method of estimating the shear modulus in the anisotropic formation surrounding the borehole according to claim 1, further comprising assigning the fundamental eigenmodes as a reference solution for a chosen homogeneous and isotropic formation.

5. A method of estimating the shear modulus in the anisotropic formation surrounding the borehole according to claim 4, further comprising computing kernels in a perturbation integral used in a Stoneley radial profiling (SRP) algorithm in terms of the fundamental eigenmodes.

6. A method of estimating estimating the shear modulus in the anisotropic formation surrounding the borehole according to claim 1, further comprising obtaining acoustic tool parameters for the resonance-impedance model by calibrating resonance-impedance model predictions with measured Stoneley dispersions in a test well with known parameters.

* * * * *